(12) United States Patent
Ansari et al.

(10) Patent No.: US 10,487,456 B2
(45) Date of Patent: Nov. 26, 2019

(54) SPECIAL TRACKWORK ASSEMBLY

(71) Applicant: Polycorp Ltd., Elora (CA)

(72) Inventors: Masoud Ansari, Waterloo (CA);
Richard Theodore Ellis, Kitchener (CA)

(73) Assignee: Polycorp Ltd., Elora, Ontario (CA)

( * ) Notice: Subject to any disclaimer, the term of this patent is extended or adjusted under 35 U.S.C. 154(b) by 428 days.

(21) Appl. No.: 15/394,921

(22) Filed: Dec. 30, 2016

(65) Prior Publication Data

US 2017/0191225 A1 Jul. 6, 2017

Related U.S. Application Data

(60) Provisional application No. 62/272,735, filed on Dec. 30, 2015.

(51) Int. Cl.
| | | |
|---|---|---|
| *E01B 7/12* | (2006.01) | |
| *E01B 26/00* | (2006.01) | |
| *E01B 7/28* | (2006.01) | |
| *E01B 19/00* | (2006.01) | |
| *F16F 7/108* | (2006.01) | |

(52) U.S. Cl.
CPC .............. *E01B 7/12* (2013.01); *E01B 7/28* (2013.01); *E01B 19/003* (2013.01); *E01B 26/00* (2013.01); *F16F 7/108* (2013.01); *E01B 2204/01* (2013.01)

(58) Field of Classification Search
CPC .......... E01B 2204/01; E01B 7/12; E01B 7/28; E01B 19/003; E01B 26/00
See application file for complete search history.

(56) References Cited

U.S. PATENT DOCUMENTS

| | | | | | |
|---|---|---|---|---|---|
| 3,525,472 | A | * | 8/1970 | Sato | ............ E01B 5/02 238/151 |
| 4,203,546 | A | * | 5/1980 | Raquet | ......... E01B 5/02 238/1 |
| 4,355,578 | A | * | 10/1982 | Raquet | .......... B60B 17/0017 104/306 |
| 4,652,495 | A | * | 3/1987 | Sato | ........... E01B 1/004 238/84 |

(Continued)

FOREIGN PATENT DOCUMENTS

| | | |
|---|---|---|
| DE | 4207334 A1 | 9/1993 |
| EP | 1657362 A1 | 5/2006 |
| GB | 1574192 | 9/1980 |

OTHER PUBLICATIONS

English Translation of DE 4207334 A1.
Extended European Search Report dated Jun. 8, 2017, for European Patent Application No. 16207580.8-1656.

*Primary Examiner* — Zachary L Kuhfuss

(57) ABSTRACT

A special trackwork assembly including a special trackwork body formed to support wheels of a train moving over a running surface portion of an exterior surface of the special trackwork body that generate traffic-related vibrations of the special trackwork body having one or more frequencies of interest. The special trackwork assembly also includes one or more tuned mass dampers secured to the special trackwork body and formed to vibrate, in response to the traffic-related vibrations of the special trackwork body, at the frequency of interest, to at least partially dampen the traffic-related vibrations of the special trackwork body.

15 Claims, 54 Drawing Sheets

(56) References Cited

U.S. PATENT DOCUMENTS

| | | | | |
|---|---|---|---|---|
| 6,340,140 B1* | 1/2002 | Lochschmidt | ............ | E01B 11/44 246/454 |
| 6,402,044 B1* | 6/2002 | Sato | ............ | E01B 5/08 238/382 |
| 7,147,169 B2* | 12/2006 | Walsh | ............ | E01B 13/02 238/310 |
| 7,374,110 B2* | 5/2008 | Walsh | ............ | E01B 13/02 238/310 |
| 7,427,035 B2* | 9/2008 | Farrington | ............ | E01B 19/003 238/382 |
| 7,641,129 B2* | 1/2010 | Farrington | ............ | E01B 19/003 238/382 |
| 7,744,009 B2* | 6/2010 | Reed | ............ | E01B 13/02 238/310 |
| 7,744,010 B2* | 6/2010 | Reed | ............ | E01B 13/02 238/310 |
| 8,353,464 B2* | 1/2013 | Ho | ............ | E01B 19/003 188/379 |
| 8,714,462 B1 | 5/2014 | Bedford et al. | | |
| 9,617,688 B2* | 4/2017 | Ellis | ............ | E01B 5/08 |
| 2010/0258647 A1 | 10/2010 | Ho | | |

\* cited by examiner

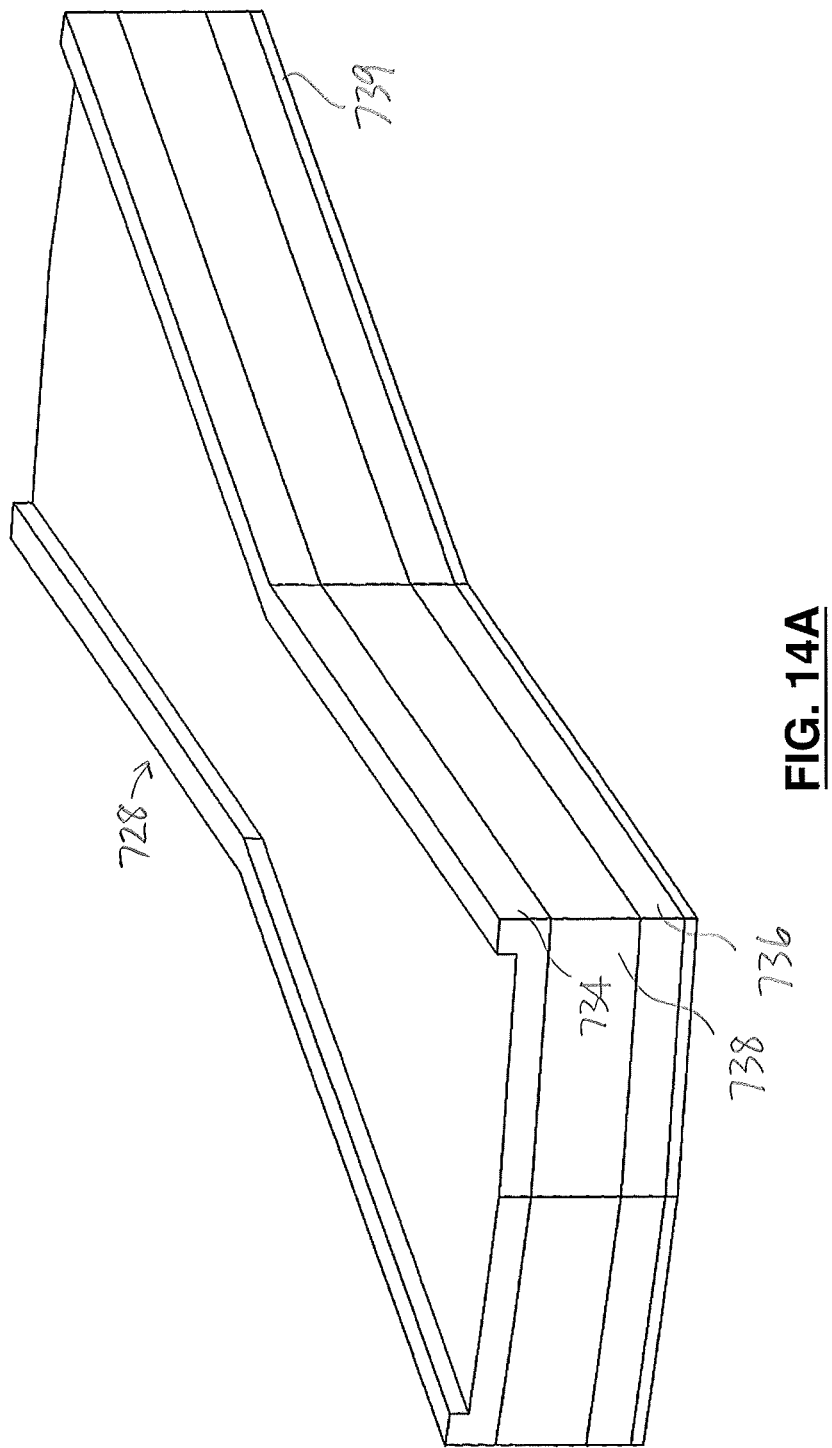

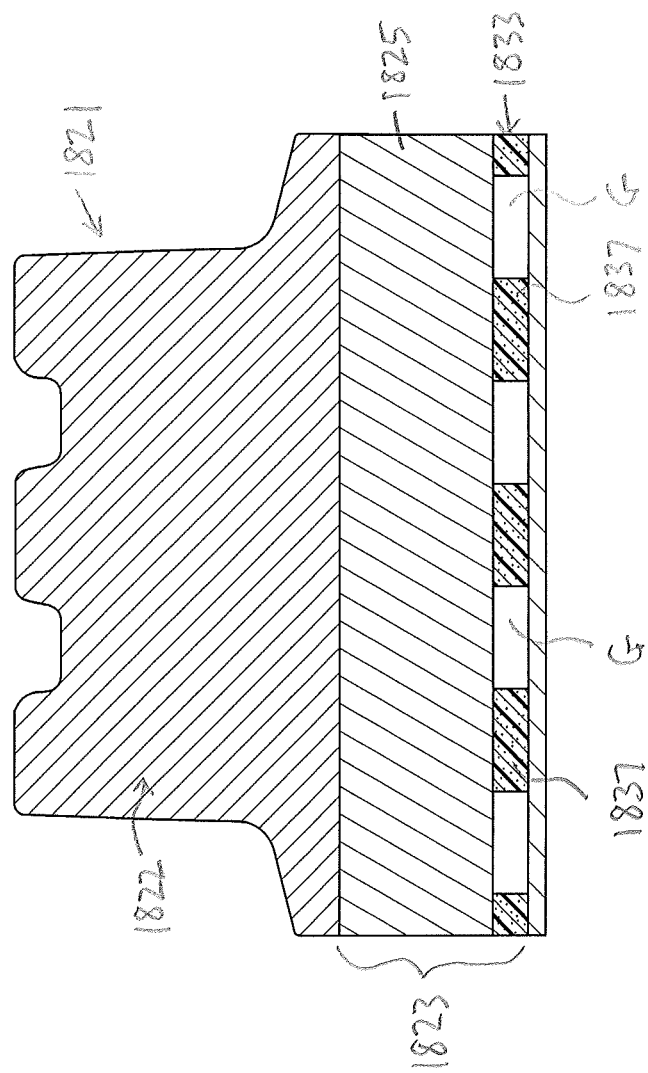

SPECIAL TRACKWORK ASSEMBLY

CROSS-REFERENCE TO RELATED APPLICATIONS

This application claims the benefit of U.S. Provisional Patent Application No. 62/272,735, filed on Dec. 30, 2015, the entirety of which is hereby incorporated by reference.

FIELD OF THE INVENTION

The present invention is a special trackwork assembly including a special trackwork body and one or more tuned mass dampers, and/or one or more vibration isolators.

BACKGROUND OF THE INVENTION

At intersections of railway track (e.g., for streetcars), various types of rails known as "special trackwork" are required. For example, the special trackwork may be designed to enable two substantially straight tracks to intersect (i.e., the special trackwork may be a frog), or to provide curved track around a street corner, to guide the streetcar from one street to another. The special trackwork may include switches. Segments of special trackwork often are formed (e.g., cast, or machined) specifically for a particular intersection. As is known, the segments typically are attached to other segments of special trackwork (or to straight track connecting with the special trackwork), e.g., by means of fish plates or joint bars, or welding.

Special trackwork may be installed in various ways. For example, the special trackwork in a municipal street railway may be attached to cross ties so that the special trackwork is properly located, and concrete is then backfilled around the track, to cover the railway ties and to provide a generally level area in the intersection, i.e., between the rails and on both sides of the track. As is known, the cross ties may be made of various materials. Typically, if cross ties are used, they are positioned directly on ballast or embedded in concrete. In the prior art, special trackwork also may be positioned or embedded in concrete alone, i.e., in the absence of cross ties.

As is well known in the art, vibrations generated by train movement over the track generally appear to be less problematic for straight track. It is believed that, because the straight track is more flexible, less vibration is transmitted from the straight track to the ground supporting it.

There appear to be two reasons for the more serious vibration issues that arise in connection with special trackwork. First, each piece of special trackwork typically is relatively short in length and includes additional elements (i.e., in addition to the rail track typically itself), so that the special trackwork is generally wider than straight track. Because special trackwork is shorter and thicker than straight track, it tends to be stiffer (less flexible) than straight track.

Second, special trackwork is more likely to be subjected to dynamic impact loading (e.g., due to the train turning a corner, guided by the special trackwork) than straight track. Accordingly, the loads to which special trackwork is subjected are frequently greater than those to which straight track is subjected.

In any event, the known special trackwork vibrates and transmits forces to surrounding structures when a streetcar or train passes over it, more so than straight track, and this excessive vibration and the transmitted forces lead to undesirable consequences. For instance, the excessive vibration may be a nuisance to those living or working nearby, and/or to passengers. Also, where the special trackwork is embedded in concrete, the concrete often breaks because of the excessive vibrations, leading to other problems at the intersection. Because the surrounding concrete is cracked due to the excessive vibrations, significant maintenance and repair costs typically are incurred in connection with the concrete surrounding the special trackwork in this type of installation.

SUMMARY OF THE INVENTION

For the foregoing reasons, there is a need for a system and a method that overcomes or mitigates one or more of the disadvantages or defects of the prior art. Such disadvantages or defects are not necessarily included in those described above.

In its broad aspect, the invention provides a special trackwork assembly including a special trackwork body formed to support wheels of a train moving over a running surface portion of an exterior surface of the special trackwork body that generate traffic-related vibrations of the special trackwork body having one or more frequencies of interest. The special trackwork assembly also includes one or more tuned mass dampers secured to the special trackwork body and formed to vibrate, in response to the traffic-related vibrations of the special trackwork body, at the frequency of interest, to at least partially dampen the traffic-related vibrations of the special trackwork body.

In another aspect, the invention provides a tuned mass damper for damping traffic-related vibrations of a special trackwork body generated by train wheels rolling over the special trackwork body, the traffic-related vibrations having at least one frequency of interest. The tuned mass damper includes one or more resilient elements including one or more resilient materials having a preselected stiffness. The tuned mass damper also includes one or more non-resilient elements including one or more non-resilient elements that are at least partially connected to the special trackwork body via the resilient element(s). The non-resilient element has a preselected mass. The preselected stiffness of the resilient element and the preselected mass of the non-resilient element are selected to permit the tuned mass damper to vibrate, in response to the traffic-related vibrations transmitted thereto, at the frequency of interest, to at least partially dampen the traffic-related vibrations of the special trackwork body.

In another of its aspects, the invention provides a method of dampening vibrations of the special trackwork body formed to support wheels of a train rolling of a running surface of the special trackwork body that generate traffic-related vibrations of the special trackwork body having one or more frequencies of interest. The method includes providing one or more resilient elements having a preselected stiffness, and providing one or more non-resilient elements having a preselected mass. Via the resilient element, the non-resilient element is connected to the special trackwork body, to permit the non-resilient element and the resilient element to vibrate, in response to the vibrations of the special trackwork body, at the frequency of interest, for at least partially dampening the traffic-related vibrations of the special trackwork body.

In yet another of its aspects, the invention provides a special trackwork assembly connected with a surrounding structure. The special trackwork assembly includes a vibration isolator and a special trackwork body for supporting wheels of a train moving over a running surface portion of an exterior surface of the special trackwork body that generate traffic-related vibrations in the surrounding structure, in the absence of the vibration isolator, at a dominant frequency. The vibration isolator includes a non-resilient isolator element having a predetermined isolator mass that is bonded with the special trackwork body to form a combined body having a preselected total body mass. The vibration isolator also includes one or more resilient isolator at least partially supporting the combined body. The resilient isolator element has a preselected isolator stiffness that is selected to permit the combined body and the resilient element to vibrate, in response to the movement of the wheels of the train over the running surface portion, to at least partially isolate the surrounding structure from the traffic-related vibrations at a predetermined isolation frequency that is equal to or less than the dominant frequency.

In another of its aspects, the invention provides a special trackwork assembly connected to a surrounding structure. The special trackwork assembly includes a vibration isolator and a special trackwork body for supporting wheels of a train moving over a running surface portion of an exterior surface of the special trackwork body that generate traffic-related vibrations in the surrounding structure, in the absence of the vibration isolator, at a dominant frequency. The special trackwork body as installed, in the absence of the vibration isolator, forming a main system. The vibration isolator includes a non-resilient isolator element having a predetermined isolator mass that is bonded with the special trackwork body to form a combined body having a predetermined total body mass. The vibration isolator also includes one or more resilient isolator elements at least partially supporting the combined body. The resilient isolator element has a preselected isolator stiffness selected to permit the combined body and the resilient isolator element to vibrate, in response to the movement of the wheels of the train over the running surface portion, to at least partially isolate the surrounding structure from the traffic-related vibrations at a predetermined isolation frequency that is equal to or less than the dominant frequency. The vibration isolator and the main system have a main combination natural frequency. The special trackwork assembly also includes one or more tuned mass dampers. Each tuned mass damper includes one or more resilient elements having a preselected stiffness and one or more non-resilient elements having a predetermined damper mass and secured to the special trackwork body via the resilient element(s). The preselected stiffness and the preselected damper mass are selected to permit the tuned mass damper to vibrate at a frequency of interest based on the main combination natural frequency of the vibration isolator and the main system, to at least partially dampen the traffic-related vibrations.

In yet another of its aspects, the invention provides a vibration isolator for at least partially isolating a surrounding structure that is connected to a special trackwork body over which train wheels roll to generate traffic-related vibrations in the surrounding structure, the traffic-related vibrations having a dominant frequency in the absence of the vibration isolator. The special trackwork body has a body mass. The vibration isolator includes one or more non-resilient isolator elements, each having a predetermined isolator mass, for bonding with the special trackwork body to form a combined body having a total body mass. The vibration isolator also includes one or more resilient isolator elements at least partially supporting the combined body. The resilient isolator element has a preselected isolator stiffness that is selected to permit said at least one non-resilient isolator element and the combined body to vibrate, in response to the movement of the train wheels over the special trackwork body, to at least partially isolate the surrounding structure from the traffic-related vibrations at a predetermined isolation frequency that is equal to or less than the dominant frequency.

In another of its aspects, the invention provides a method of at least partially isolating a surrounding structure from traffic-related vibrations of a special trackwork body connected to the surrounding structure, the traffic-related vibrations resulting from movement of train wheels over the special trackwork body. The traffic-related vibrations in the surrounding structure, in the absence of a vibration isolator, have a dominant frequency. The method includes providing one or more resilient isolator elements of the vibration isolator having a preselected isolator stiffness, and providing one or more non-resilient isolator elements of the vibration isolator having a preselected isolator mass. The non-resilient isolator element is bonded to the special trackwork body, to form a combined body having a preselected total body mass. The resilient isolator element and the combined body are permitted to vibrate, in response to the movement of the train wheels over the special trackwork body, to at least partially isolate the surrounding structure from the traffic-related vibrations at an isolation frequency that is equal to or less than the dominant frequency.

BRIEF DESCRIPTION OF THE DRAWINGS

The invention will be better understood with reference to the attached drawings, in which:

FIG. 14A is an isometric view of another embodiment of a tuned mass damper assembly of the invention;

FIG. 25B is a cross-section of the special trackwork assembly of FIG. 25A, drawn at a larger scale;

DETAILED DESCRIPTION

Figure 1A:
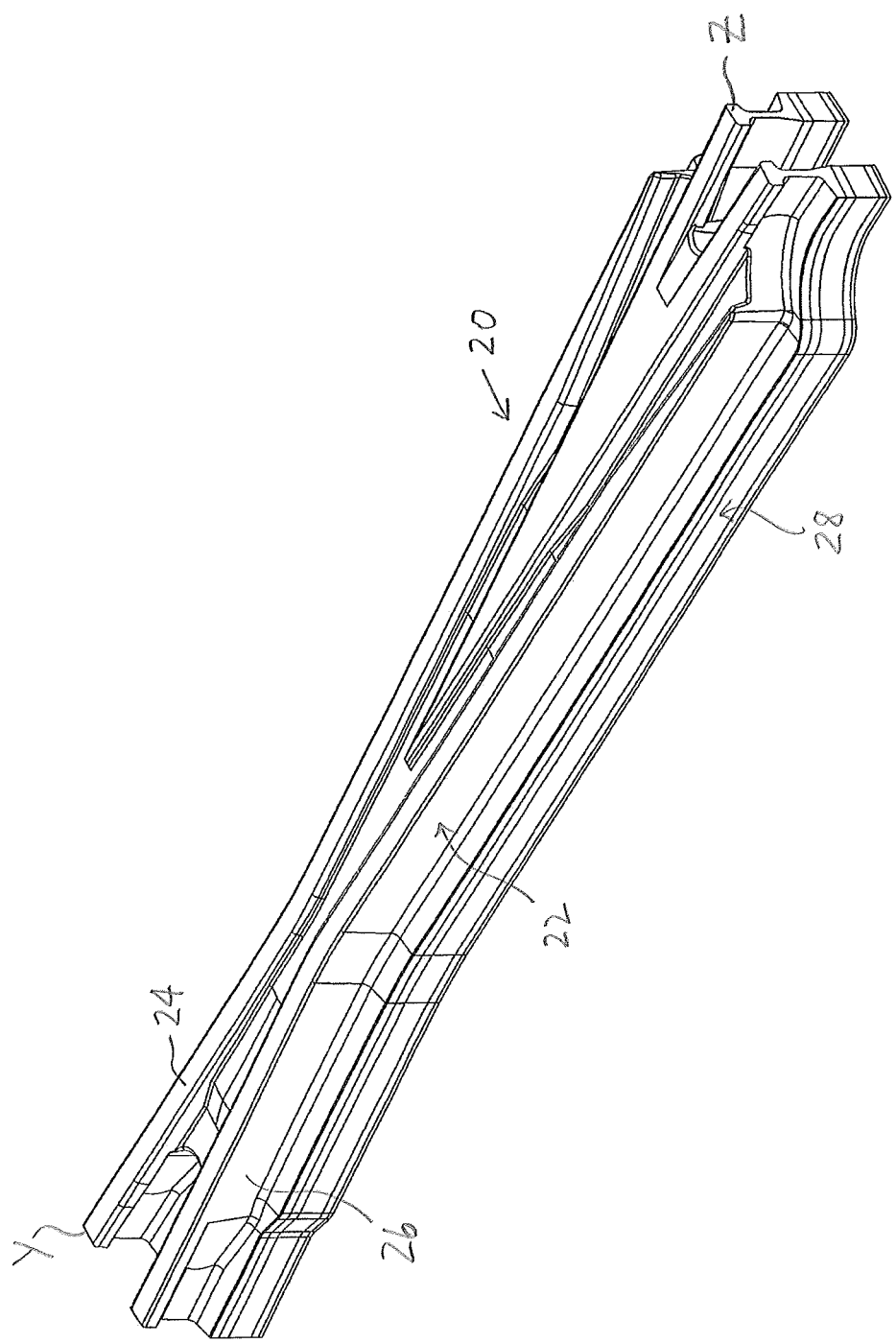
FIG. 1A is an isometric view of an embodiment of a special trackwork assembly of the invention.
Figure 1B:
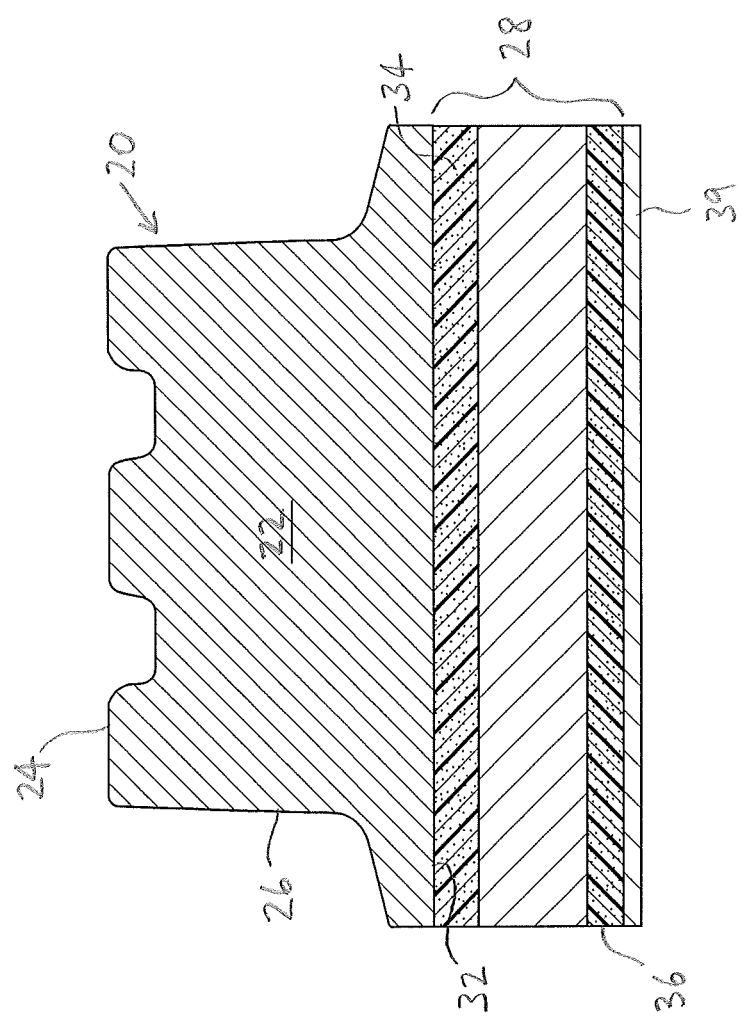
FIG. 1B is a cross-section of the special trackwork assembly of FIG. 1A.

In the attached drawings, like reference numerals designate corresponding elements throughout. Reference is first made to FIGS. 1A and 1B to describe an embodiment of a special trackwork assembly in accordance with the invention indicated generally by the numeral 20. The special trackwork assembly 20 preferably includes a special trackwork body 22 formed to support wheels of a train (not shown) moving over a running surface portion 24 of an exterior surface 26 of the special trackwork body 22 that generate traffic-related vibrations of the special trackwork body 22 having one or more frequencies of interest. As will be described, it is preferred that the special trackwork assembly 20 includes one or more tuned mass dampers 28 that are secured to the special trackwork body 22 and formed to vibrate, in response to the traffic-related vibrations of the special trackwork body 22, at the frequency (or frequencies, as the case may be) of interest, to at least partially dampen the traffic-related vibrations of the special trackwork body 22.

Those skilled in the art would appreciate that vibrations of the special trackwork body 22 generated when the train wheels move over the special trackwork body 22 typically are at, or have, one or more frequencies. As is known, at a certain frequency (referred to herein as the "frequency of interest" or the "target frequency"), in the absence of the tuned mass damper, the traffic-related vibrations of the special trackwork body 22 reach a peak amplitude. Those skilled in the art would appreciate that the mass and the stiffness characteristics of the tuned mass damper are determined so that the amplitude of the traffic-related vibrations of the special trackwork body 22 at the frequency of interest or target frequency is lowered. Accordingly, and as will be described, in one embodiment, the tuned mass damper 28 preferably is formed specifically to dampen the traffic-related vibrations of the special trackwork body 22.

As is well known in the art, if a single (or multi-) degree of freedom system (the "main system") is subjected to a periodic load, then the system vibrates. In theory, the vibration amplitude will peak when the frequency of the load is close to the natural frequency (or natural frequencies) of the system. Those skilled in the art would appreciate that, in a complex system, the peak amplitude may occur approximately at the natural frequency of the system. In practice, therefore, the tuned mass damper is configured to dampen the traffic-related vibrations of the special trackwork body 22 at the frequency of interest. A secondary system (in embodiment of the special trackwork assembly 20 described above, the tuned mass damper) may be used to minimize the amplitude of vibration of the main system (i.e., the special trackwork body) in the frequency of interest.

Figure 28:
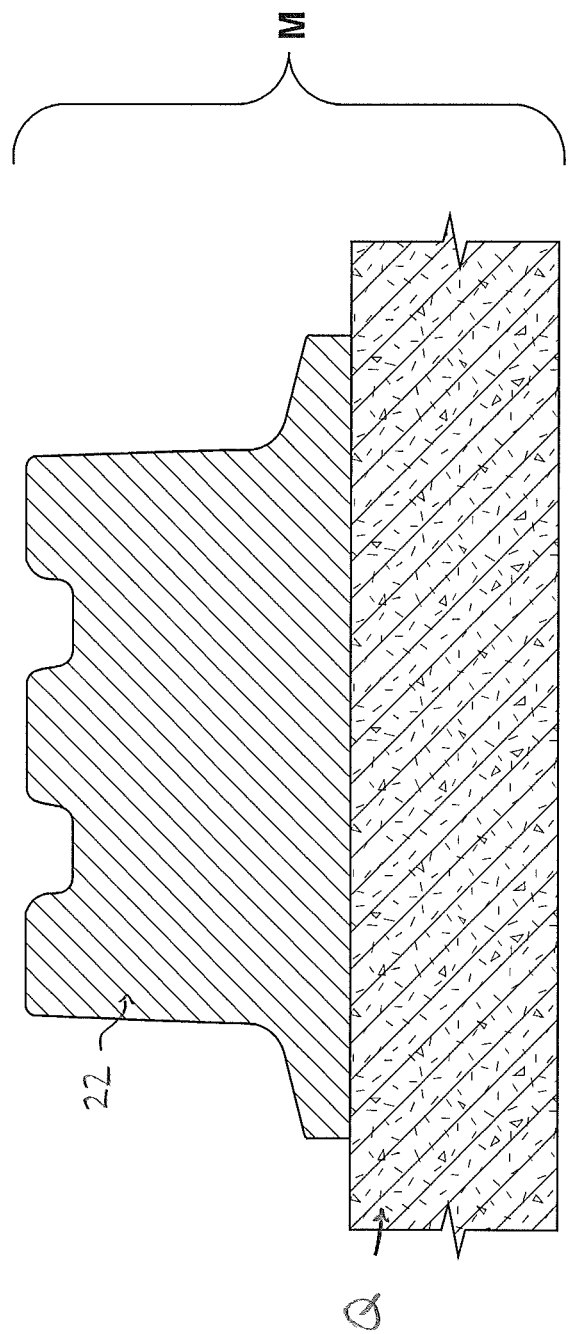
FIG. 28 is a cross-section of a special trackwork body as installed, to form a main system.

Accordingly, in the special trackwork assembly 20 of the invention, pursuant to the foregoing analysis, the special trackwork body 22 as installed (but in the absence of the tuned mass damper) is considered to be the "main system" "M" (FIG. 28). That is, the main system includes the special trackwork body as installed, including the supporting material "Q" (e.g., concrete, and/or aggregate) proximal to the special trackwork body that supports the special trackwork body. In some arrangements (not shown), the special trackwork body may be embedded in supporting material. For example, the main system may include the special trackwork body 22 that is also supported on its sides by concrete (not shown). It will be understood that the main system as illustrated in FIG. 28 is exemplary only. The tuned mass damper 28 is considered to be the "secondary system".

As noted above, in practice, the main system may vibrate at a number of frequencies when train wheels roll over it. In the invention herein, one or more tuned mass dampers 28 preferably are mounted to the special trackwork body 22 in order to minimize the vibration thereof, as will be described.

It will be understood that the tuned mass damper 28 may be secured to the special trackwork body 22 in various ways. For instance, and as can be seen in FIGS. 1A and 1B, in one embodiment, the tuned mass damper 28 preferably is at least partially secured to a bottom surface 32 of the special trackwork body 22.

As can be seen in FIG. 1B, in one embodiment, the tuned mass damper 28 preferably includes one or more resilient elements. For convenience, the resilient elements are referred to as an upper (or first) resilient element (identified in FIG. 1B by reference numeral 34) and a lower (or second) resilient element (identified in FIG. 1B by reference numeral 36). The upper and lower resilient elements have respective preselected stiffnesses. The non-resilient element 38 preferably is attached to the special trackwork body 22 via one of the resilient elements (e.g., by the upper resilient element 34 in the embodiment illustrated in FIG. 1B). The non-resilient element 38 preferably has a preselected mass. Preferably, the preselected stiffnesses of the respective resilient elements 34, 36 and the preselected mass of the non-resilient element 38 are selected for causing the tuned mass damper 28 to vibrate at the frequency of interest (or a number of frequencies of interest, as the case may be) in response to the traffic-related vibrations, for at least partially dampening the traffic-related vibrations of the special trackwork body 22. The special trackwork assembly 20 optionally may also include a bottom layer 39 (FIG. 1B), as will be described.

Figure 2A:
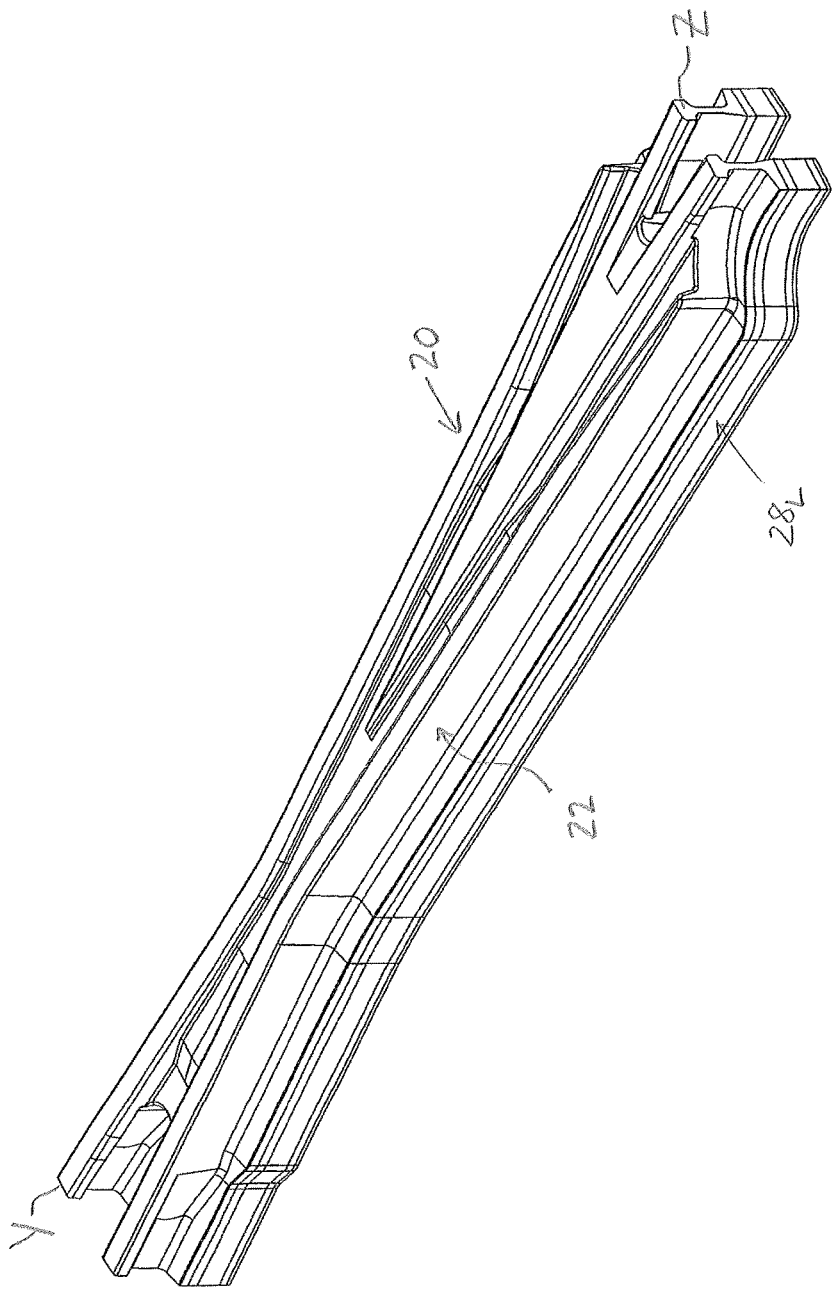
FIG. 2A is an isometric view of an alternative embodiment of a special trackwork assembly of the invention.
Figure 2B:
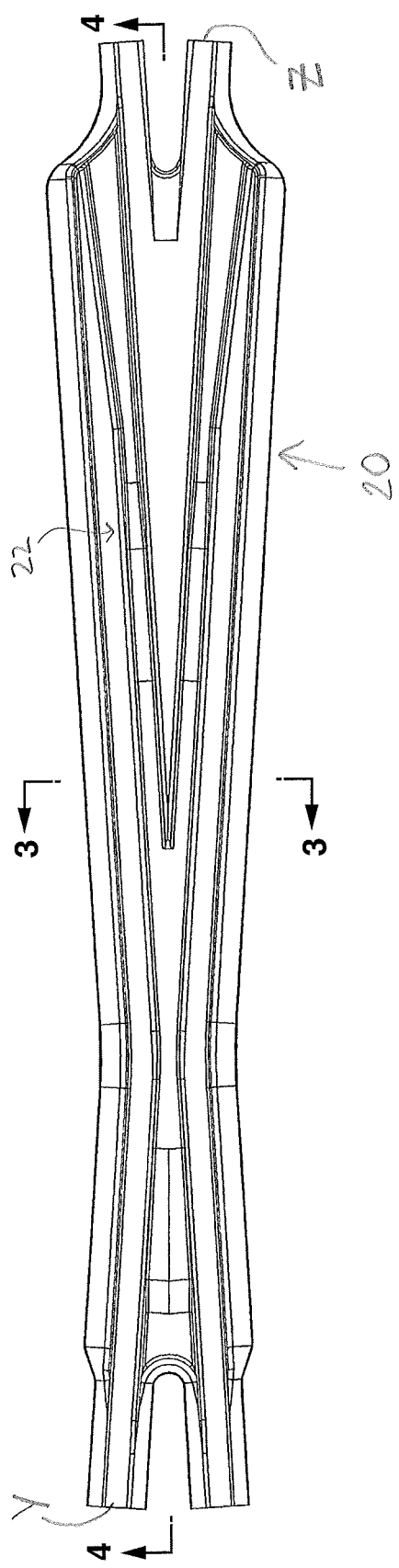
FIG. 2B is a top view of the special trackwork assembly of FIG. 2A.
Figure 3A:
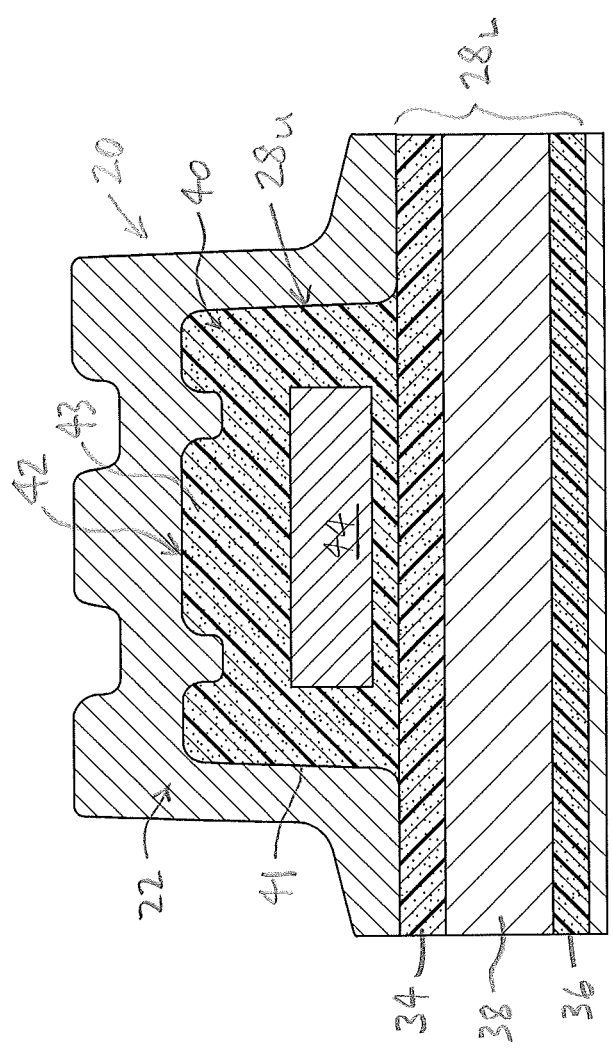
FIG. 3A is a cross-section of the special trackwork assembly of FIGS. 2A and 2B taken along line 3-3 in FIG. 2B, drawn at a larger scale.
Figure 3B:
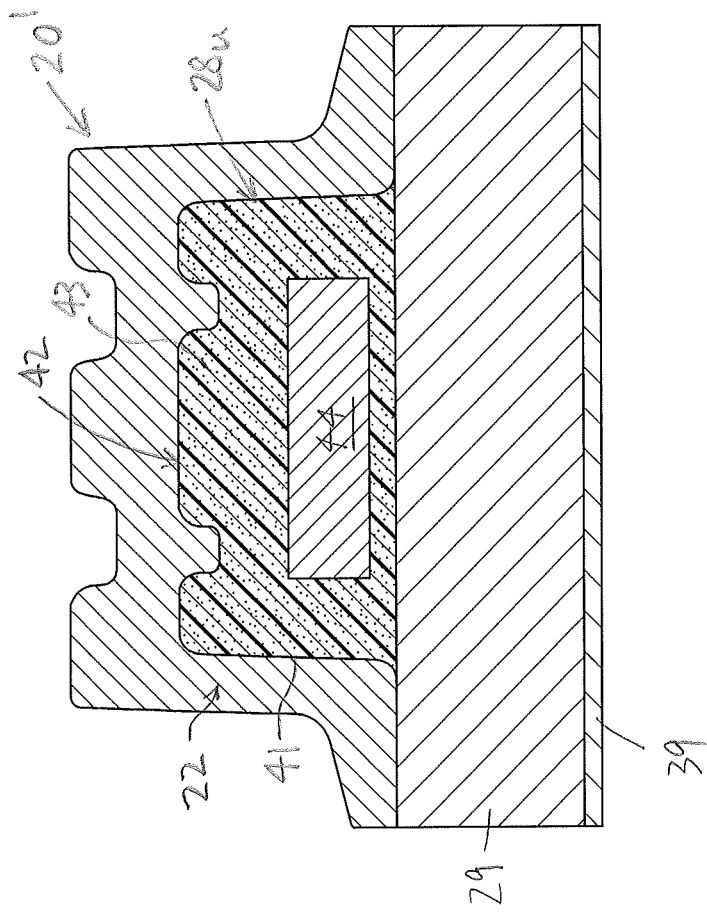
FIG. 3B is a cross-section of an alternative embodiment of the special trackwork assembly of the invention.
Figure 4:
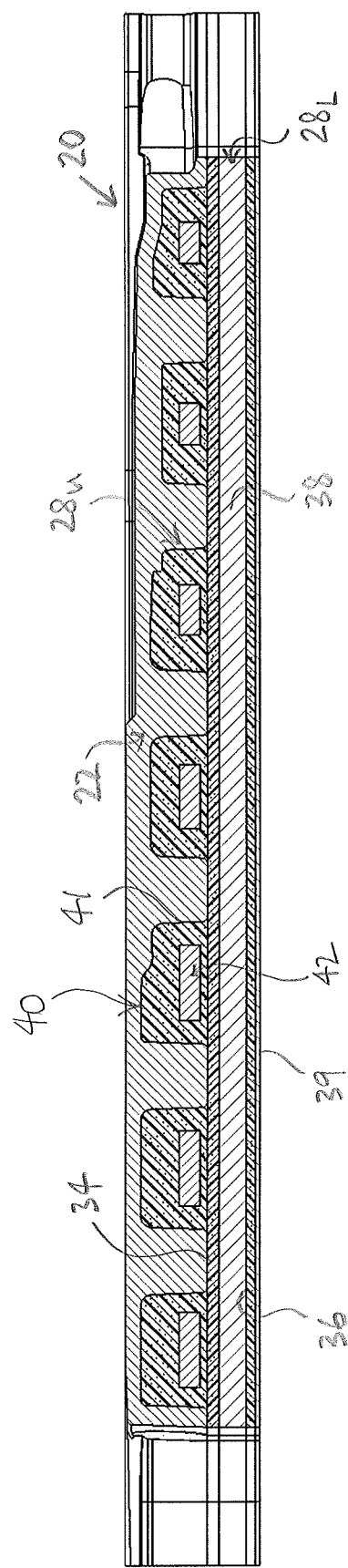
FIG. 4 is a longitudinal section of the special trackwork assembly of FIGS. 2A and 2B taken along line 4-4 in FIG. 2B, drawn at a smaller scale.

An alternative embodiment of the special trackwork assembly 20 of the invention is illustrated in FIGS. 2A-4. In one embodiment, the special trackwork body 22 may include one or more internal cavities 40 defined by internal walls 41 respectively (FIGS. 3A, 3B, 4). In this embodiment, it is preferred that the tuned mass damper 28 is at least partially secured to the internal wall 41, as will be described.

In one embodiment, the special trackwork assembly 20 preferably includes one or more tuned mass dampers accordingly, i.e., with the tuned mass dampers each being tuned to minimize the amplitude of vibration at a specific frequency respectively. As noted above, and as will be described further, the tuned mass dampers 28 may be implemented in a wide variety of forms. For instance, as illustrated in FIGS. 1A and 1B, the tuned mass damper 28 may be secured to a bottom surface of the special trackwork body 22. In another embodiment, and as can be seen in FIGS. 2A-4, in one embodiment, the special trackwork assembly 20 preferably includes one or more internal tuned mass damper subassemblies (identified collectively by the reference numeral $28_U$ for convenience, and referred to collectively as an upper tuned mass damper), and one or more lower tuned mass damper subassemblies (identified in FIGS. 2A-3A and 4 by the reference numeral $28_L$ for convenience). For example, and as can be seen in FIGS. 3A and 4, an upper tuned mass damper subassembly $28_U$ preferably is mounted in the special trackwork body 22, and the tuned mass damper subassembly $28_L$ preferably is partially bonded to a bottom surface 32 of the special trackwork body 22.

It will be understood that, in an alternative embodiment of a special trackwork assembly 20' of the invention, the upper tuned mass damper $28_U$ may be used alone, i.e., the special trackwork assembly 20 may include only the upper tuned mass damper, and have no lower tuned mass damper (FIG. 3B). Instead, the special trackwork assembly 20' preferably includes a steel base plate 39 secured or bonded to the special trackwork body 22. The base plate 39 is optional.

As will be described, each of the upper and lower tuned mass damper subassemblies $28_U$, $28_L$ may include one or more tuned mass dampers. Similarly, the special trackwork assembly may include only an upper tuned mass damper, or only a lower tuned mass damper. Those skilled in the art would appreciate that each of the tuned mass dampers preferably is tuned to a specific body frequency (or range of body frequencies, as the case may be) in order to dampen the amplitude of vibrations of the special trackwork body at the specific frequency, or over the range of frequencies.

As can be seen, for instance, in FIGS. 3A and 4, in one embodiment, the lower tuned mass damper preferably includes only one tuned mass damper that includes the upper or first layer 34 including a first resilient material engaged with the bottom surface 32 of the special trackwork body 22 and the lower or second layer 36 including a second resilient material, and spaced apart from the upper layer 34. Also, the tuned mass damper $28_L$ preferably includes the damper mass 38 positioned between, and secured to, the first and second layers 34, 36. It is preferred that the first and second layers 34, 36 have respective first and second stiffnesses and the damper mass has a preselected mass, selected for causing the tuned mass damper $28_L$ to vibrate at the frequency of interest, in response to the traffic-related vibrations of the special trackwork body 22, for at least partially dampening the traffic-related vibrations of the special trackwork body.

As can also be seen in FIGS. 3A and 4, in one embodiment, the special trackwork assembly 20 preferably also includes a bottom layer or base plate 39 of a suitable non-resilient material, e.g., steel. The base plate 39 is optional, and is not part of the lower tuned mass damper subassembly $28_L$. For instance, the base plate 39 may be included in the special trackwork assembly 20 to protect the lower layer 36 of foam against abrasion or rupture, e.g., during installation (FIG. 3A). Depending on the installation, the base plate 39 may not be included in the special trackwork assembly 20.

The upper and lower layers 34, 36 and the damper mass 38 may be made of any suitable materials. Those skilled in the art would appreciate that the upper and lower layers 34, 36 preferably have some elasticity or resilience. As illustrated in FIGS. 3A and 4, in one embodiment, the upper and lower layers 34, 36 preferably are respective unitary sheets of foam, and the damper mass 38 preferably is in the form of a single, unitary mass of a suitable non-resilient material, e.g., steel. The foam material may be, for example, urethane foam, or high-density polyurethane foam. It will be understood that the upper and lower layers 34, 36 may be made of the same material, or they may be made of different materials.

As noted above, the tuned mass damper $28_L$ is formed so that it dampens vibration of the special trackwork body 22 at one or more specific (body) frequencies, i.e., resulting from traffic-related vibrations.

In one embodiment, the special trackwork assembly 20 preferably also includes the upper tuned mass damper subassembly $28_U$. As can be seen, e.g., in FIG. 4, in one embodiment, the special trackwork body 22 preferably includes a number of internal cavities 40, each being at least partially defined by the internal walls 41 thereof respectively. In one embodiment, it is preferred that the upper tuned mass damper subassembly $28_U$ includes a number of internal tuned mass dampers 42 positioned in the internal cavities 40 respectively. Preferably, each of the internal tuned mass dampers is secured to the special trackwork body 22 via the internal wall 41.

Each of the internal tuned mass dampers 42 is formed so that it minimizes vibration of the special trackwork body 22 at another specific frequency. That is, it is preferred that the lower tuned mass damper $28_L$ and each of the internal tuned mass dampers 42 (i.e., the upper tuned mass damper $28_U$) is formed to minimize vibrations of the special trackwork body 22 at a particular frequency respectively.

Those skilled in the art would appreciate that vibrations having different frequencies may be generated by the train wheels moving over the track body 22 from a first end "Y" to a second end "Z" of the body 22, and vice versa (FIGS. 1A, 2A, 2B). Those skilled in the art would appreciate that certain special trackwork bodies 22, primarily in North America, may be formed to include the internal cavities 40. In one embodiment, the internal cavities 40 preferably are utilized to provide locations at which the internal tuned mass dampers 42 are individually mounted respectively. The upper tuned mass damper $28_U$ includes all the internal tuned mass dampers 42 positioned in the internal cavities. It is preferred that each of the internal tuned mass dampers 42 includes one or more resilient mounting elements 43 having a preselected stiffness. Each of the internal tuned mass dampers 42 preferably also includes an internal tuned damper mass 44 with a preselected mass and secured to the special trackwork body 22 via the resilient mounting elements 43 (FIG. 3A). The internal tuned mass dampers 42 are formed to vibrate at the frequency of interest in response to the traffic-related vibrations of the special trackwork body, for at least partially dampening the traffic-related vibrations of the special trackwork body 22.

The resilient mounting material used in the mount 43 may be any suitable material. For instance, and as can be seen in FIGS. 3A, 3B and 4, in one embodiment, the resilient mounting material preferably is a suitable foam, e.g., urethane foam, or high-density polyurethane foam. In the embodiments illustrated in FIGS. 3A, 3B, and 4, the mounting element 43 and the damper mass 44 occupy substantially the entire cavity 40.

The internal tuned mass 44, which is directly engaged only with the mount 43, preferably is also made of any suitable material. For instance, in one embodiment, the internal tuned mass 44 preferably is made of any suitable steel.

Those skilled in the art would appreciate that the characteristics and dimensions of the upper and lower layers 34, 36 and the damper mass 38 are determined using techniques known in the art, to achieve the desired damping effect at the selected frequency (or frequencies), taking the relevant characteristics of the materials into account. Similarly, the characteristics and dimensions of the mounts 43 and the internal tuned masses 44 of a particular internal tuned mass damper 42 are determined using techniques known in the art in view of the frequency of the vibrations that are to be damped by the internal tuned mass damper 42, taking the relevant characteristics of the materials into account.

In summary, the upper and lower tuned mass damper subassemblies $28_U$, $28_L$ preferably are formed to cooperate to minimize the vibrations that are generated in the special trackwork body 22 when the train wheels move over it. As noted above, this is achieved by determining the various frequencies of the vibrations generated when the train wheels roll over the special trackwork body 22, and providing one or more tuned mass dampers that are tuned to selected ones of frequencies, to modify or attenuate the amplitudes of the vibrations to which special trackwork body 22 is subjected at such frequencies.

As can be seen in FIGS. 3A, 3B, and 4, when the mount 43 is formed of a suitable foam, the internal tuned mass 44 preferably is substantially surrounded by the mount 43. In this embodiment, the cavity 40 is substantially filled with the foam mount 43, except to the extent that a certain volume inside the cavity 40 is occupied by the internal tuned mass 44. However, as can be seen in FIGS. 6A-6D and 7A-7E, where the mount in the cavity is made of resilient material other than foam, unoccupied spaces may be provided inside the cavity.

Figure 5:
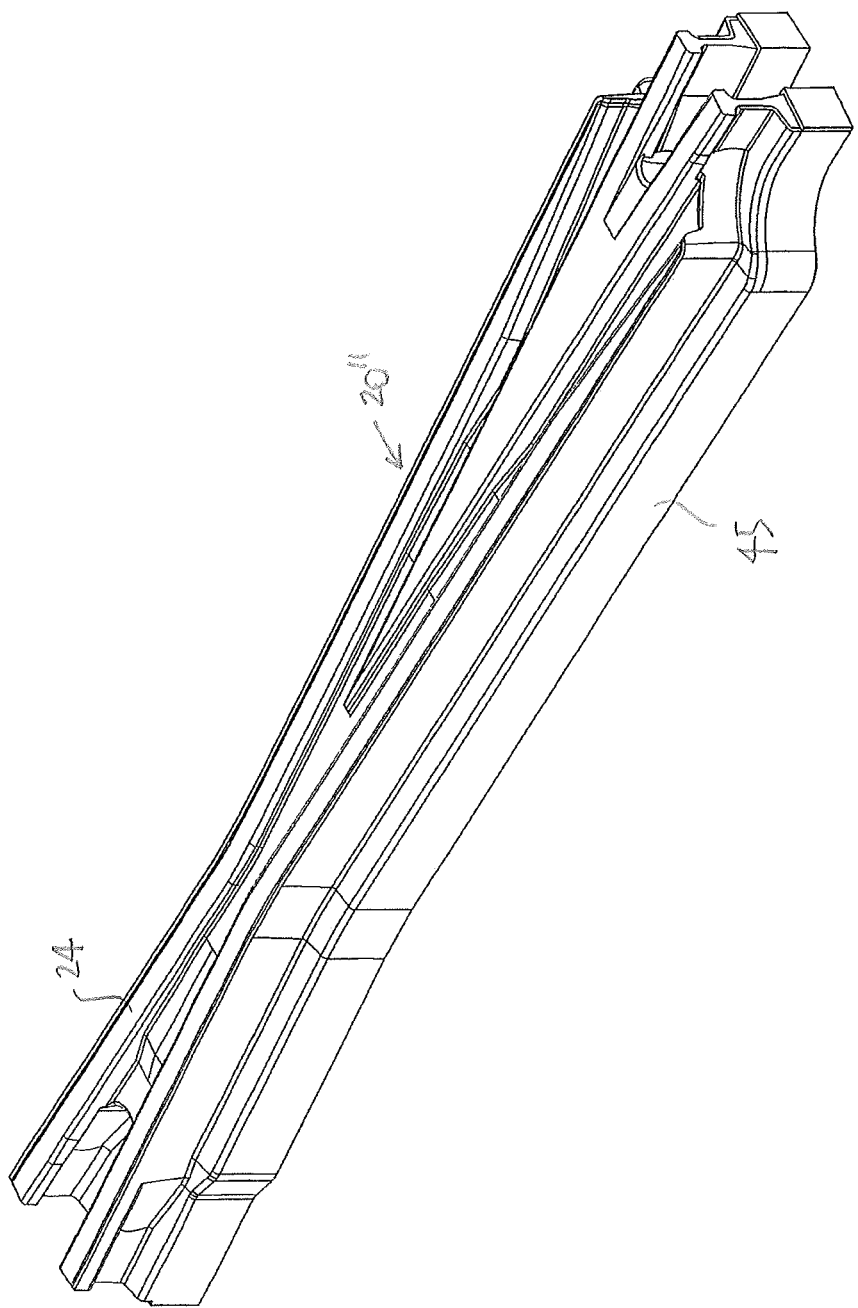
FIG. 5 is an isometric view of another embodiment of the special trackwork assembly of the invention.

As can be seen in FIGS. 1A-4, in one embodiment, the special trackwork assembly 20 preferably is provided without rubber encapsulation. However, in another embodiment, illustrated in FIG. 5, a special trackwork assembly 20" of the invention preferably is encapsulated in a rubber covering 45.

Figure 8:
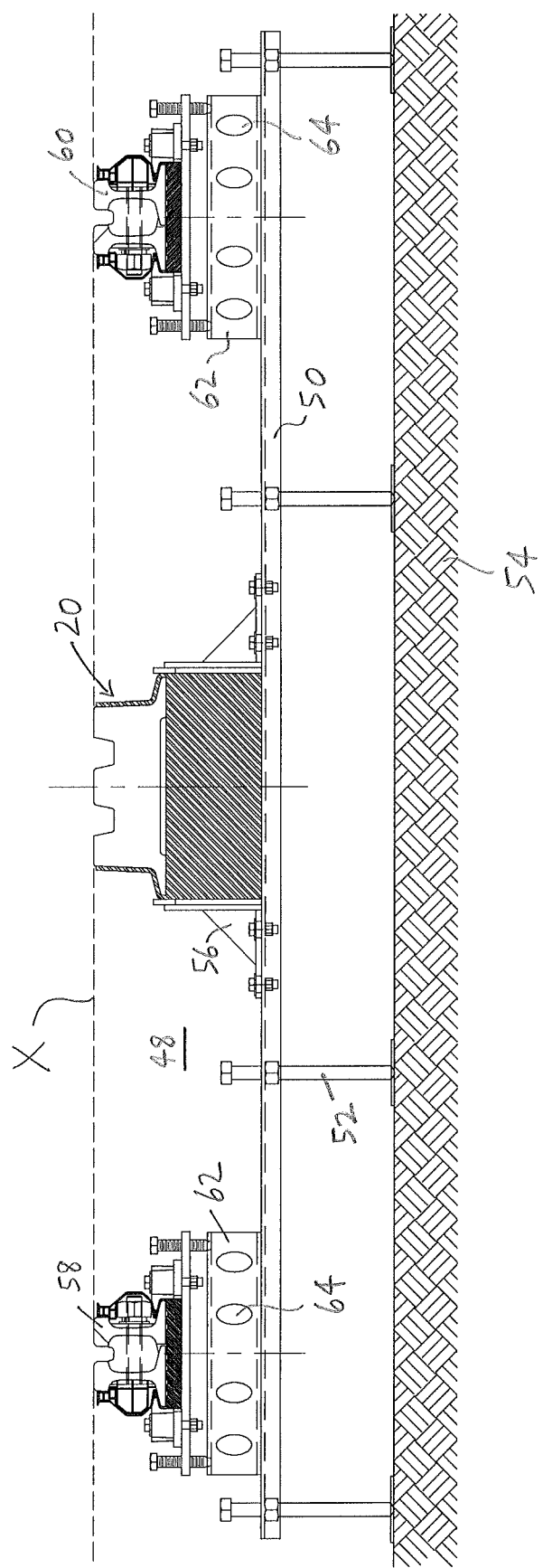
FIG. 8 is a cross-section of an embodiment of a special trackwork system of the invention during installation thereof, drawn at a smaller scale.

As noted above, the exterior surface 26 of the special trackwork assembly 20 preferably includes the running surface portion 24, over which the train wheels (not shown) run. However, the exterior surface 26 also includes a non-running surface portion 46 (FIG. 1A). The special trackwork body 22 is supported by supporting material 48 (FIG. 8). Preferably, the non-running surface portion 46 is covered by the layer 45 of electrically insulating material (e.g., rubber) for substantially electrically isolating the special trackwork body 22 relative to the supporting material 48.

Those skilled in the art would appreciate that "special trackwork" refers generally to any railway track other than "plain" or straight track that is not curved or fabricated before it is laid, for instance, turnouts, crossovers, track crossings, derails, diamond crossings, and sliding rail joints. Accordingly, although only frogs are shown in the drawings, it will be understood that the special track included in the special trackwork assembly of the invention may include other types of special track, e.g., switches.

In summary, in one embodiment, the invention preferably includes a tuned mass damper 28 for damping traffic-related vibrations of the special trackwork body 22 generated by train wheels rolling over the special trackwork body. The traffic-related vibrations have one or more frequencies of interest, as described above. The tuned mass damper 28 preferably includes one or more resilient elements including one or more resilient materials. Each resilient element has a preselected stiffness. The tuned mass damper 28 preferably also includes one or more non-resilient elements 38 including one or more non-resilient materials that is at least partially connected to the special trackwork body 22 via one of the resilient elements. The non-resilient element has a preselected mass. The preselected stiffness of the resilient element and the preselected mass of the non-resilient element preferably are selected to permit the tuned mass damper to vibrate, in response to the traffic-related vibrations transmitted thereto, at the frequency of interest, to dampen the traffic-related vibrations of the special trackwork body.

An embodiment of a method of the invention includes providing the resilient element(s), and providing the non-resilient element(s). Via the resilient element, the non-resilient element is connected to the special trackwork body, to cause the non-resilient element and the resilient element to vibrate, in response to the vibrations of the special trackwork body, at the frequency of interest, for at least partially dampening the traffic-related vibrations of the special trackwork body.

Figure 6A:
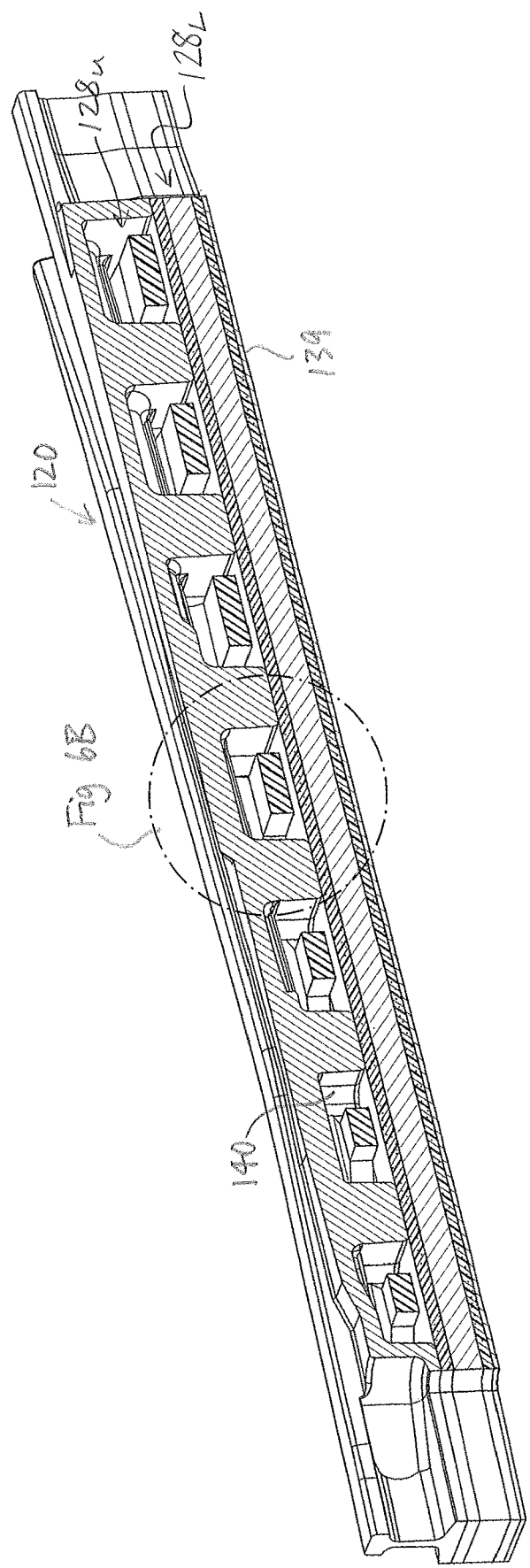
FIG. 6A is an isometric view of a longitudinal section of another embodiment of a special trackwork assembly of the invention.
Figure 6B:
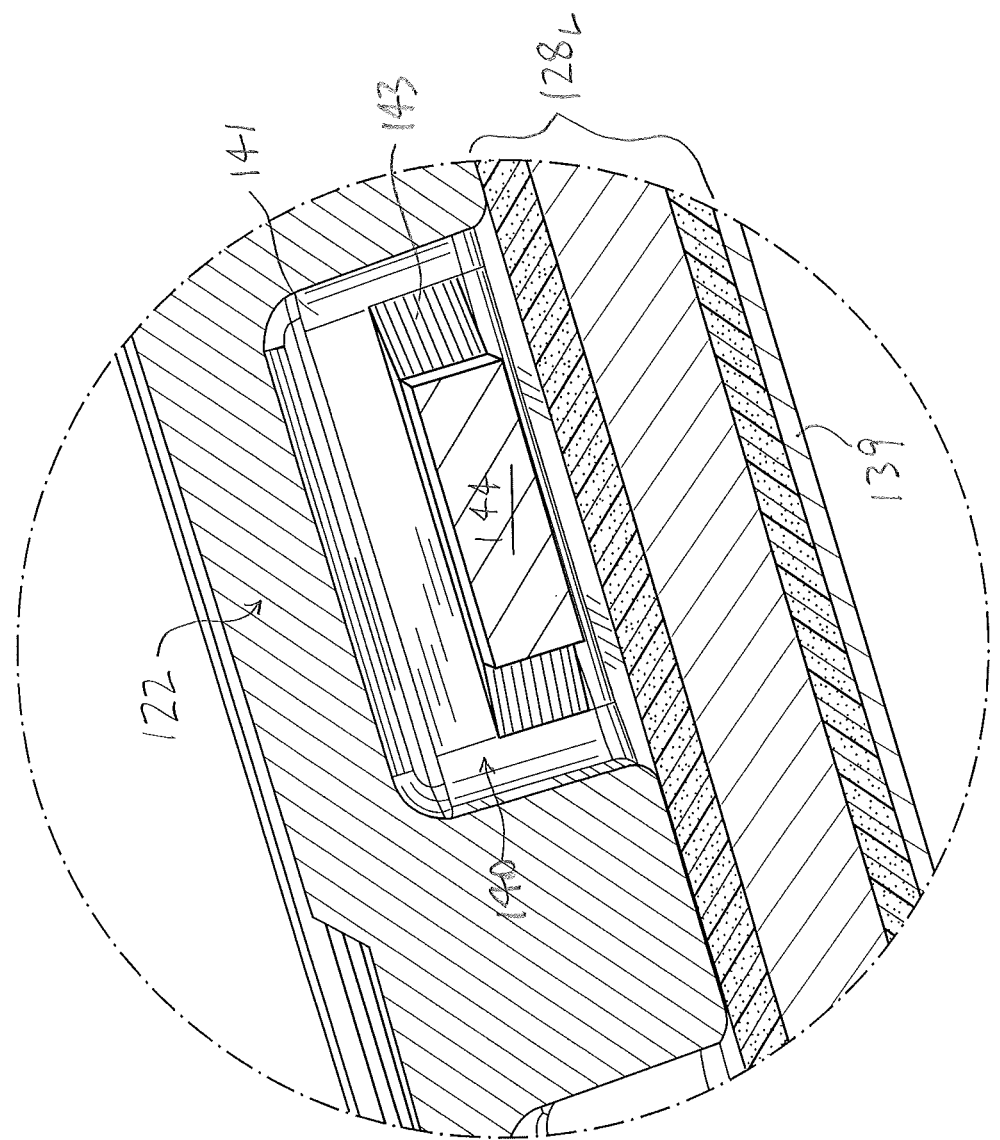
FIG. 6B is an isometric view of a portion of the special trackwork assembly of FIG. 6A, drawn at a larger scale.
Figure 6C:
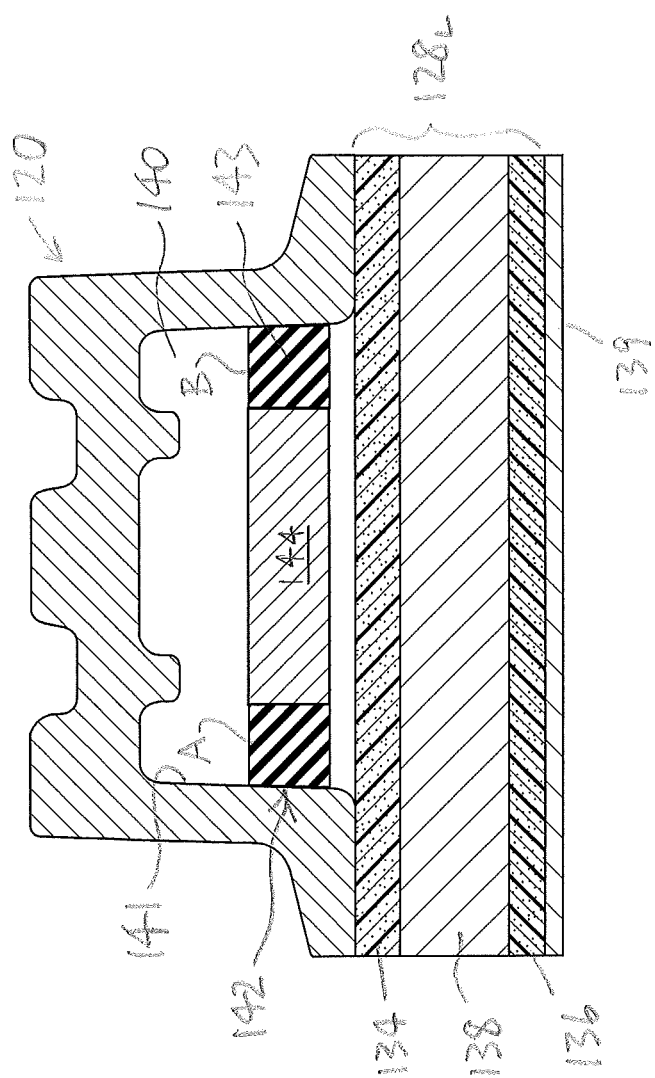
FIG. 6C is a cross-section of the special trackwork assembly of FIGS. 6A and 6B.

For instance, an alternative embodiment of an upper tuned mass damper subassembly $128_U$ of the invention, included in another embodiment of the special trackwork assembly 120, is illustrated in FIGS. 6A-6C. The upper tuned mass damper subassembly $128_U$ preferably includes a number of internal tuned mass dampers 142. Each of the internal tuned mass dampers 142 is tuned to attenuate vibration of the special trackwork body 22 at a selected frequency. In this embodiment, in each of the internal tuned mass dampers 142, a mount 143 includes two parts, identified for convenience as "A" and "B" in FIG. 6C. The mounts 143 and the respective masses 144 may be made of any suitable materials respectively. In one embodiment, it is preferred that the parts "A" and "B" of the mounts 143 are made of a suitable rubber.

As can be seen in FIG. 6C, the internal tuned mass 144 preferably is suspended between the parts "A" and "B" of the mount 143. It will be understood that the mounts 143 are secured to the special trackwork body 22 in the internal cavities 140, i.e., each of the parts "A" and "B" is secured to the special trackwork body 22, as well as to the internal tuned mass 144.

Figure 6D:
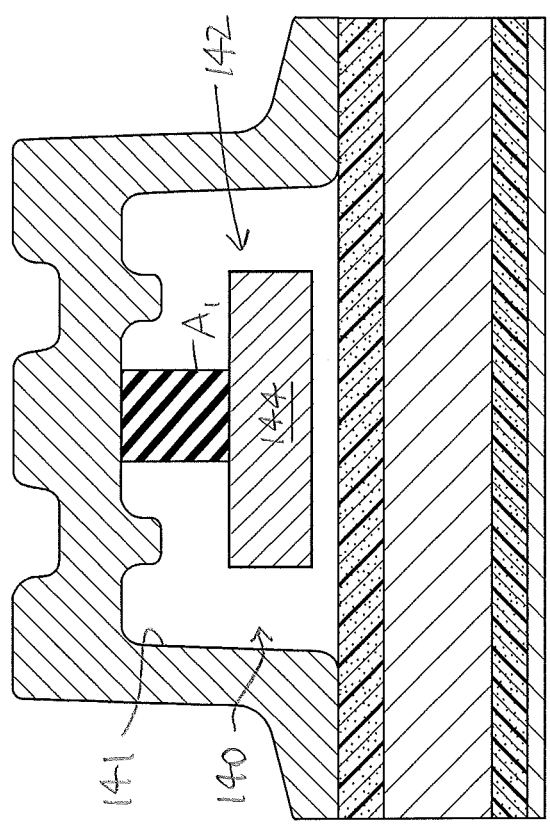
FIG. 6D is a cross-section of an alternative embodiment of the special trackwork assembly of the invention.

Those skilled in the art would appreciate that the mount 143 may be provided in any suitable configuration. An example of an alternative configuration is illustrated in FIG. 6D, in which the mount 143' includes only one rubber mount "$A_1$," connected to an upper internal wall 141 of the internal cavity 140, and from which the internal damper mass 144 is suspended.

As can be seen in FIGS. 6A, 6B, and 6C, the special trackwork assembly 120 preferably also includes a lower tuned mass damper $128_L$ that is generally similar to the lower tuned mass damper $28_L$ of the special trackwork assembly 20. Preferably, the lower tuned mass damper subassembly $128_L$ has upper and lower layers 134, 136 and a damper mass 138 therebetween. The upper and lower layers 134, 136 preferably are made of any suitable resilient material, as noted above. The tuned damper mass 138 may be made of any suitable material. Preferably, the tuned damper mass 138 is made of steel.

It will be understood, however, that the lower tuned mass damper subassembly $128_L$ may, if desired, include a number of tuned mass dampers. Such an embodiment is described below.

The special trackwork assembly 120 preferably also includes a base plate 139. As described above, the base plate 139 is optional.

An alternative embodiment of the special trackwork assembly 220 of the invention including upper and lower tuned mass damper subassemblies $228_U$, $228_L$ is illustrated in FIGS. 7A-7E. As can be seen in FIGS. 7B-7E, mounts 243 preferably are generally similar to the mounts 143, and it is also preferred that the mounts 243 are made of any suitable resilient material. For example, the mounts 243 may be made of a suitable rubber. In each of the respective internal tuned mass dampers 242, an internal tuned mass 244 is held by the mount 243. Accordingly, it can be seen that, in the embodiment illustrated in FIGS. 7A-7E, the internal tuned mass dampers 242 are similar to the upper tuned mass dampers 142.

From the foregoing, it can be seen that the primary differences between the special trackwork assembly 220 and the special trackwork assembly 120 are in the differences between the respective lower tuned mass damper subassemblies $228_L$ and $128_L$.

Figure 7A:
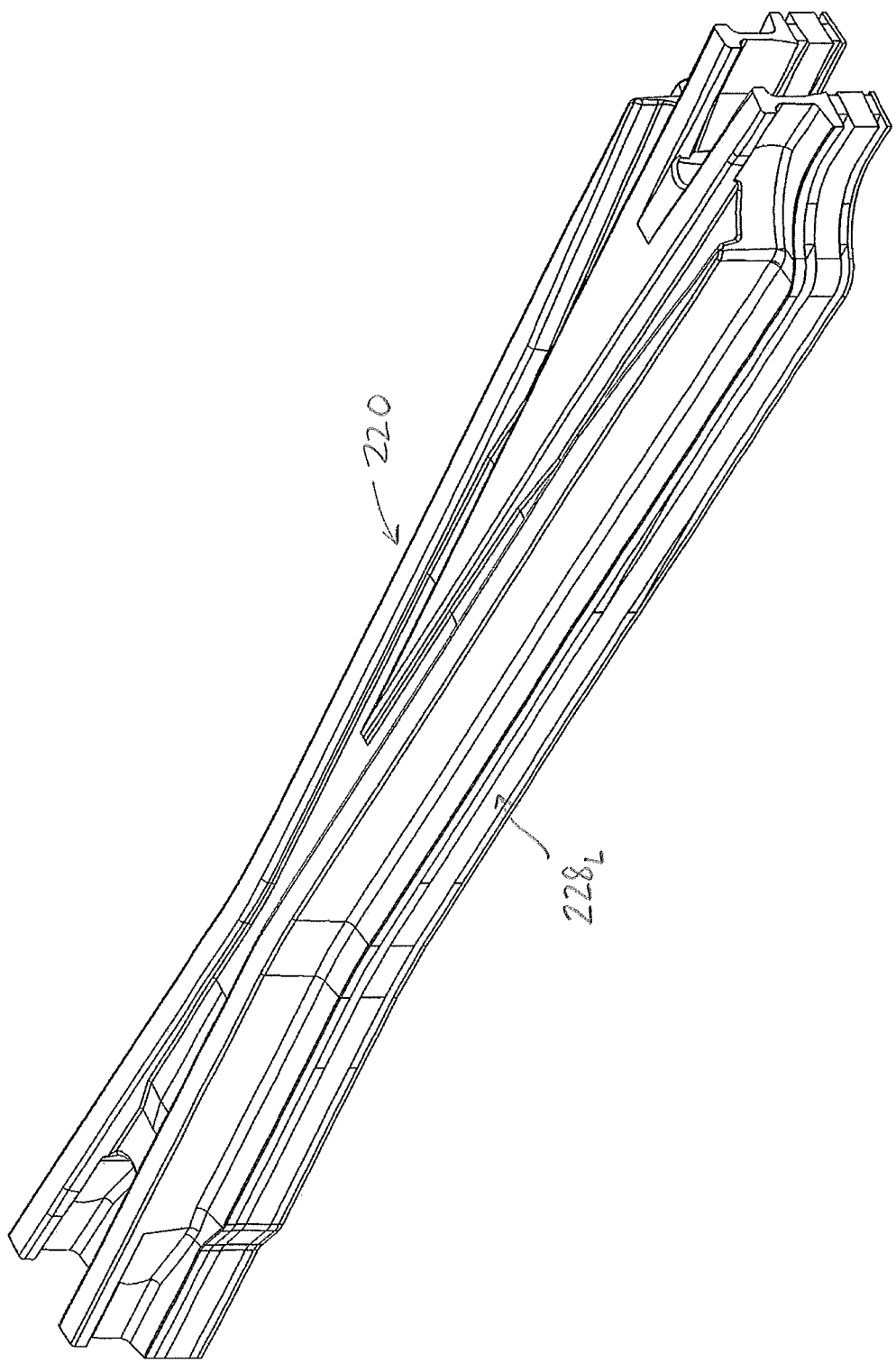
FIG. 7A is an isometric view of another embodiment of the special trackwork assembly of the invention, drawn at a smaller scale.
Figure 7B:
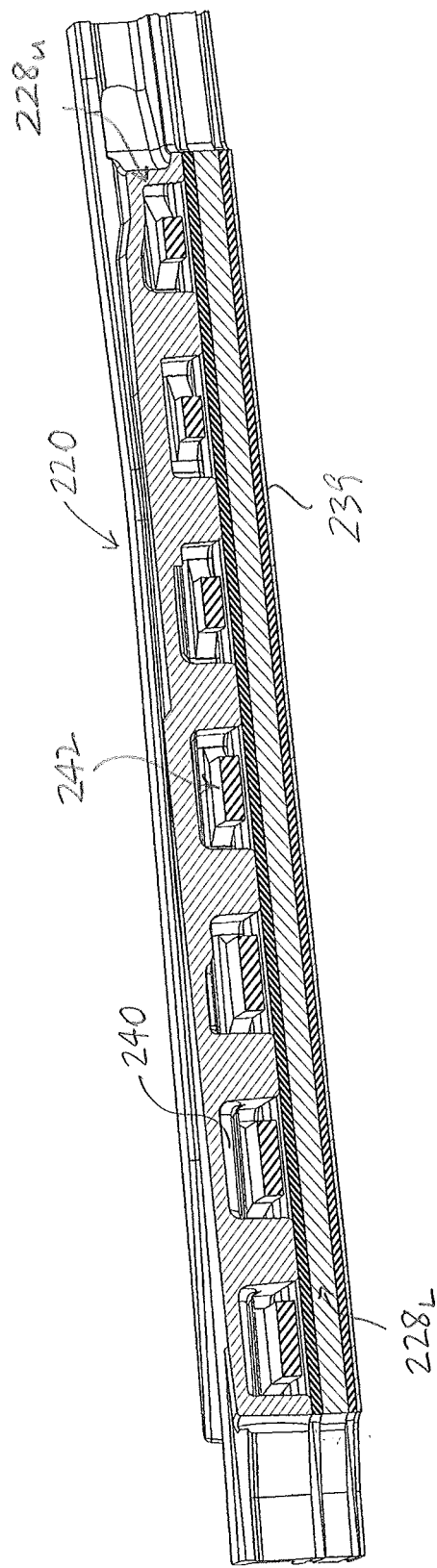
FIG. 7B is an isometric view of a longitudinal section of the special trackwork assembly of FIG. 7A.
Figure 7C:
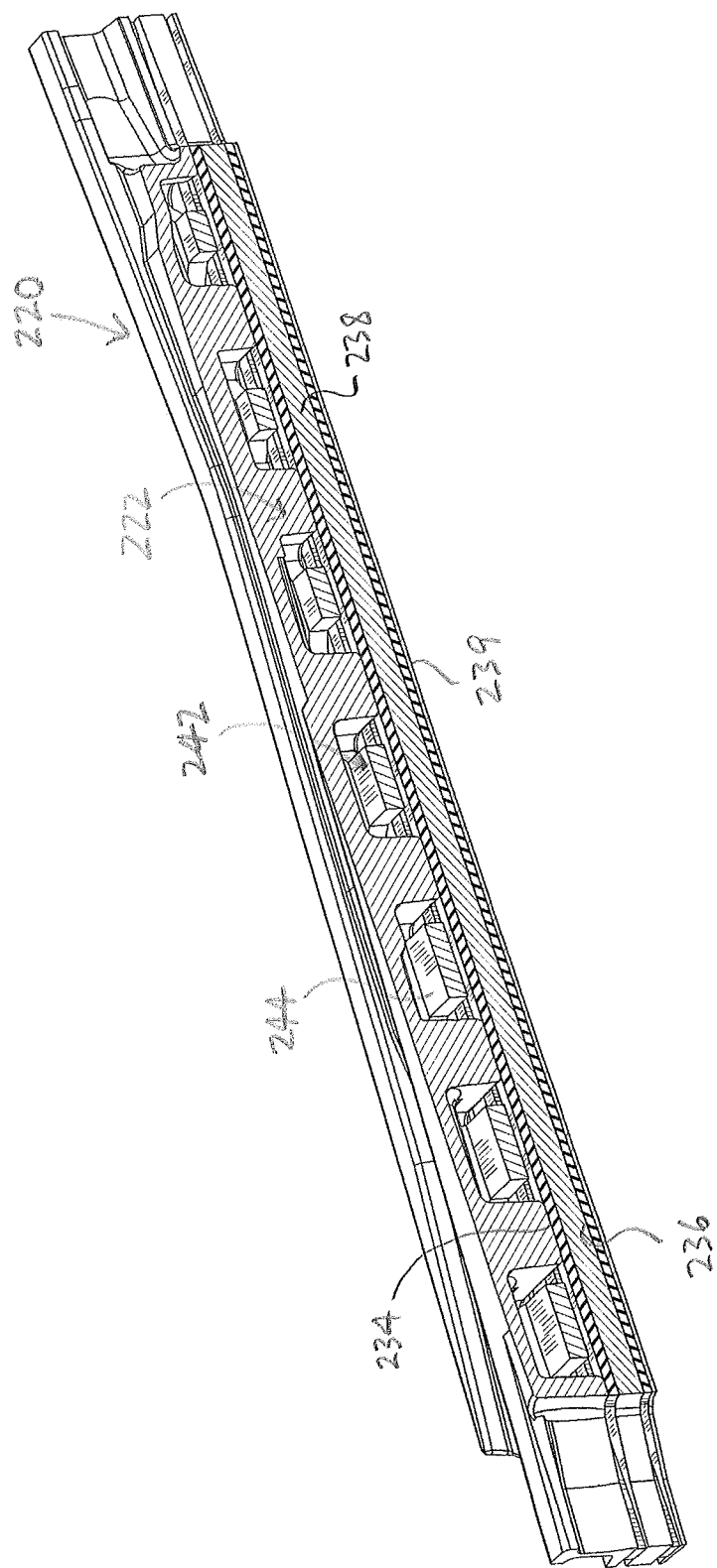
FIG. 7C is another isometric view of the longitudinal section of the special trackwork assembly of FIG. 7A.
Figure 7D:
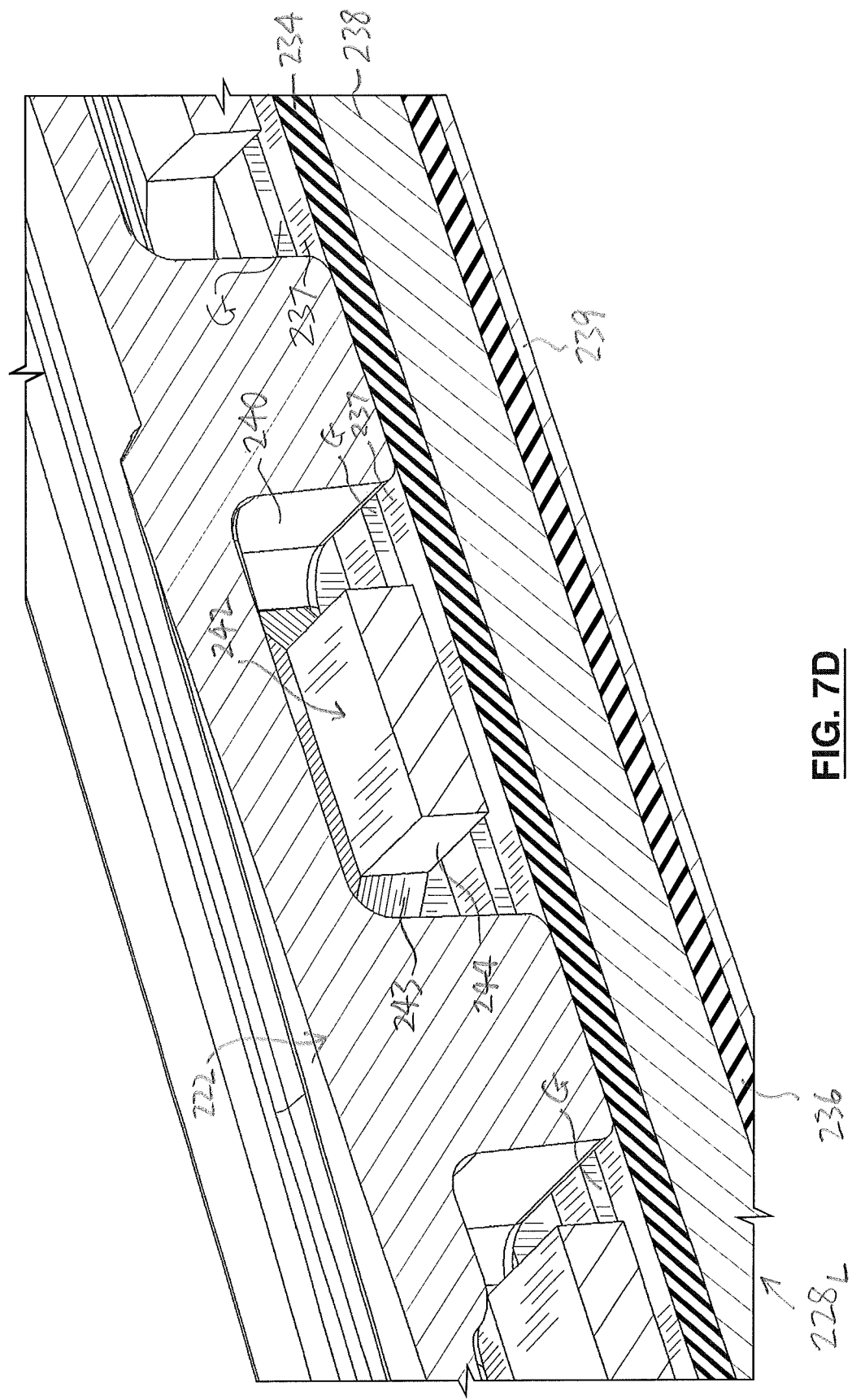
FIG. 7D is an isometric view of a portion of the special trackwork assembly of FIG. 7A, drawn at a larger scale.
Figure 7E:
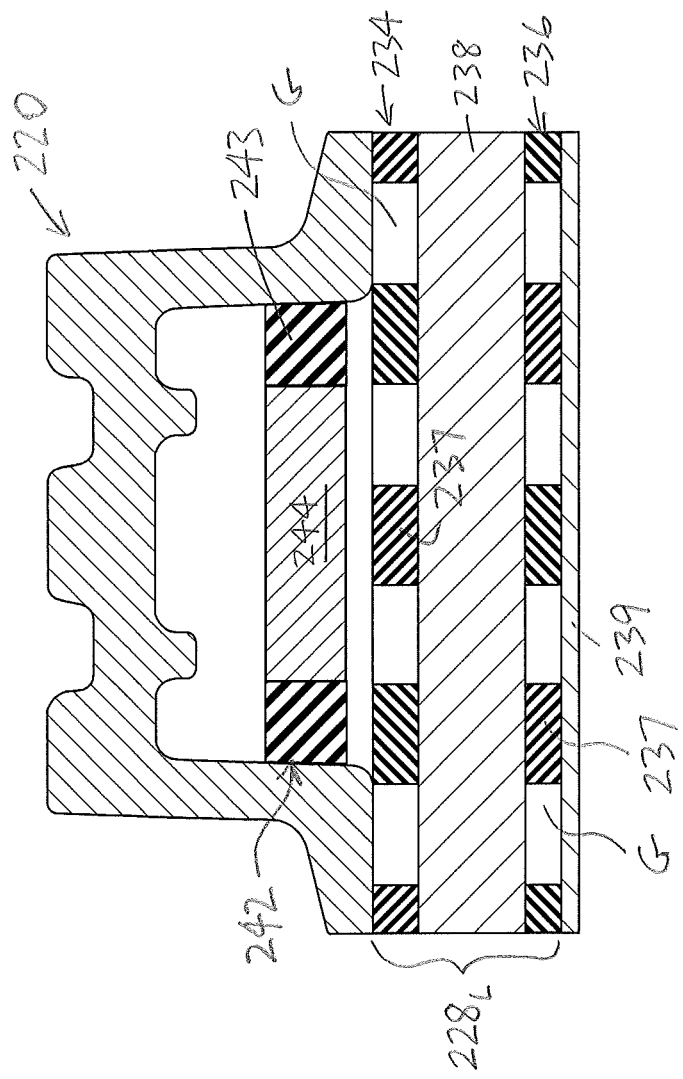
FIG. 7E is a cross-section of the special trackwork assembly of FIGS. 7A-7D.

Preferably, the lower tuned mass damper $228_L$ preferably includes upper and lower layers 234, 236 that include strips 237 of any suitable resilient material, positioned with element gaps "G" therebetween (FIGS. 7D, 7E). The damper mass 238 is positioned between the upper and lower layers 234, 236. For instance, the strips 237 may be made of rubber. The damper mass 238 preferably is any suitable material, e.g., steel.

It is also preferred that the special trackwork assembly 220 includes a base plate 239. As described above, the base plate 239 is optional.

Those skilled in the art would appreciate that the sizes, configurations, and physical characteristics of the resilient strips 237 and the element gaps "G" are determined in accordance with the frequencies of the vibration(s) that are to be damped by the lower tuned mass damper $228_L$.

An example of an installation of the special trackwork assembly 20 of the invention is illustrated in FIG. 8. In this example, the special trackwork assembly 20 is supported by, and secured to, a base element 50 that is supported by posts 52 above a foundation 54. (It will be understood that the illustration of the special trackwork assembly 20 is simplified in FIG. 8.) Preferably, the base element 50 is held substantially horizontal by the posts 52. As can be seen in FIG. 8, the special trackwork assembly 20 preferably is secured to the base element 50 by a lateral support brace 56.

In FIG. 8, it can also be seen that additional track elements 58, 60 preferably are positioned on each side of the special trackwork assembly 20, for supporting the train wheels (not shown) that are not supported by the special trackwork body 22.

Preferably, once the special trackwork assembly 20 and the additional track elements 58, 60 are in position and secured to the base element 50, the installation is completed by introducing concrete 48, up to the level identified as "X" in FIG. 8. Preferably, the track elements 58, 60 are supported on brackets or fittings 62 that are secured to the base element 50. The brackets 62 preferably include openings 64 that permit the concrete, when poured, to flow inside the fittings 62, to secure the track elements 58, 60, once cured.

Those skilled in the art would appreciate that the special trackwork assembly 20, once partially embedded in concrete (as illustrated in FIG. 8), transmits substantially fewer vibrations to the surrounding ground than the prior art special trackwork, and the extent to which the concrete is subjected to significant vibrations is minimized accordingly.

It will be understood that the special trackwork assembly of the invention may be installed in various ways, e.g., the special trackwork assembly may be installed by direct fixation fasteners, or with ties on track ballast. That is, the supporting material 48 may be any suitable material, and need not necessarily be concrete. Accordingly, the installation illustrated in FIG. 8 will be understood to be exemplary only.

Figure 10:
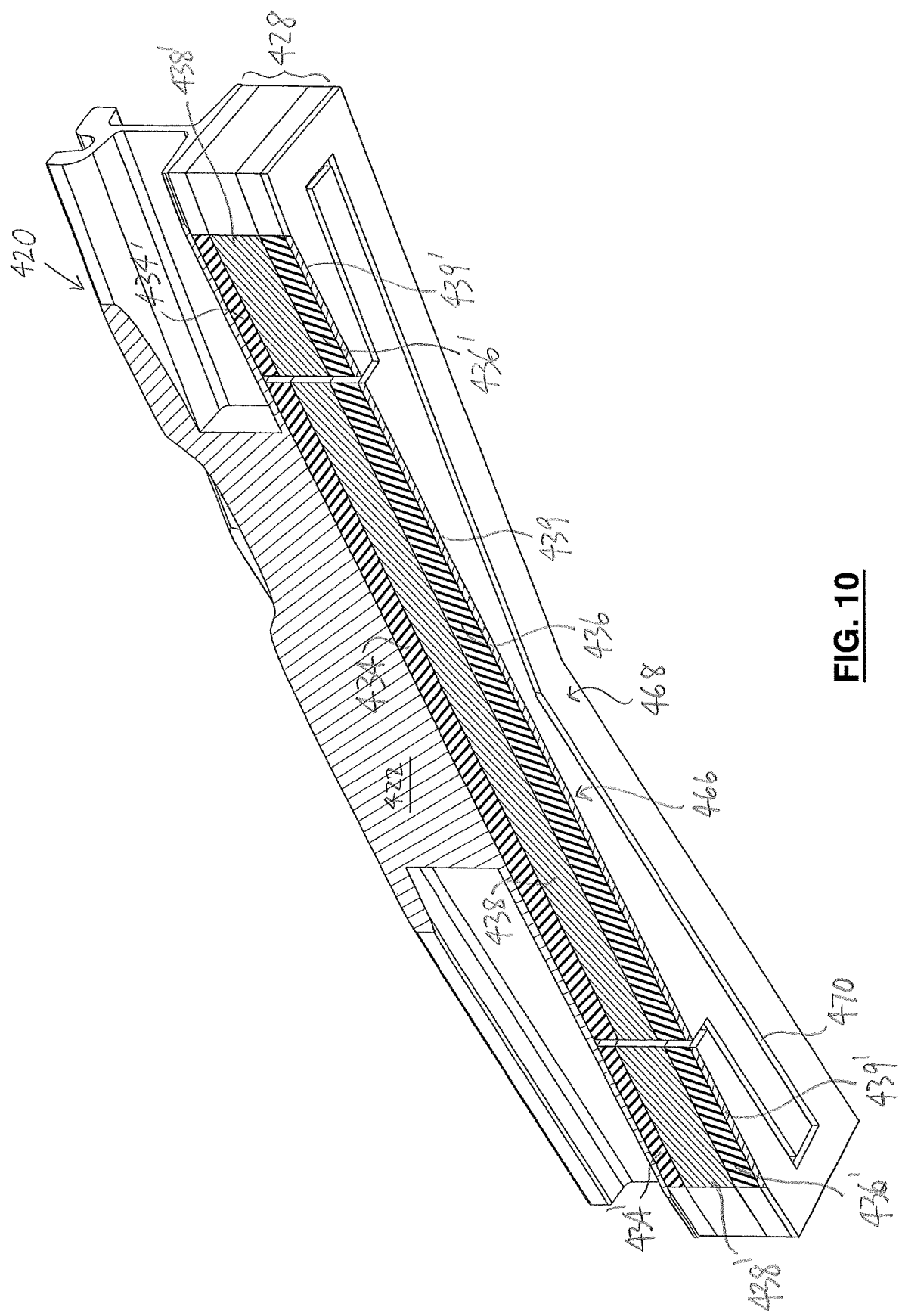
FIG. 10 is an isometric view of a longitudinal section of another embodiment of the special trackwork assembly of the invention.

It will also be understood that the lower tuned mass damper subassemblies $28_L$, $128_L$, $228_L$ may, alternatively, each include more than one tuned mass damper. The multiple tuned mass dampers thereof are respectively tuned to attenuate vibrations at a number of respective frequencies, so that the internal tuned mass dampers and the lower tuned mass dampers respectively minimize vibrations at a number of frequencies. Examples of lower tuned mass damper subassemblies that include more than one tuned mass damper are shown in FIGS. 10-12, described below.

Those skilled in the art would appreciate that the special trackwork assembly may alternatively include only the upper tuned mass damper(s), as illustrated in FIG. 3B.

Figure 9:
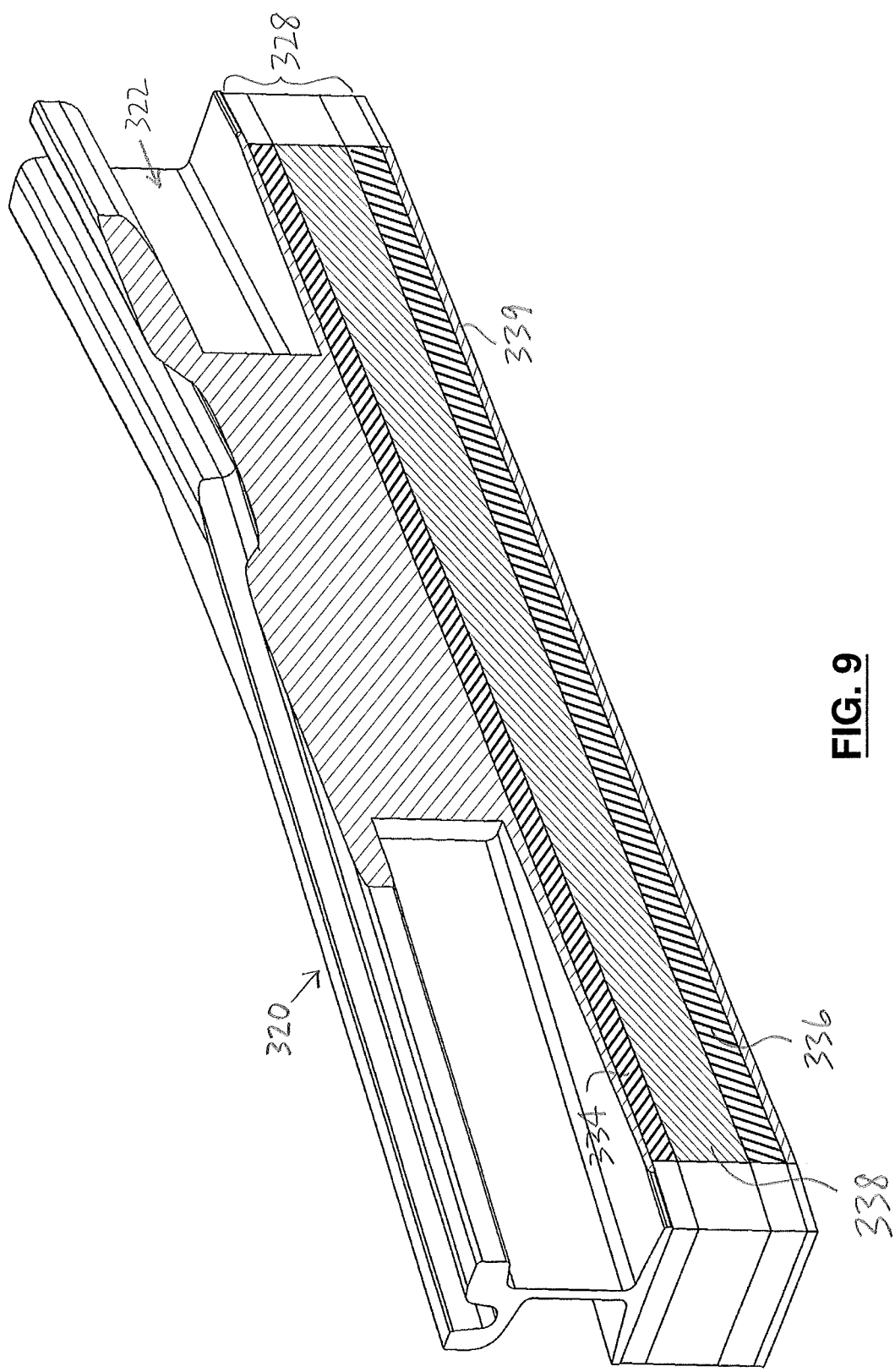
FIG. 9 is an isometric view of a longitudinal section of another embodiment of the special trackwork assembly of the invention, drawn at a larger scale.

An alternative embodiment of the special trackwork assembly 320 of the invention is illustrated in FIG. 9. As can be seen in FIG. 9, in this embodiment, a special trackwork body 322 of the special trackwork assembly 320 does not include cavities. (Those skilled in the art would appreciate that whether the special trackwork body 22 includes cavities depends on the manufacturer thereof. Special trackwork bodies manufactured outside North America typically do not include the cavities.) The special trackwork assembly 320 preferably includes only a lower tuned mass damper 328 that includes upper and lower layers 334, 336 of resilient material, and a damper mass 338. In this embodiment, the upper and lower layers 334, 336 have different thicknesses. It will be understood that the tuned mass damper 328 is tuned to dampen the vibrations generated at a particular frequency upon train wheels passing over the special trackwork body 322, as described above. In the example illustrated, because there is no "upper" tuned mass damper, only the relevant characteristics of the tuned mass damper 328 are pertinent.

The special trackwork assembly 320 is shown as also including a base plate 339, which is optional.

In one embodiment, the special trackwork assembly preferably includes a number of tuned mass dampers that are formed for dampening the traffic-related vibrations at selected body frequencies. Preferably, the tuned mass dampers are at least partially separated from each other by gaps, i.e., cavities with ambient air therein. Various embodiments having these features are illustrated in FIGS. 10-12.

FIG. 10 discloses another alternative embodiment of the special trackwork assembly 420 of the invention. The special trackwork assembly 420 includes a special trackwork body 422 that does not include cavities. The special trackwork assembly 422 includes a tuned mass damper subassembly 428 that includes a number of tuned mass dampers, i.e., a first tuned mass damper 466 surrounded by a second tuned mass damper 468. The first and second tuned mass dampers 466, 468 are positioned so that the second tuned mass damper 468 substantially surrounds the first tuned mass damper 466. As can be seen in FIG. 10, the first and second tuned mass dampers 466, 468 preferably are separated by a gap 470. Because of the gap 470, the first and second tuned mass dampers may function substantially independently of each other. Because the first and second tuned mass dampers 466, 468 are separated by the gap 470, they are tuned to dampen vibrations at different frequencies respectively.

In summary, in one embodiment, the special trackwork assembly 420 preferably includes a number of tuned mass dampers that are at least partially separated from each other by the gaps therebetween, each of the tuned mass dampers being formed for at least partially dampening the traffic-related vibrations at the frequency (or frequencies) of interest. Those skilled in the art would appreciate that the discontinuities between the tuned mass dampers enable them to vibrate at different frequencies respectively. It will be understood that, if preferred, the gaps between the tuned mass dampers may be filled (or partially filled) by any suitable resilient material, e.g., by a suitable foam material.

The first tuned mass damper 466 preferably includes first and second layers 434, 436 separated by a damper mass 438. Similarly, the second tuned mass damper 468 also preferably includes upper and lower layers 434', 436' separated by a damper mass 438'.

As can be seen in FIG. 10, the special trackwork assembly 420 preferably also includes optional base plates 439, 439', respectively positioned on the tuned mass dampers 466, 468.

It would be appreciated by those skilled in the art that the composition and the configuration of the tuned mass dampers 466, 468 are determined so as to minimize vibration of the special trackwork body 22 at different predetermined frequencies of interest.

Figure 11A:
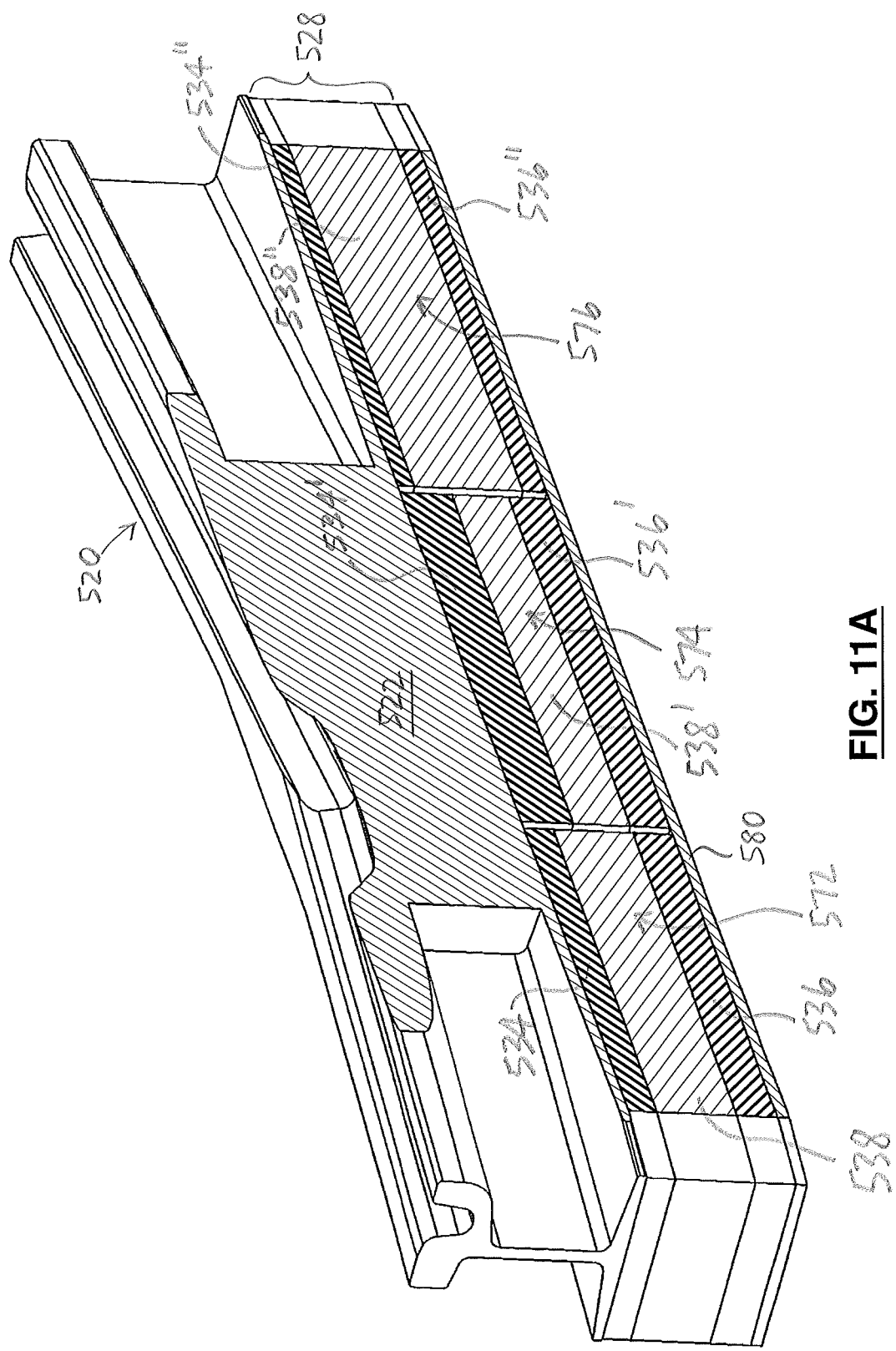
FIG. 11A is an isometric view of a longitudinal section of another embodiment of the special trackwork assembly of the invention.
Figure 11B:
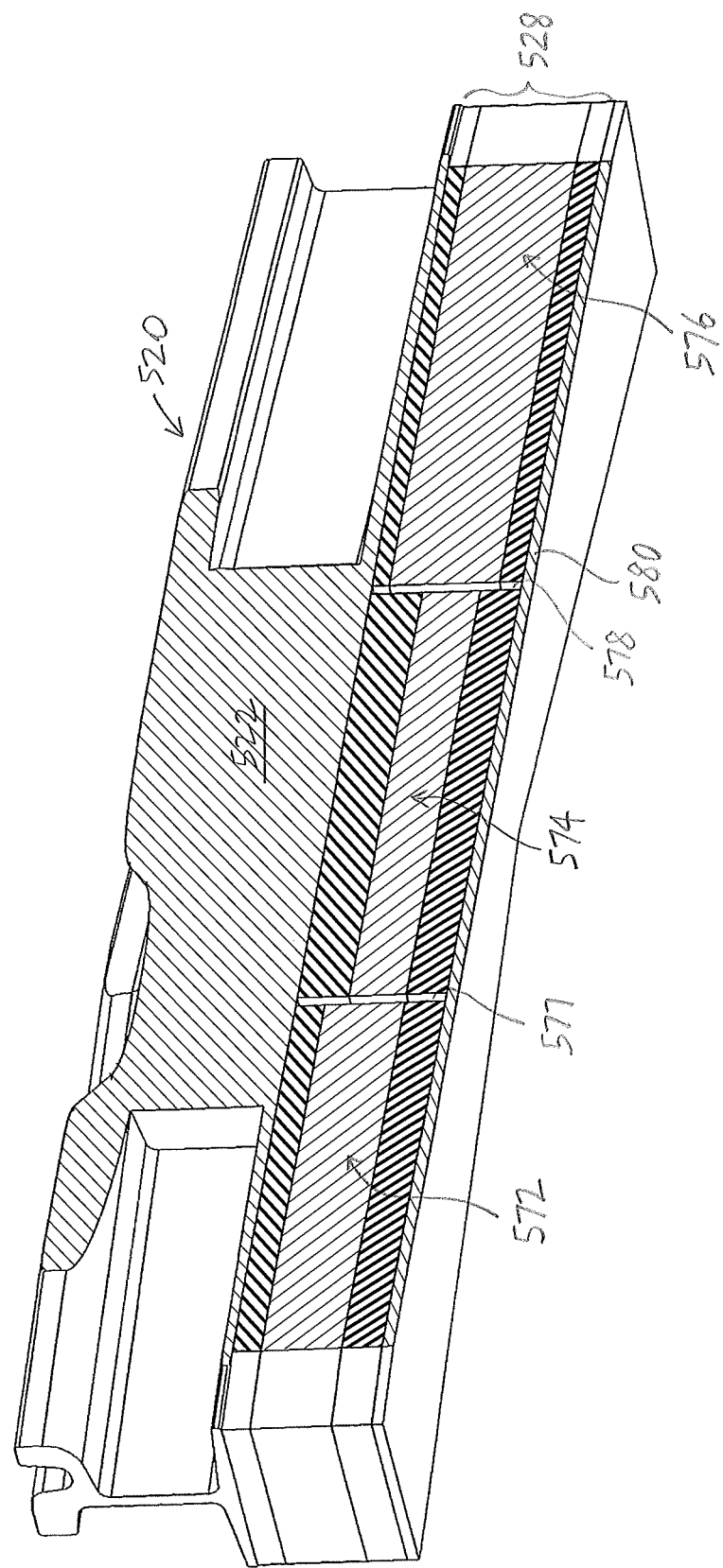
FIG. 11B is an isometric view of a longitudinal section of the special trackwork assembly of FIG. 11A.
Figure 12:
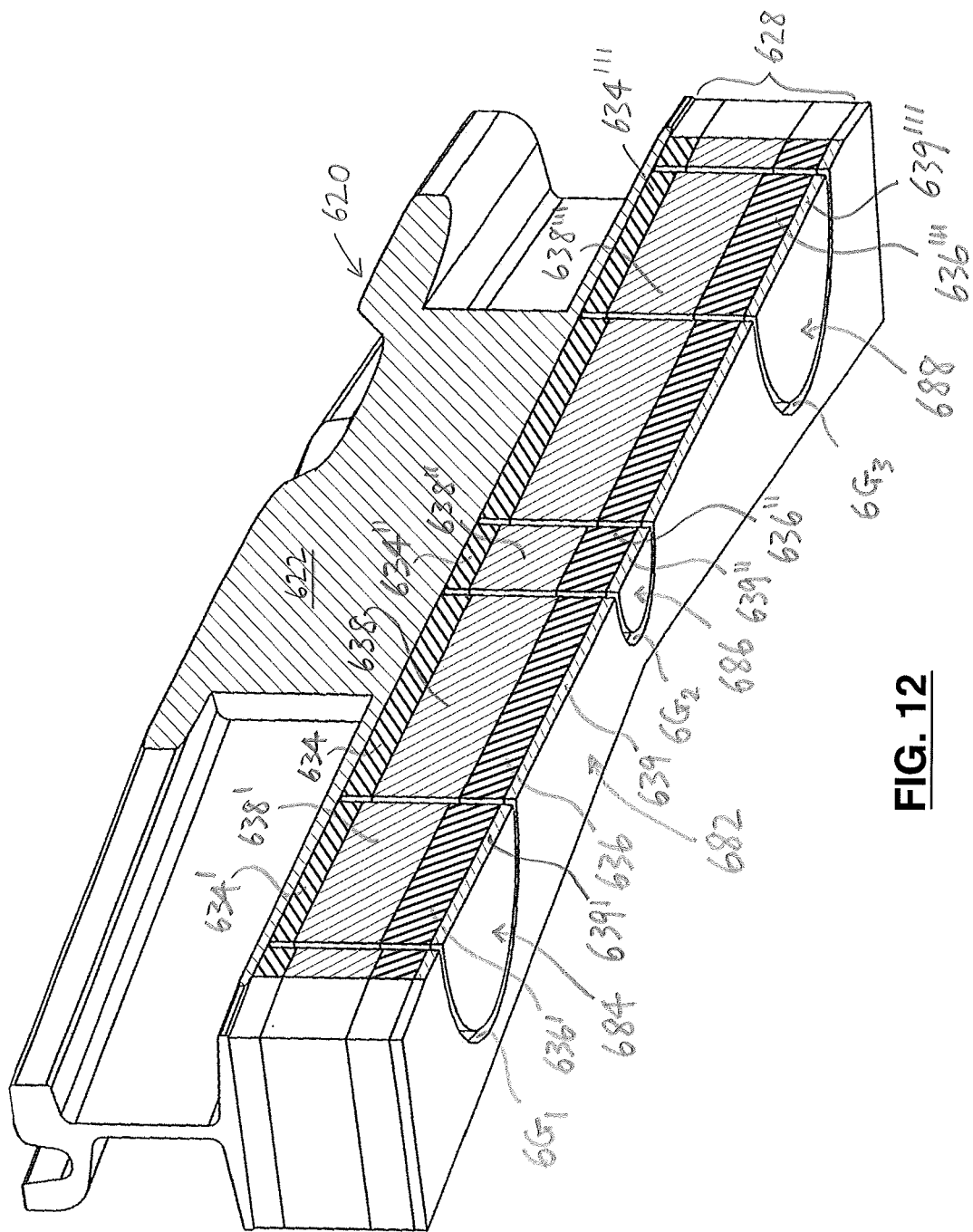
FIG. 12 is an isometric view of a longitudinal section of another embodiment of the special trackwork assembly of the invention.

Another alternative embodiment of the special trackwork assembly 520 includes a tuned mass damper subassembly 528 that includes three tuned mass dampers, identified respectively by reference numerals 572, 574, and 576 (FIGS. 11A, 11B). The special trackwork assembly 520 preferably includes the special trackwork body 522. As can be seen in FIGS. 11A and 11B, each of the first, second, and third tuned mass dampers 572, 574, 576 includes upper and lower layers that have different thicknesses respectively. The damper mass in each of the first, second and third tuned mass dampers 572, 574, 576 also has a slightly different thickness. The upper and lower layers of the resilient material in the first tuned mass damper 572 are identified by reference numerals 534, 536, and the damper mass is identified by the reference numeral 538.

In the second tuned mass damper 574, upper and lower layers 534', 536' are separated by a damper mass 538'. In the third tuned mass damper, the upper and lower layers 534", 536" are separated by a damper mass 538".

The first and second tuned mass dampers 572, 574 are separated by a gap 577, and the second and third tuned mass dampers 574, 576 are separated by a second gap 578. Each of the first, second, and third tuned mass dampers 572, 574, 576 is tuned to dampen respective vibrations at one or more frequencies respectively.

Preferably, a base plate 580 is included in the special trackwork assembly 520 and engages all of the tuned mass dampers 572, 574, 576. As noted above, the base plate 580 is optional.

Another alternative embodiment of the special trackwork assembly 620 is illustrated in FIG. 12. The special trackwork assembly 620 preferably includes the special trackwork body 622. In this embodiment, a tuned mass damper subassembly 628 preferably includes first through fourth tuned mass dampers thereof, identified by reference numbers 682, 684, 686, and 688 respectively. Preferably, the first tuned mass damper 682 includes upper and lower layers 634, 636 separated by a damper mass 638.

It is also preferred that the second tuned mass damper 684 includes upper and lower layers 634', 636' separated by a damper mass 638'. Similarly, the third tuned mass damper 686 preferably includes upper and lower layers 634", 636" separated by a damper mass 638". The fourth tuned mass damper 688 preferably also includes upper and lower layers 634''', 636''' and a damper mass 638''' located therebetween.

It will be understood that the upper and lower layers of each of the tuned mass dampers may or may not have the same thickness, and the damper mass (preferably, steel) in each of the tuned mass dampers 682, 684, 686, 688 also may or may not have the same thickness.

In one embodiment, the special trackwork assembly 620 preferably includes first, second, third and fourth base plates 639, 639', 369", 369'" respectively, secured to the respective tuned mass dampers 682, 684, 686, 688, (FIG. 12). It will be understood that the base plates 639, 639', 369", 369'" are optional.

The first and second tuned mass dampers 682, 684 are separated by a gap identified in FIG. 12 as 6G$_1$. The first and third tuned mass dampers 682, 686 are separated by a gap identified as 6G$_2$, and the first and fourth tuned mass dampers 682, 688 are separated by a gap identified as 6G$_3$. It will be understood that, at their respective upper ends (not shown), the first through fourth tuned mass dampers 682, 684, 686, and 688 are secured to the special trackwork body 622. Those skilled in the art would appreciate that each of the tuned mass dampers 682, 684, 686, 688 is tuned to dampen vibrations at a different frequency respectively.

Figure 13:
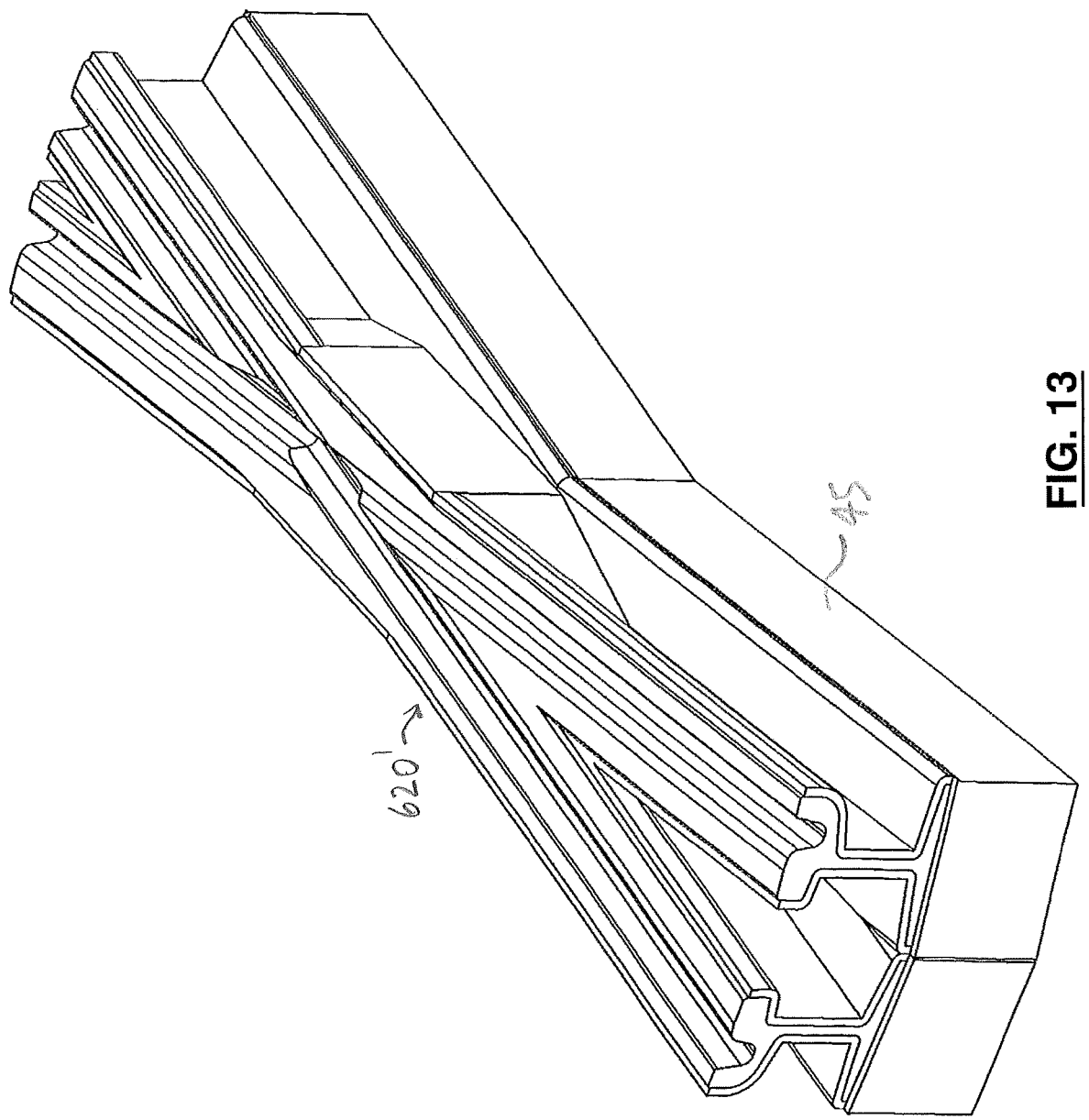
FIG. 13 is an isometric view of the special trackwork assembly of FIG. 12, encapsulated in rubber.

The special trackwork assemblies 320, 420, 520, 620 are illustrated without rubber encapsulation. It will be understood that the special trackwork assembly of the invention may be provided with or without a rubber encapsulation. A special trackwork assembly 620' of the invention, with the rubber encapsulation 45, is illustrated in FIG. 13.

Figure 14B:
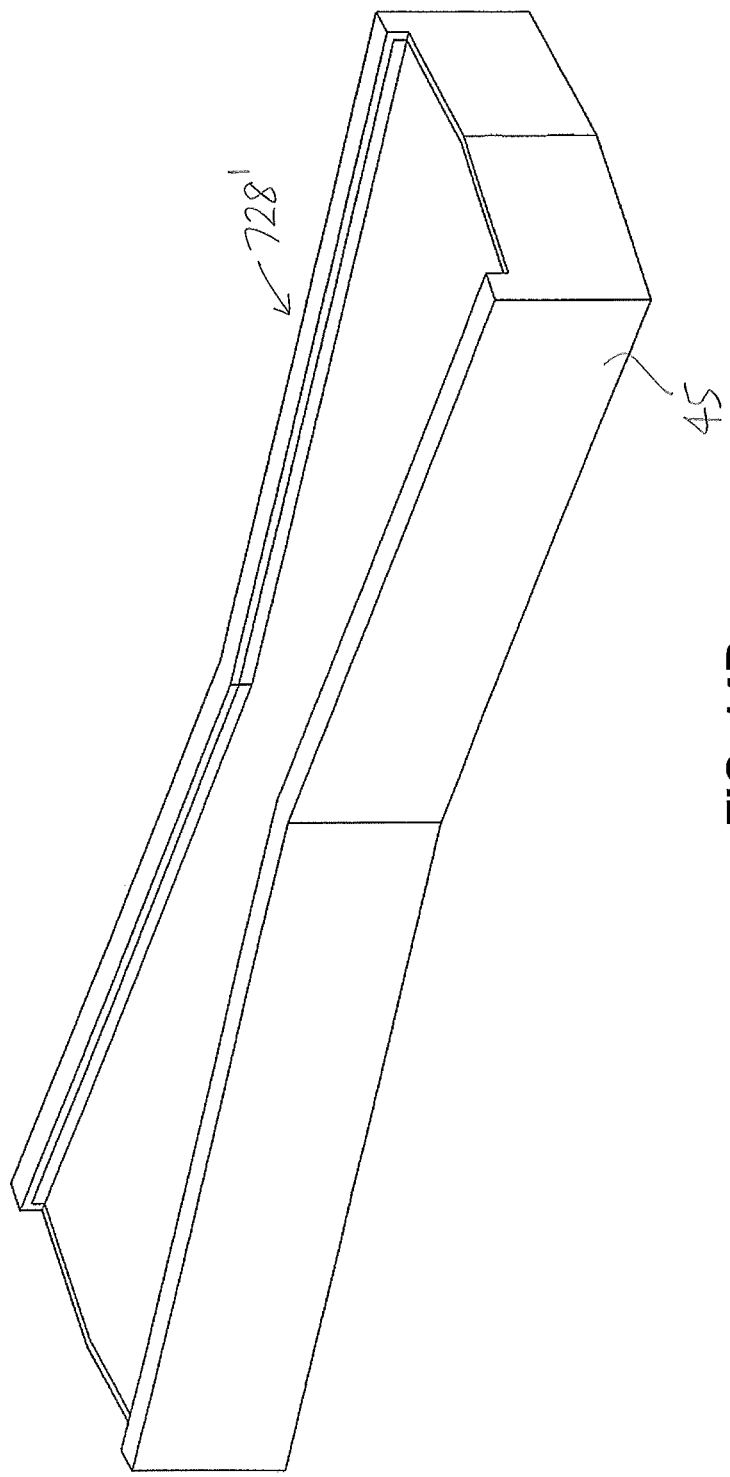
FIG. 14B is another isometric view of the tuned mass damper assembly of FIG. 14A, encapsulated in rubber.

It will be understood that the invention also includes embodiments in which the tuned mass damper of the invention is configured for use with a special trackwork body. Different embodiments of the tuned mass damper of the invention are illustrated in FIGS. 14A-19B. The tuned mass damper 728 (FIGS. 14A, 14B) is for dampening vibrations of a special trackwork body (not shown in FIGS. 14A, 14B) as train wheels roll over the special trackwork body. Preferably, the tuned mass damper 728 includes one or more resilient elements 734, 736 made of resilient material(s), and one or more non-resilient elements 738 made of non-resilient material(s) (FIGS. 14A, 14B). As described above, the resilient elements 734, 736 and the non-resilient element 738 are formed to dampen the vibrations of the special trackwork body 22 (not shown in FIGS. 14A, 14B) when the tuned mass damper 728 is secured to the special trackwork body. A base plate 739 is optional (FIGS. 14A, 14B).

It will be understood that the tuned mass damper subassembly 728' illustrated in FIG. 14B is the same as the tuned mass damper subassembly 728 that is illustrated in FIG. 14A, except that the tuned mass damper subassembly 728' is encapsulated in rubber, identified by reference numeral 45 in FIG. 14B.

Figure 15:
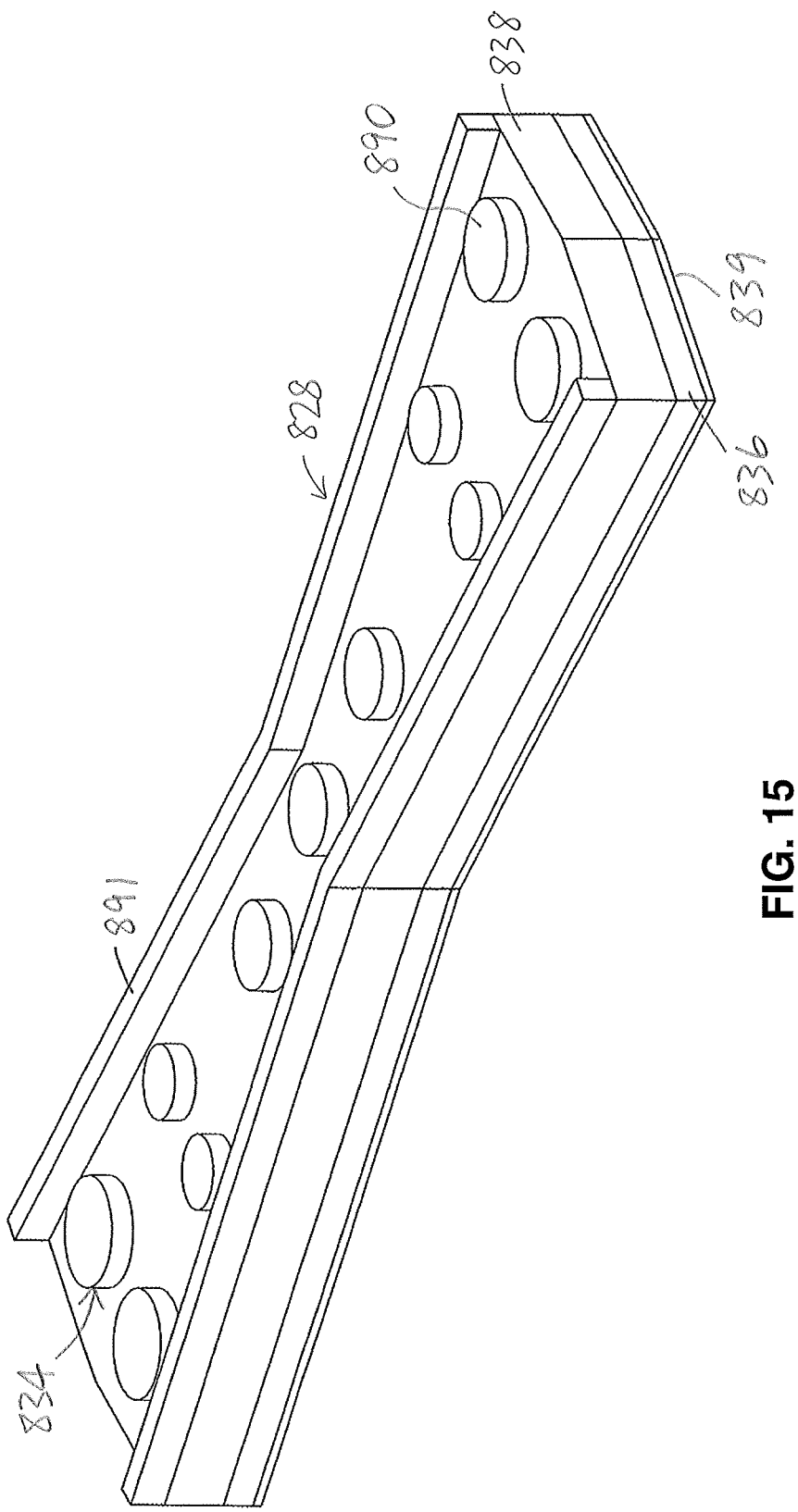
FIG. 15 is an isometric view of another alternative embodiment of the tuned mass damper assembly of the invention.

An alternative embodiment of the tuned mass damper subassembly 828 of the invention is illustrated in FIG. 15. The tuned mass damper 828 preferably includes upper and lower layers 834, 836 of resilient material(s) separated by a damper mass 838 of any suitable generally non-resilient material, e.g., steel. As can be seen in FIG. 15, the upper layer 834 preferably includes a number of elements 890 that are positioned to engage the special trackwork body (not shown in FIG. 15). The intermediate elements 890 preferably are positioned on the damper mass 838. Preferably, the elements 890 are made of any suitable resilient material, e.g., rubber. As illustrated, the lower layer 836 may be made of any suitable resilient material, e.g., a suitable foam material. It is also preferred that the tuned mass damper subassembly 828 includes a guide element 891, for guiding the special trackwork (not shown in FIG. 15) into position, to engage the tuned mass damper subassembly 828 properly, i.e., when the special trackwork body is mounted onto the tuned mass damper subassembly 828. A base plate 839 is optional.

Figure 16:
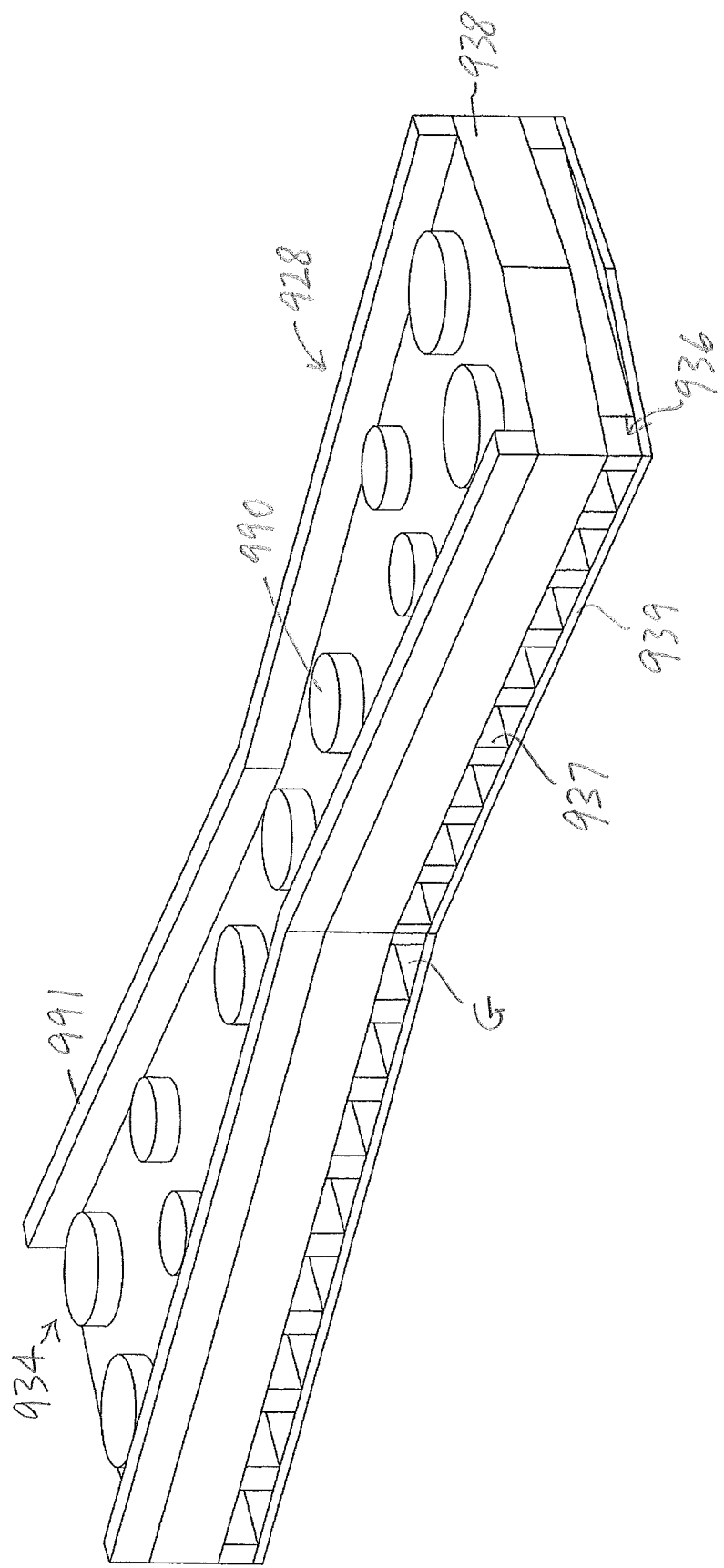
FIG. 16 is an isometric view of another embodiment of the tuned mass damper assembly of the invention.

As can be seen in FIG. 16, a tuned mass damper subassembly 928 illustrated therein is similar to the tuned mass damper subassembly 828 illustrated in FIG. 15. The primary difference between the tuned mass dampers 928 and 828 is that the tuned mass damper 928 has a lower layer 936 that includes strips 937 of rubber or any other suitable resilient material spaced apart from each other to define element gaps "G" therebetween.

As can also be seen in FIG. 16, the tuned mass damper 928 preferably also includes an upper layer 934 and a damper mass 938 positioned between the upper and lower layers 934, 936. The upper layer 934 includes elements 990. The tuned mass damper subassembly 928 preferably includes a guide element 991. A base plate 939 is optional.

Figure 17A:
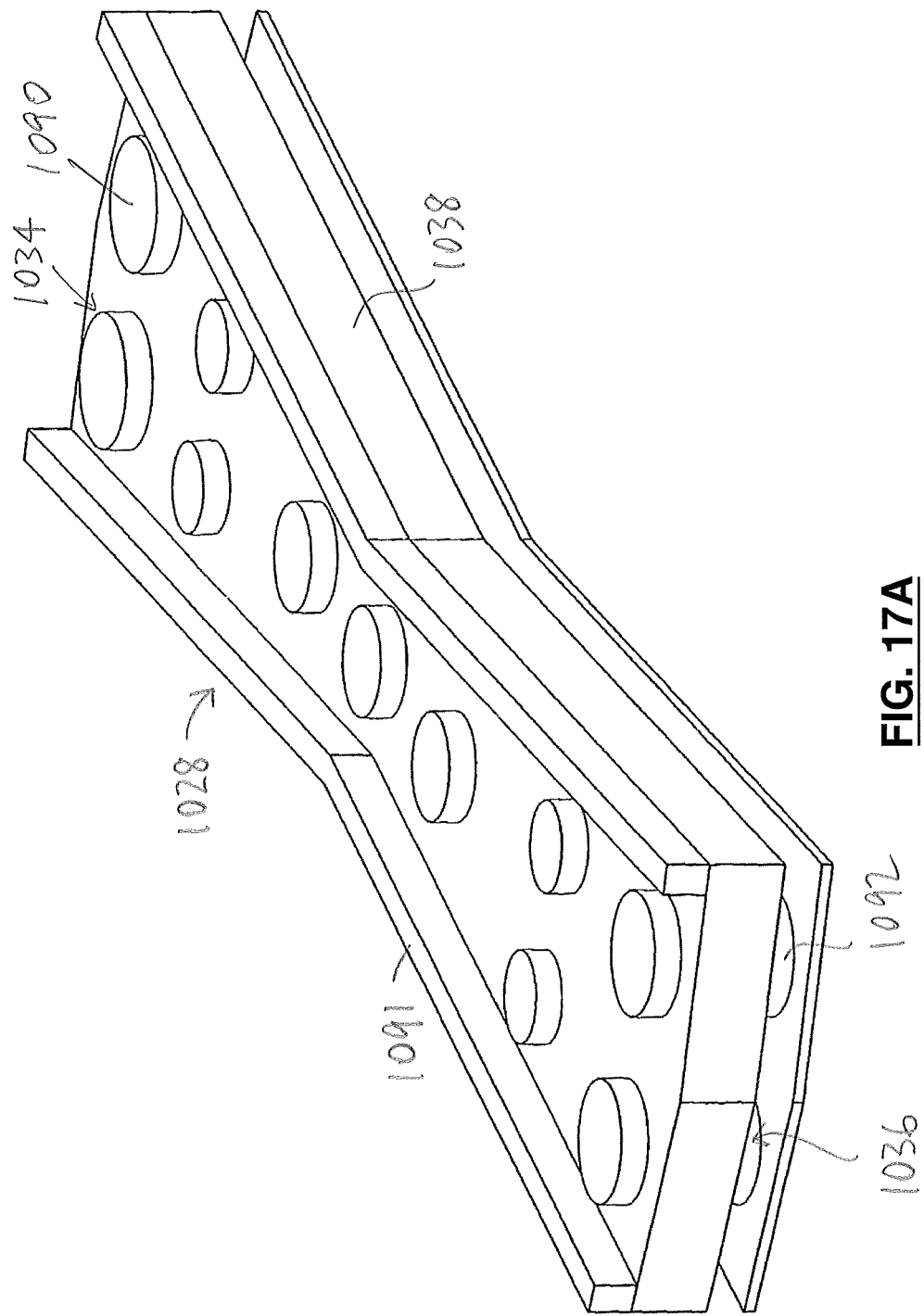
FIG. 17A is an isometric view of another embodiment of the tuned mass damper assembly of the invention.
Figure 17B:
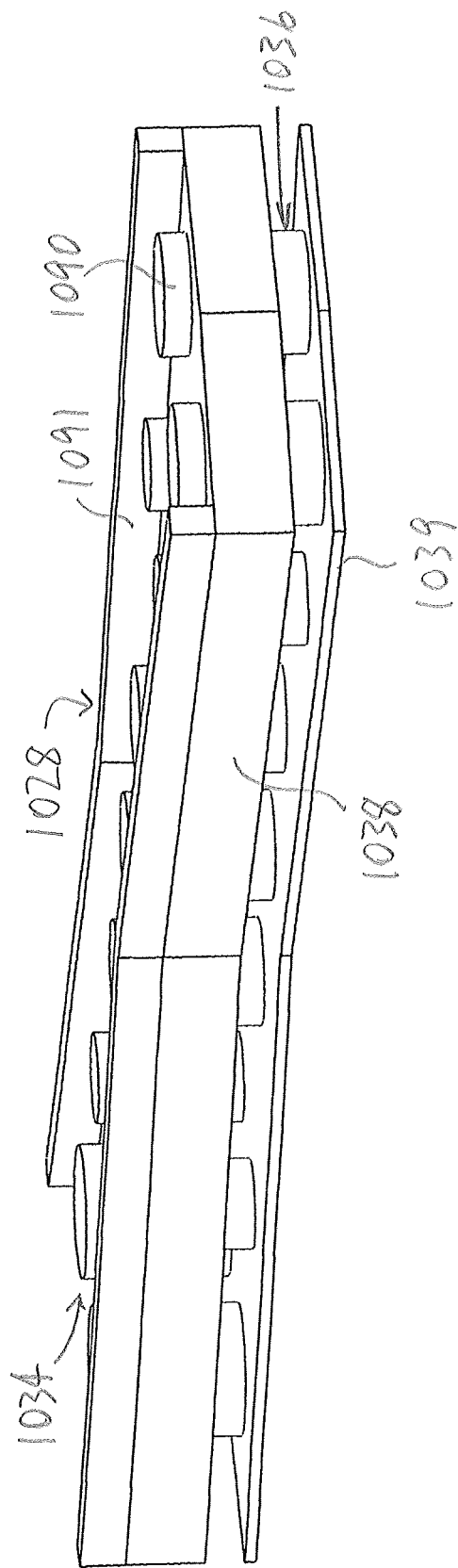
FIG. 17B is another isometric view of the tuned mass damper assembly of FIG. 17A.

An alternative embodiment of the tuned mass damper subassembly 1028 is illustrated in FIGS. 17A and 17B. The tuned mass damper subassembly 1028 preferably includes an upper layer 1034 with elements 1090, and a lower layer 1036. In this embodiment, the lower layer 1036 preferably includes a number of elements 1092 that are similar to the elements 1090 of the upper layer 1034, in that they are disc-like elements made of a resilient material. Preferably, the elements 1092 and the elements 1090 are made of any suitable resilient material. For example, the elements 1092 and the elements 1090 may be made of a suitable rubber. The tuned mass damper 1028 preferably also includes a mass 1038 positioned between the upper and lower layers 1034, 1036. The tuned mass damper subassembly 1028 preferably also includes a guide element 1091. A base plate 1039 is optional.

Figure 18:
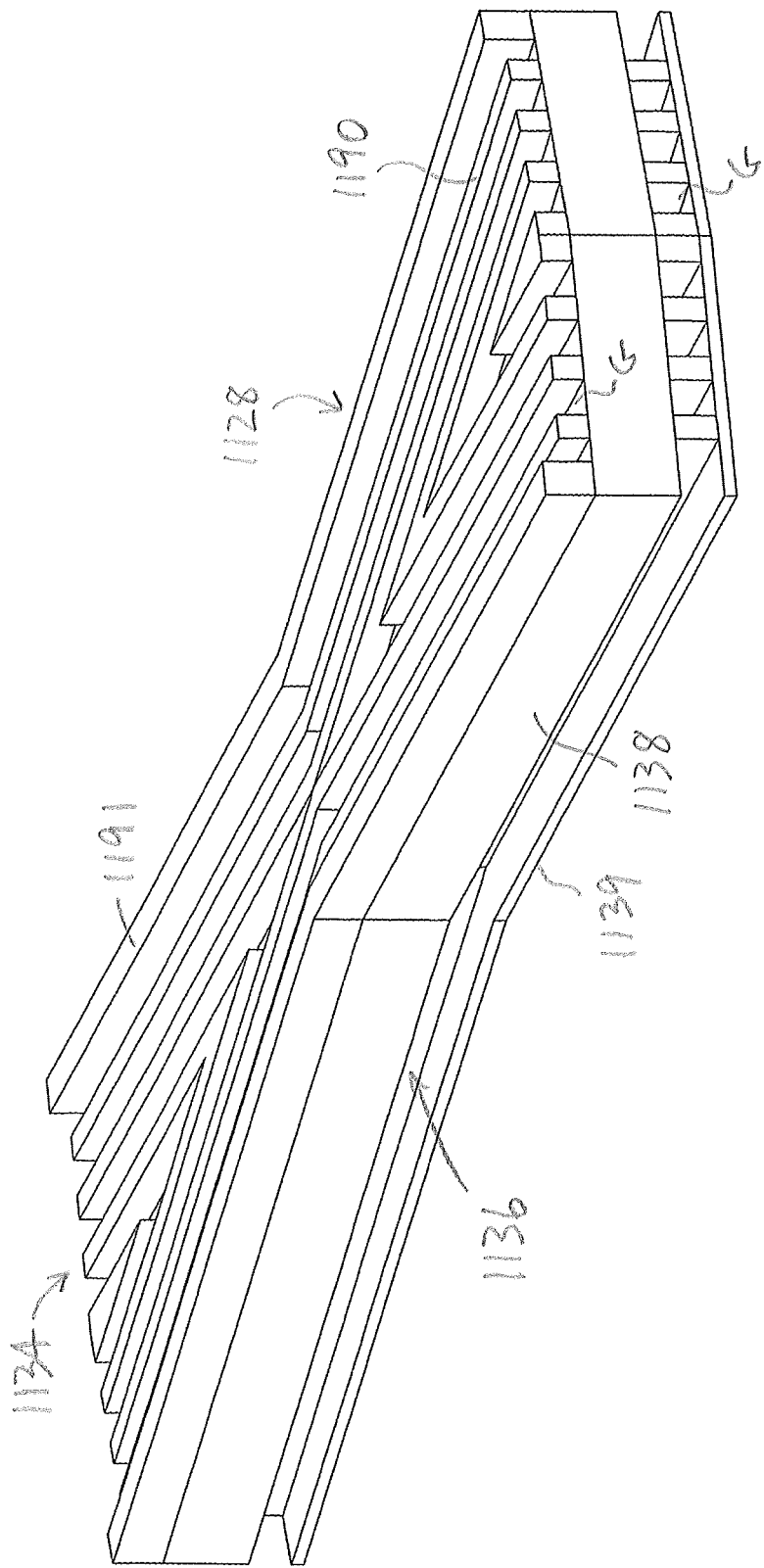
FIG. 18 is an isometric view of another embodiment of the tuned mass damper assembly of the invention.

Another alternative embodiment of the tuned mass damper subassembly 1128 includes a tuned mass damper 1128 is illustrated in FIG. 18. In this embodiment, an upper layer 1134 includes elements 1190 that are strips of rubber or any other suitable resilient material, defining element gaps "G" therebetween. Also, a lower layer 1136 of the tuned mass damper 1128 includes strips of rubber or any other suitable resilient material that also define element gaps "G" therebetween. Preferably, the upper layer 1134 and the lower layer 1136 are made of a suitable resilient material. The tuned mass damper 1128 preferably also includes a mass 1138 located between the upper layer 1134 and the lower layer 1136. It is also preferred that the tuned mass damper subassembly 1128 includes a guide element 1191. A base plate 1139 is optional.

Those skilled in the art would appreciate that the tuned mass dampers, and the special trackwork assemblies, are relatively heavy once they have been assembled.

Figure 19A:
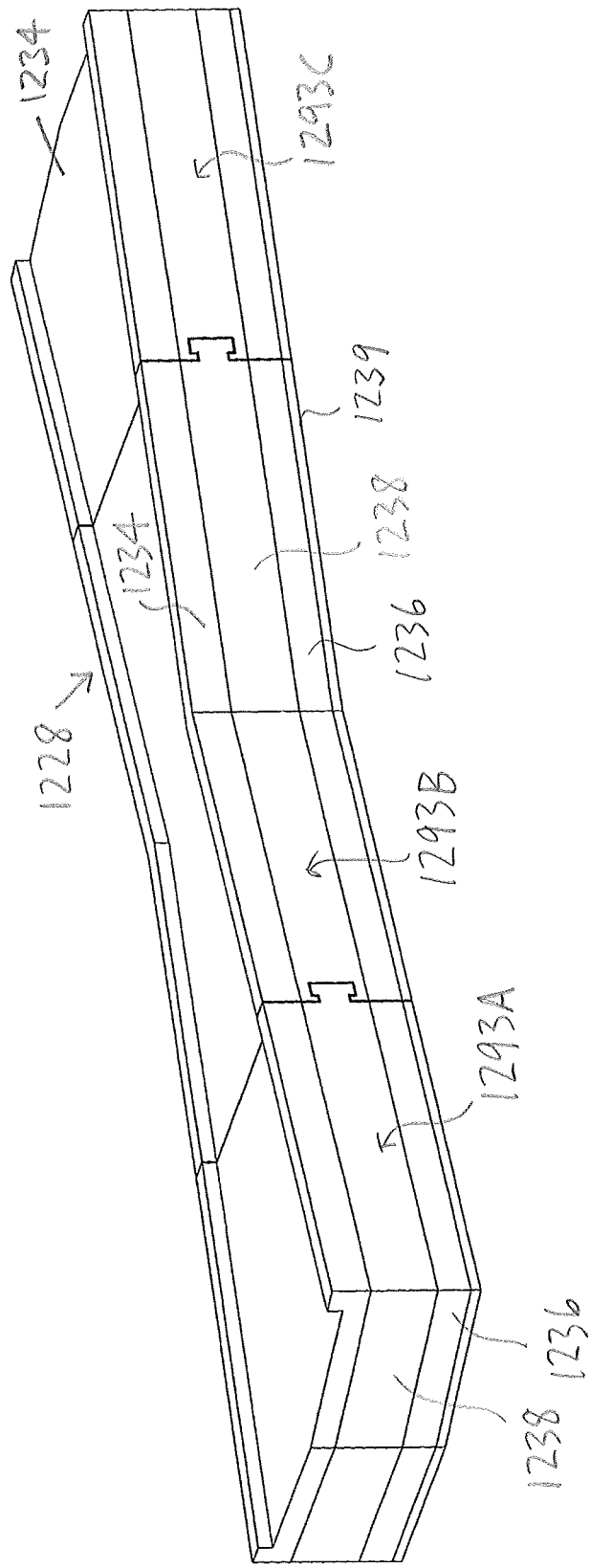
FIG. 19A is an isometric view of another embodiment of the tuned mass damper assembly of the invention, in an assembled condition.
Figure 19B:
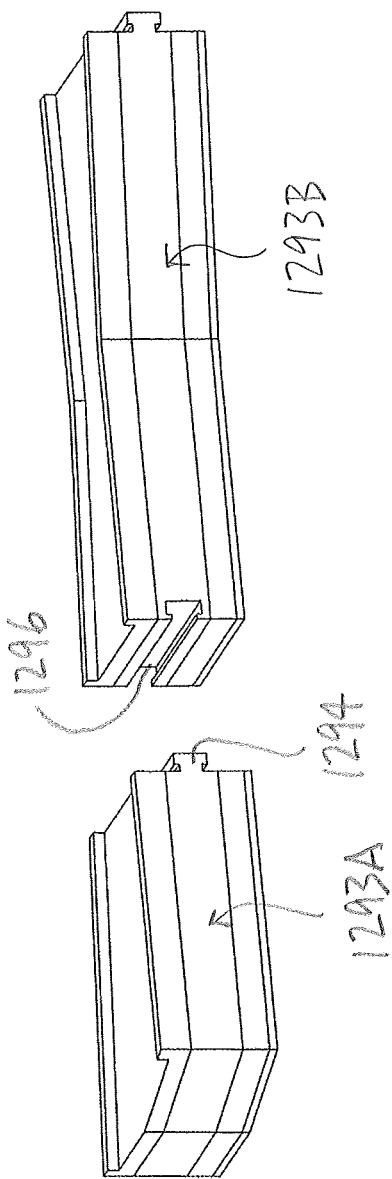
FIG. 19B is an isometric view of the tuned mass damper assembly of FIG. 19A, in a disassembled condition.

An alternative embodiment of the tuned mass damper subassembly 1228 is disclosed in FIGS. 19A and 19B. In this embodiment, the tuned mass damper subassembly 1228 is formed when three segments 1293A, 1293B, 1293C are fitted together, in an assembled condition. The tuned mass damper subassembly 1228 is illustrated in the assembled condition in FIG. 19A. As can be seen in FIG. 19A, when the segments 1293A, 1293B, and 1293C are in the assembled condition, a tuned mass damper 1228 is formed. The tuned mass damper 1228 preferably has an upper layer 1234, a lower layer 1236, and a mass damper 1238 positioned between the upper and lower layers 1234, 1236. The tuned mass damper 1228 is also illustrated, in an unassembled condition, in FIG. 19B. Preferably, the tuned mass damper 1228 includes suitable means for connecting the segments thereof together. For example, such means may include a tab 1294 that cooperatively fits into a slot 1296 in a neighboring segment (FIGS. 19A, 19B). A base plate 1239 is optional.

Figure 20A:
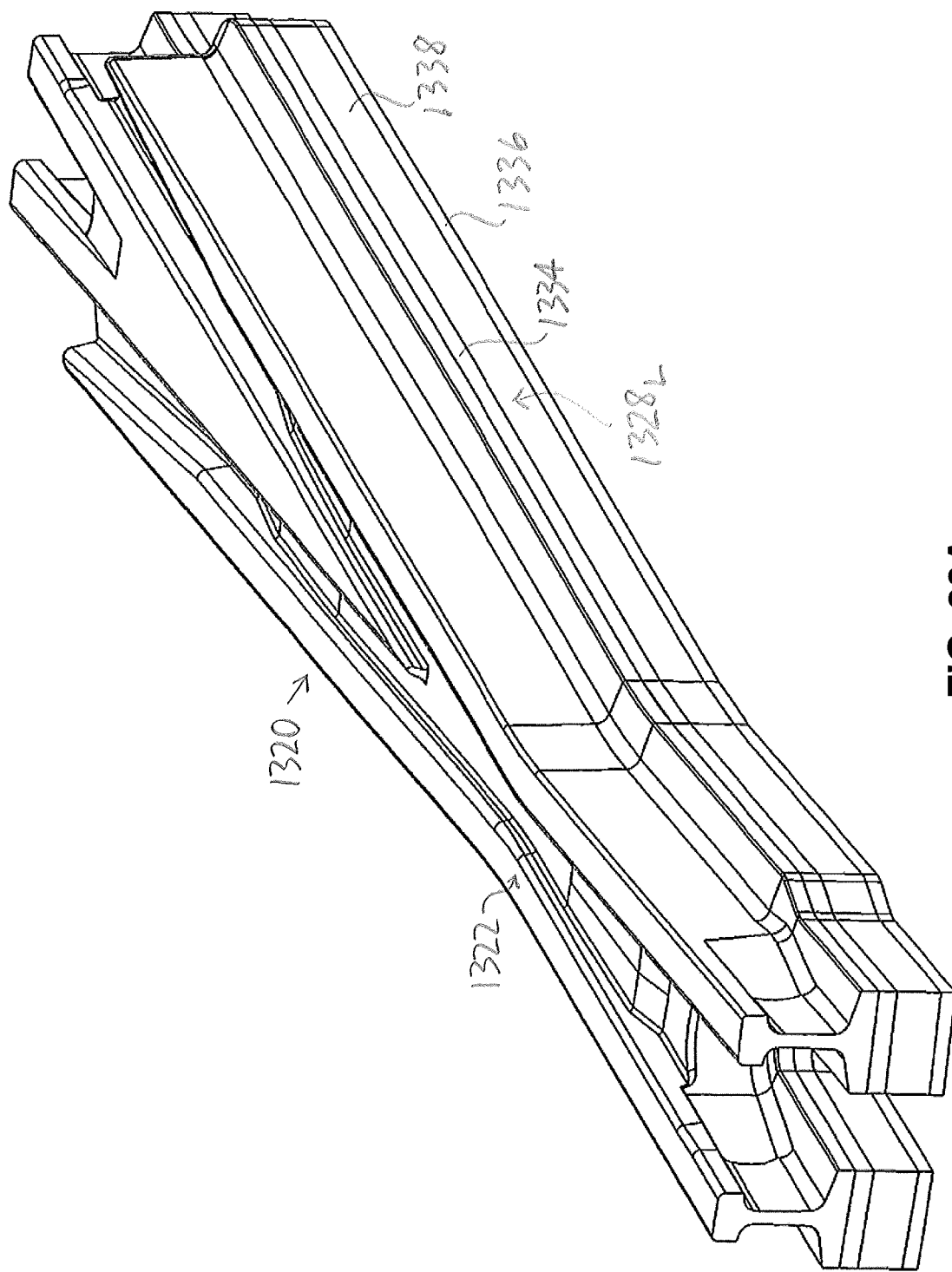
FIG. 20A is an isometric view of another alternative embodiment of the special trackwork assembly of the invention.
Figure 20B:
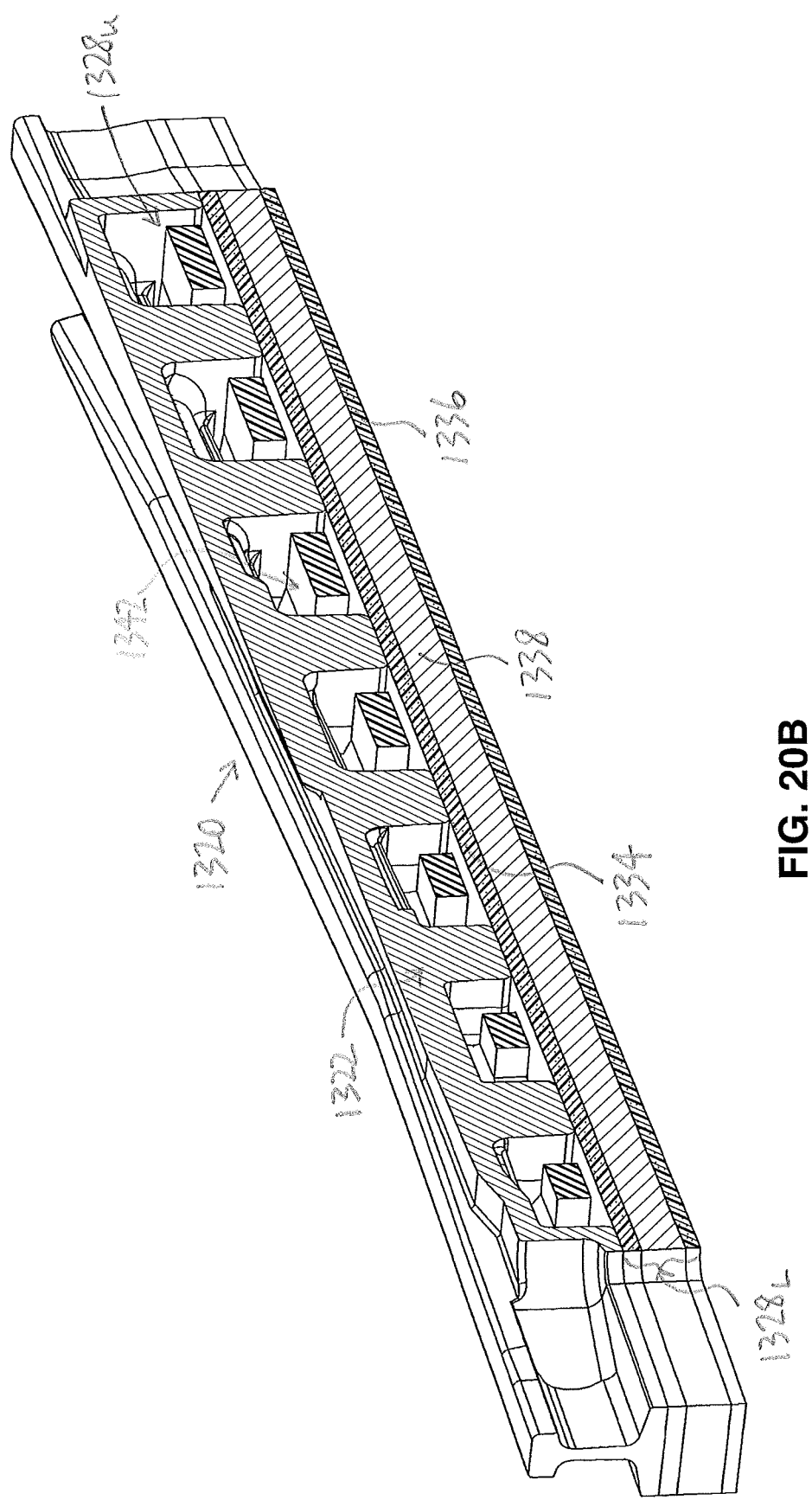
FIG. 20B is a longitudinal section of the special trackwork assembly of FIG. 20A.

An embodiment of the special trackwork assembly 1320 (including a special trackwork body 1322) is illustrated in FIGS. 20A and 20B. As can be seen in those views, the special trackwork assembly 1320 does not include a base plate. Preferably, the special trackwork assembly 1320 includes a lower tuned mass damper $1328_L$ that includes upper and lower layers 1334, 1336 of resilient material(s) and a damper mass 1338 positioned therebetween.

As can be seen in FIG. 20B, the special trackwork assembly 1320 preferably also includes an upper tuned mass damper subassembly $1328_U$, which includes a number of internal mass dampers 1342.

Figure 21A:
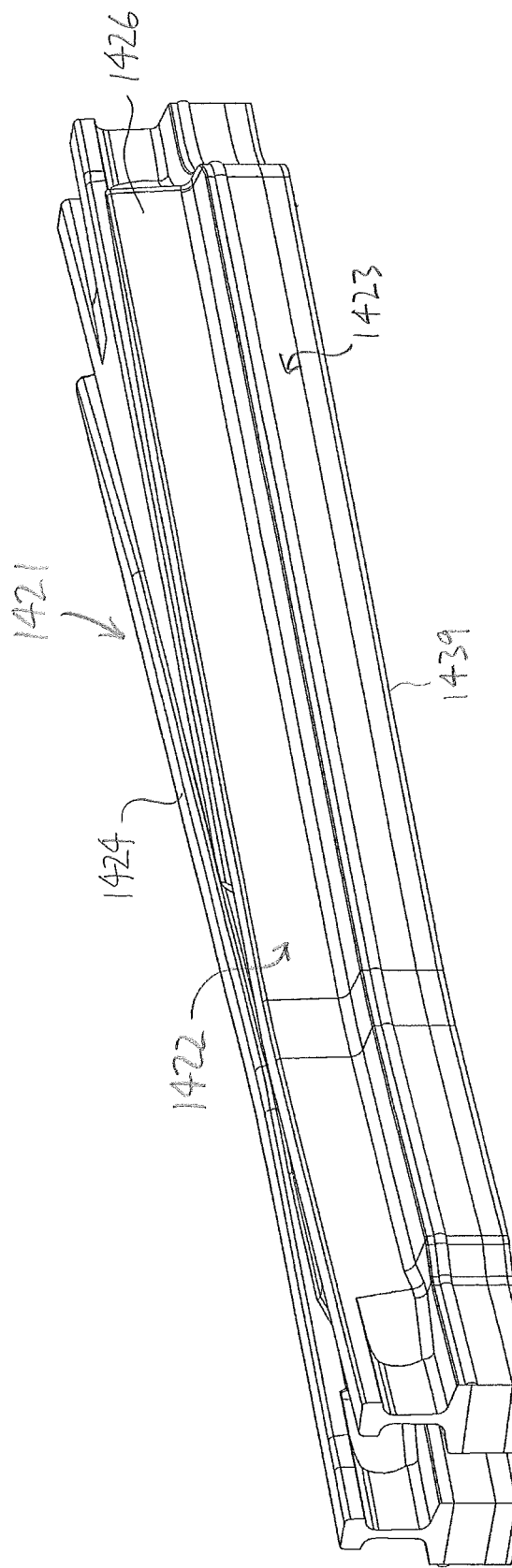
FIG. 21A is an isometric view of another alternative embodiment of the special trackwork assembly of the invention.
Figure 21B:
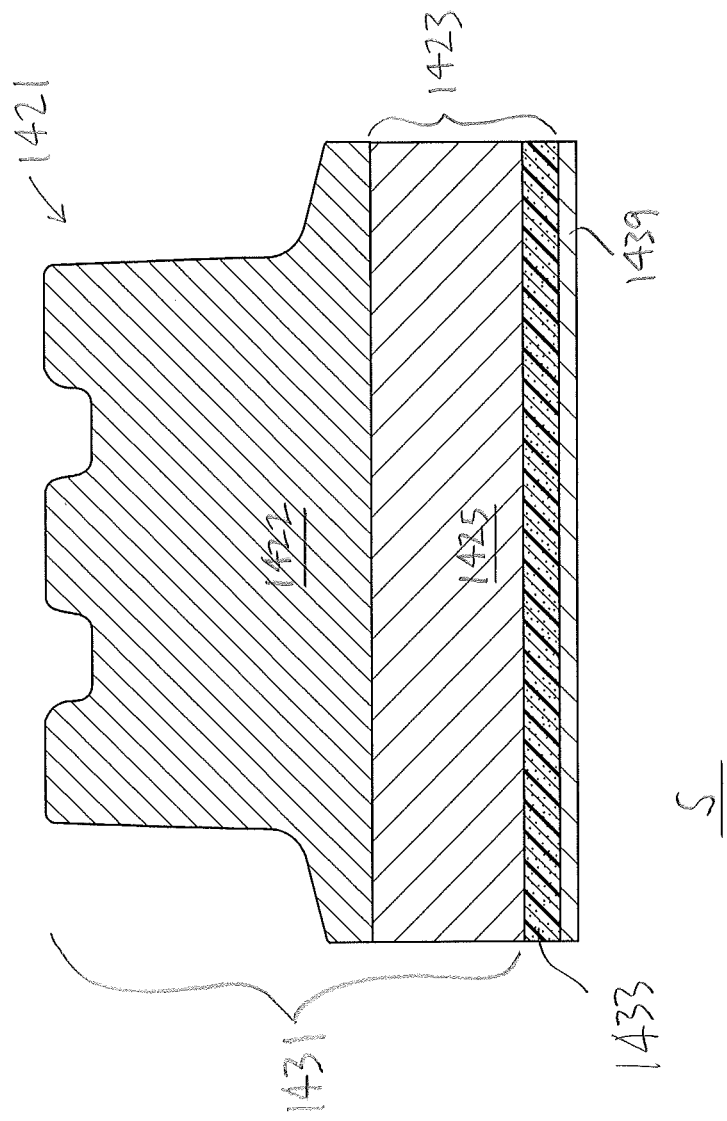
FIG. 21B is a cross-section of the special trackwork assembly of FIG. 21A, drawn at a larger scale.
Figure 21C:
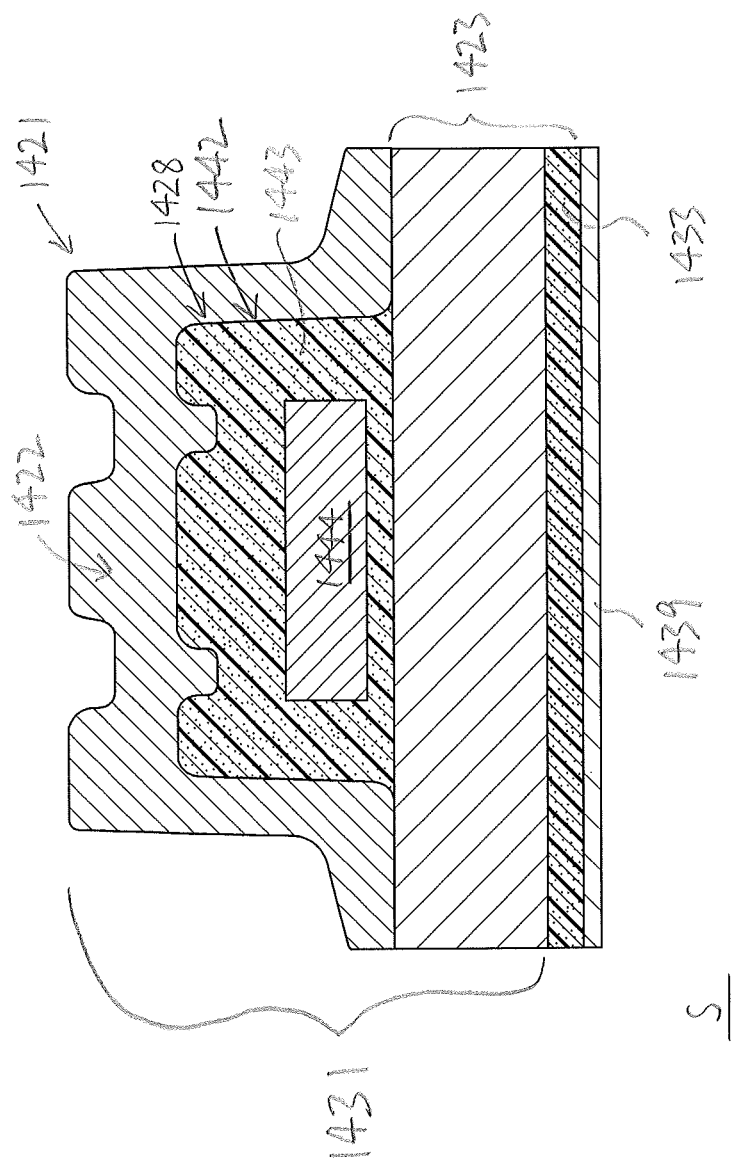
FIG. 21C is a cross-section of an alternative embodiment of the special trackwork assembly of FIG. 21A.

The invention includes embodiments thereof in which a vibration isolator is coupled with a special trackwork body to at least partially dissipate traffic-related vibrations. These embodiments are illustrated in FIGS. 21A-25C. In one embodiment, a special trackwork assembly 1421 of the invention that is connected to a surrounding structure "S" (FIGS. 21B, 21C) preferably includes a vibration isolator 1423 and a special trackwork body 1422 for supporting wheels of a train (not shown) moving over a running surface portion 1424 of an exterior surface 1426 of the special trackwork body 1422 that generate traffic-related vibrations in the surrounding structure "S", in the absence of the vibration isolator 1423, at a dominant frequency (FIG. 21A). Preferably, the special trackwork assembly 1421 also includes the vibration isolator 1423, which has one or more non-resilient isolator elements 1425 (FIGS. 21B, 21C). As will be described, the non-resilient isolator element 1425 preferably has a predetermined isolator mass that is bonded with the special trackwork body 1422 to form a combined body 1431 having a preselected total body mass. Preferably, the vibration isolator 1423 also includes one or more resilient isolator elements 1433 at least partially supporting the combined body 1431. It is preferred that the resilient isolator element 1433 has a preselected isolator stiffness that is selected to permit the combined body 1431 and the resilient isolator element 1433 to vibrate, in response to movement of the train wheels over the running surface portion 1424, to at least partially isolate the surrounding structure "S" from the traffic-related vibrations, at a predetermined isolation frequency that is equal to or less than the dominant frequency.

An embodiment of the special trackwork assembly 1421 is illustrated in FIG. 21B. The non-resilient isolator element 1425 may be made of any suitable material. For instance, the non-resilient isolator element 1425 may be steel, as shown in FIG. 21B. The non-resilient isolator element 1425 may be bonded to the special trackwork body 1422 in any suitable manner. For instance, in one embodiment, the non-resilient isolator element 1425 preferably is welded to the special trackwork body 1422.

Preferably, the resilient isolator element 1433 is made of any suitable resilient material. For example, rubber or foam would be suitable resilient materials.

It is also preferred that the special trackwork assembly 1421 includes an optional base plate 1439, to protect the resilient isolator element 1433, especially during installation. It will be understood that the surrounding structure "S" may be any material or structure outside the special trackwork assembly 1421 engaged or connected (indirectly or otherwise) with the special trackwork assembly 1421. To the extent that the surrounding structure is isolated from the traffic-related vibrations, the surrounding structure is unaffected by such vibrations, i.e., the vibrations are not transmitted to the surrounding structure.

In the absence of the vibration isolator, the movement of the train wheels over the running surface portion of the special trackwork body results in traffic-related vibrations generated in the surrounding structure that have a peak amplitude at a dominant (or "critical") frequency. The peak amplitude and the dominant frequency may be determined in various ways, as would be appreciated by those skilled in the art. An isolation frequency is then determined according to the dominant frequency using methods known to those skilled in the art. The isolation frequency is equal to or less than the dominant frequency, and is lower than a natural frequency of the main system.

As can be seen in FIG. 28, the special trackwork body as installed, in the absence of the vibration isolator, forms a main system "M" that has a main natural frequency. The vibration isolator is added to the main system "M" (i.e., the main system being the special trackwork as installed, but in the absence of the vibration isolator) to lower the main natural frequency of the main system by adding mass to it, and by lowering the stiffness thereof. The frequency can be lowered from the natural frequency to the predetermined isolation frequency by adding the isolator mass to the main system (i.e., to the special trackwork body), and by decreasing the stiffness of the main system, by adding the resilient isolator element to the main system. A modified main system is created by the addition of the vibration isolator to the special trackwork body. At the isolation frequency, the surrounding structure receives less traffic-related vibrations because the main natural frequency of the main system has been lowered, so that the surrounding structure "S" is at least partially isolated from the traffic-related vibrations.

The special trackwork assembly may include one or more tuned mass dampers, as well as the vibration isolator. In an alternative embodiment, and as can be seen in FIG. 21C, the special trackwork assembly 1421 preferably also includes a tuned mass damper 1428 that includes one or more internal tuned mass dampers 1442, i.e., in addition to the vibration isolator 1423. In one embodiment, the internal tuned mass damper 1442 preferably includes one or more resilient elements 1443 having a preselected stiffness and one or more non-resilient elements 1444 having a predetermined damper mass secured to the special trackwork body 1422 via the resilient element 1443. It will be understood that the vibration isolator and the main system "M" have a main combination natural frequency. Preferably, the preselected stiffness and the preselected damper mass are selected to permit the tuned mass damper 1442 to vibrate at a frequency of interest based on the main combination natural frequency of the vibration isolator and the main system, to at least partially dampen the traffic-related vibrations.

Those skilled in the art would appreciate that, in determining the parameters of the tuned mass damper that is to be included in a special trackwork assembly that also includes a vibration isolator, the effect of the vibration isolator on the traffic-related vibrations is taken into account. Similarly, those skilled in the art would also appreciate that, in determining the parameters of the vibration isolator that is to be included in a special trackwork assembly that also includes a tuned mass damper, the effect of the vibration isolator on the traffic-related vibrations is taken into account.

As noted above, in the absence of the vibration isolator, the special trackwork body as installed may be considered to be the main system, for the purposes of analyzing the traffic-related vibrations of the special trackwork body 22. In effect, once the vibration isolator is added to the special trackwork body, the combination of the special trackwork body and the vibration isolator may be considered another, "modified", main system. As also noted above, the modified main system vibrates at the isolation frequency, to at least partially isolate the surrounding structure "S" from the traffic-related vibrations. The modified main system may, when subjected to traffic-related vibrations, have a modified frequency of interest at which a peak amplitude of the traffic-related vibrations of the modified main system occurs. Accordingly, a tuned mass damper, tuned for the (modified) frequency of interest for the modified main system (i.e., the vibration isolator and the special trackwork body), may be added. The tuned mass damper dampens the traffic-related vibrations of the modified main system.

Figure 22A:
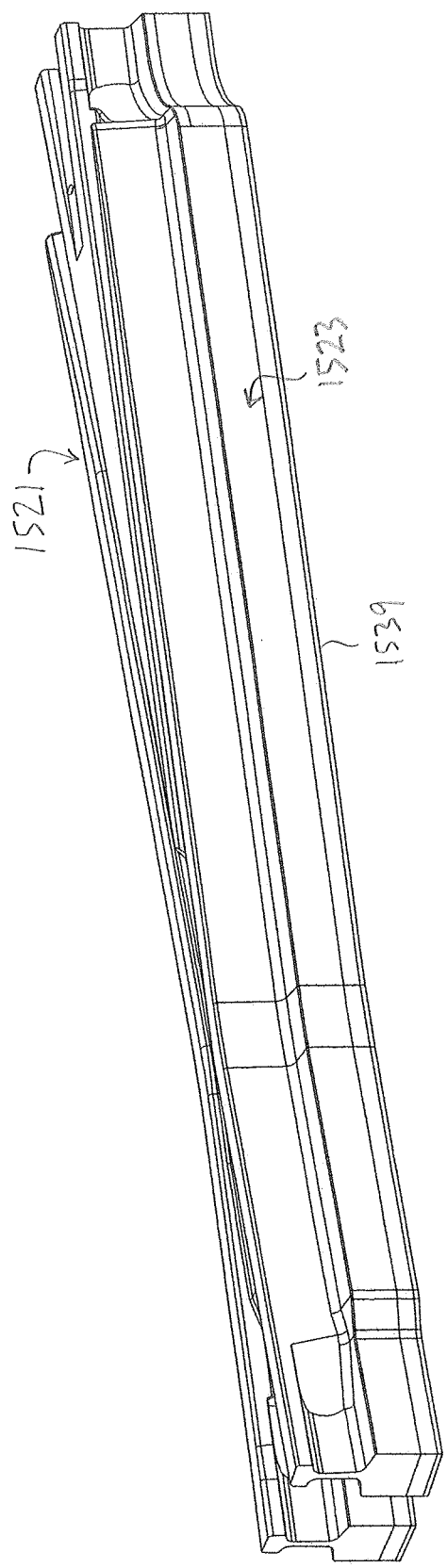
FIG. 22A is an isometric view of another alternative embodiment of the special trackwork assembly of the invention, drawn at a smaller scale.
Figure 22B:
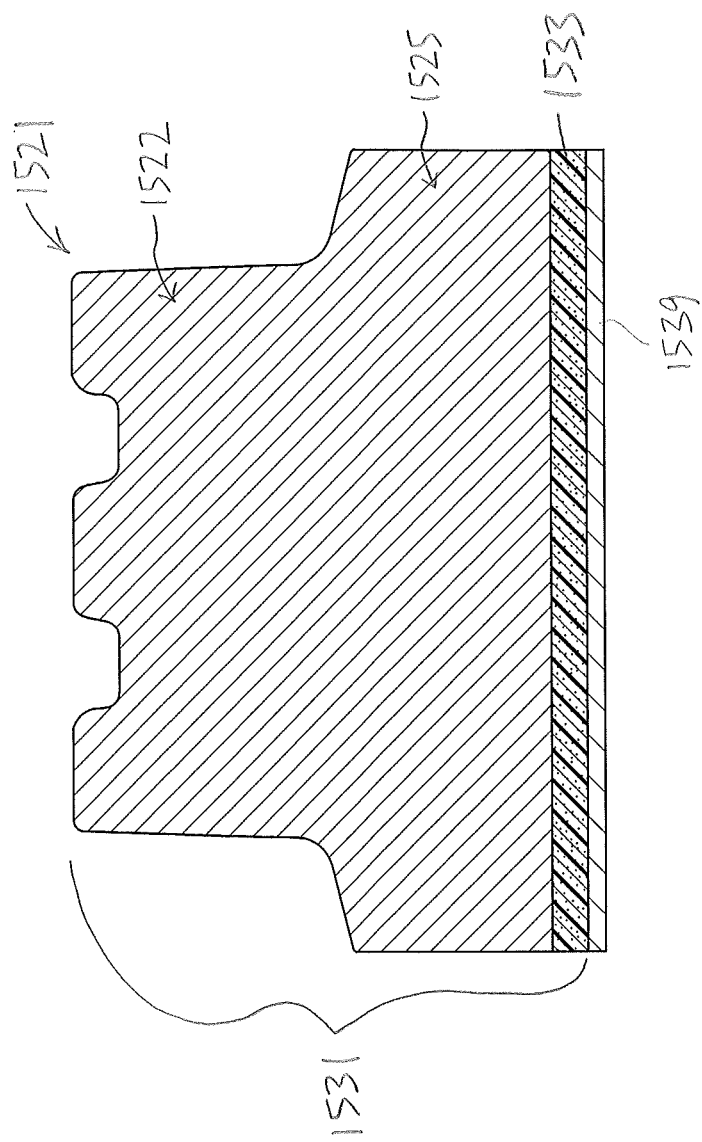
FIG. 22B is a cross-section of the special trackwork assembly of FIG. 22A, drawn at a larger scale.

As can be seen in FIGS. 22A and 22B, in one embodiment, a special trackwork assembly 1521 of the invention preferably includes a vibration isolator 1523 in which a combined body 1531 thereof preferably is formed as an integral element, e.g., by casting. The combined body 1531 preferably includes a special trackwork body portion 1522 and a non-resilient isolator element portion 1525. In addition, the vibration isolator 1523 preferably includes a resilient isolator element 1533. The total body mass of the combined body 1531 and a predetermined stiffness of the resilient element 1533 are determined so that the vibration isolator 1523 at least partially dissipates the traffic-related vibrations.

Figure 22C:
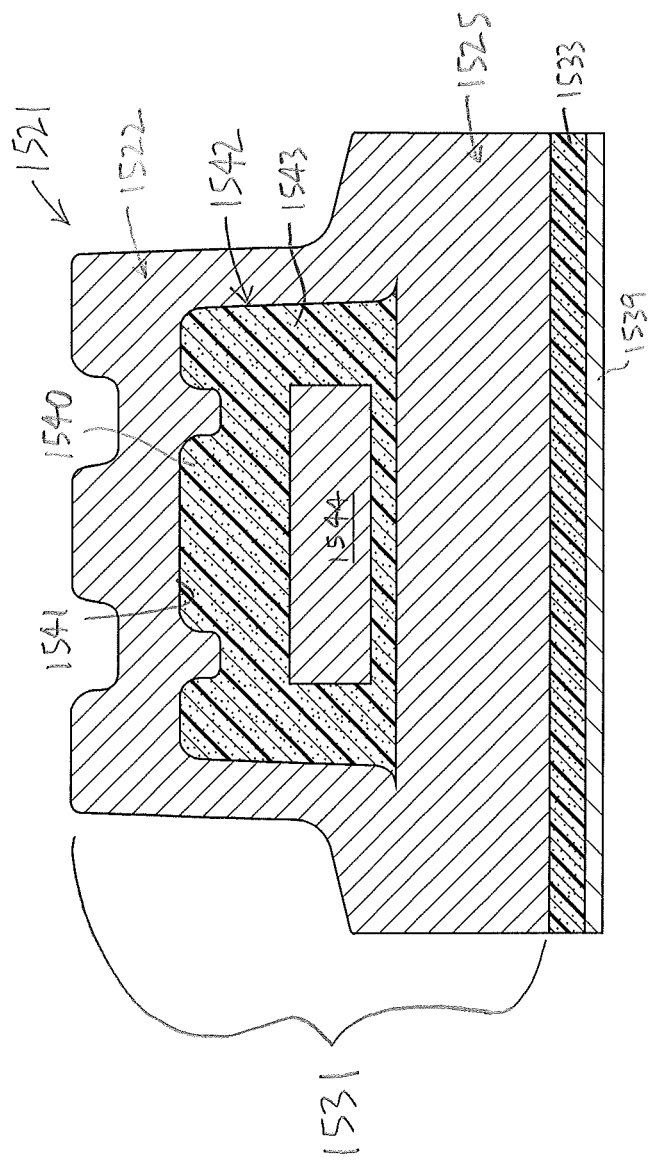
FIG. 22C is a cross-section of an alternative embodiment of the special trackwork assembly of FIG. 22A.
Figure 22D:
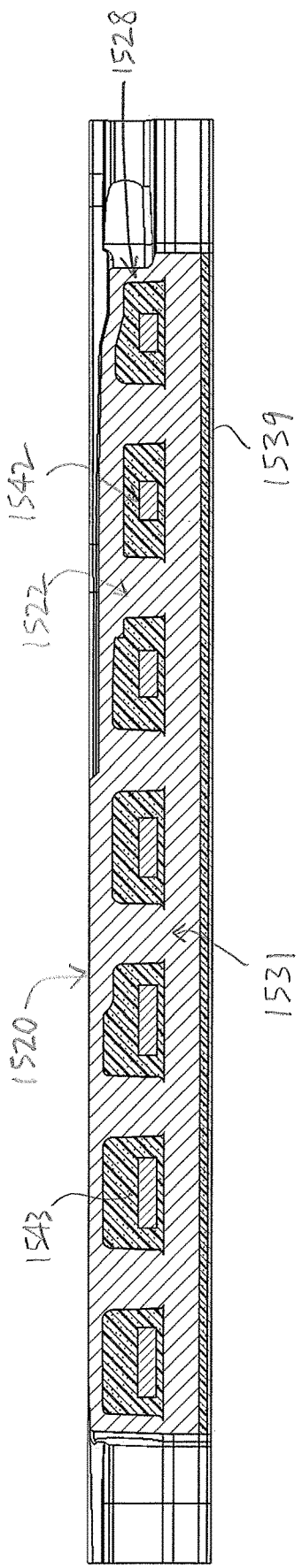
FIG. 22D is a longitudinal section of the special trackwork assembly of FIG. 22C, drawn at a smaller scale.

In one embodiment, the special trackwork assembly 1521 may include a tuned mass damper 1528. The tuned mass damper 1528 may include a number of internal tuned mass dampers 1542 (FIG. 22C). It will be understood that the combined body 1531 may include a number of internal cavities 1540 along its length, with the internal tuned mass dampers 1542 positioned in the internal cavities, as shown in FIG. 22D.

Each internal cavity 1540 is at least partially defined by one or more internal walls 1541 respectively (FIG. 22C). Each internal tuned mass damper 1542 preferably includes one or more resilient internal elements 1543 associated therewith having a preselected internal element stiffness. It is also preferred that each internal tuned mass damper 1542 includes an internal tuned damper mass 1544 having a preselected internal damper mass secured to the internal wall 1541 via the resilient internal element 1543 associated with each internal tuned mass damper 1542 respectively, whereby, in response to the traffic-related vibrations, the internal tuned mass damper 1542 vibrates at the frequency of interest based on the main combination natural frequency of the vibration isolator and the main system, to at least partially dampen the traffic-related vibrations.

In summary, in one embodiment, a method of the invention for at least partially isolating traffic-related vibrations of a special trackwork body preferably includes providing one or more resilient isolator elements, each having a preselected isolator stiffness, and providing one or more non-resilient isolator elements, each having a preselected isolator mass. The non-resilient element preferably is bonded to the special trackwork body to form a combined body having a preselected total body mass. The resilient isolator element and the combined body (i.e., the preselected total body mass) are permitted to vibrate in response to the traffic-related vibrations to at least partially isolate the surrounding structure "S" from the traffic-related vibrations at an isolation frequency that is equal to or less than the dominant frequency. Alternatively, and as illustrated in FIGS. 22A-22D, the combined body may be an integral mass in which the special trackwork body and the non-resilient isolator element are formed together (e.g., by casting).

Figure 23A:
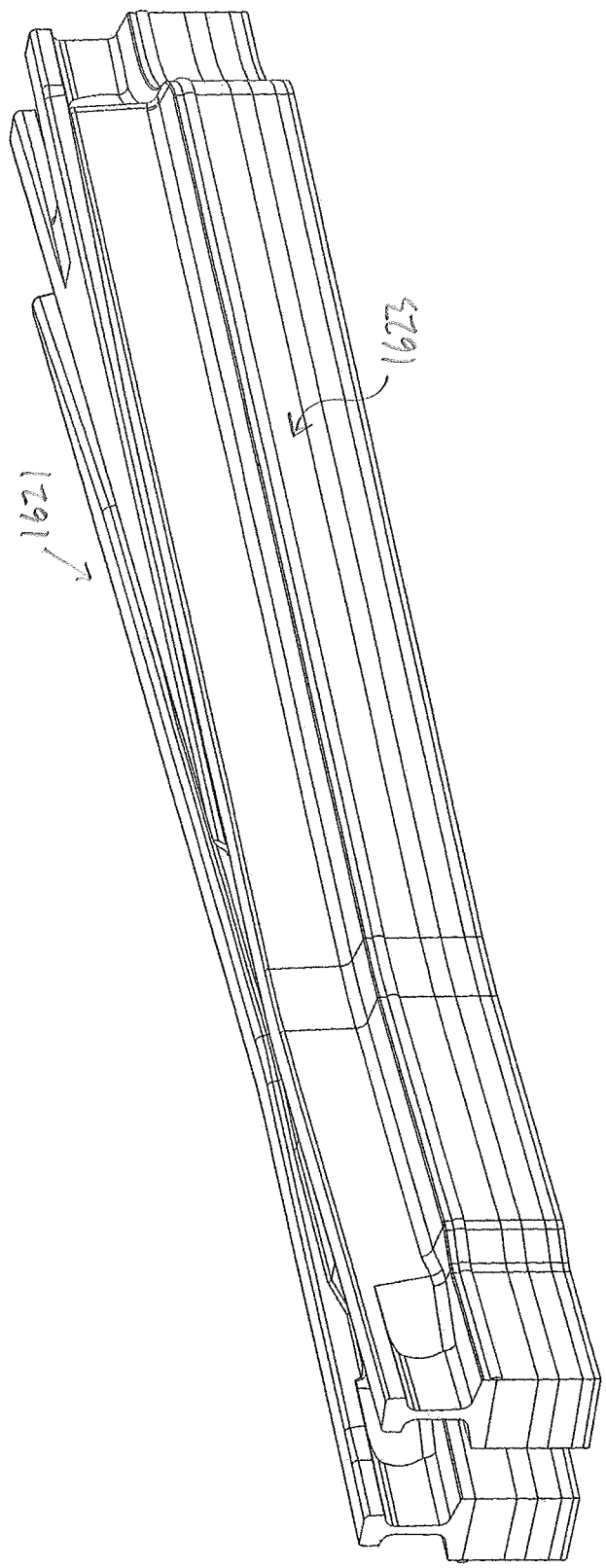
FIG. 23A is an isometric view of another alternative embodiment of the special trackwork assembly of the invention, drawn at a larger scale.
Figure 23B:
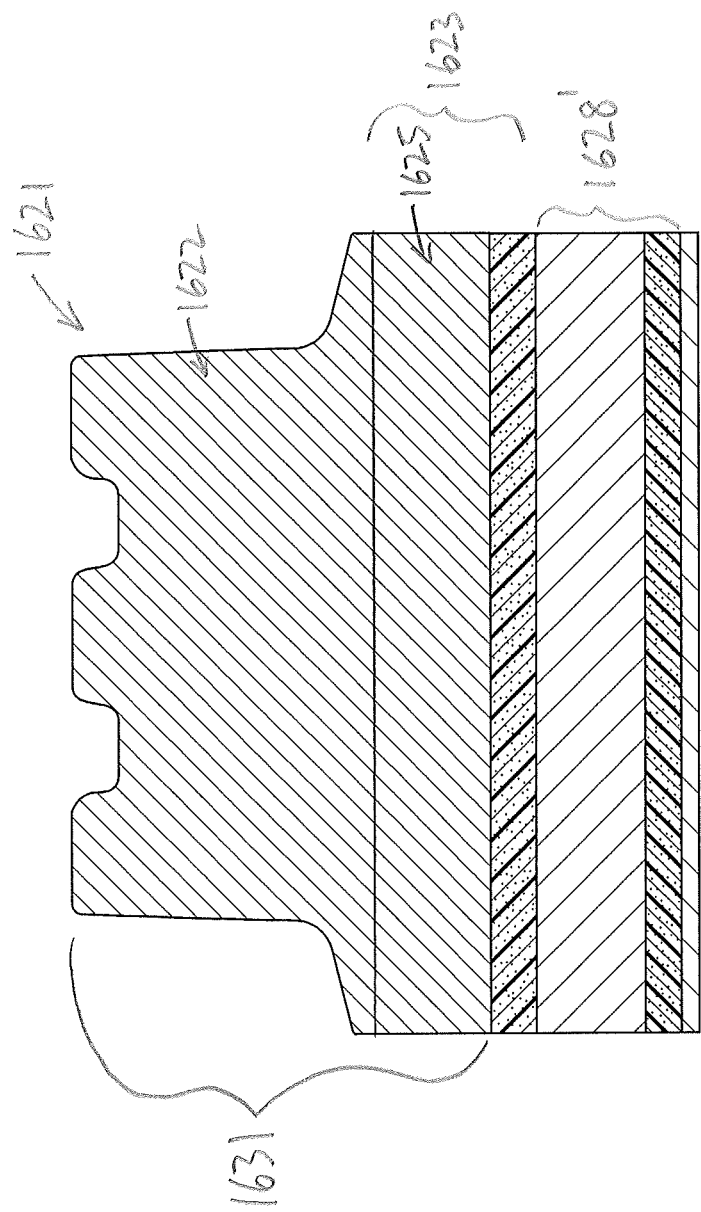
FIG. 23B is a cross-section of the special trackwork assembly of FIG. 23A, drawn at a larger scale.
Figure 23C:
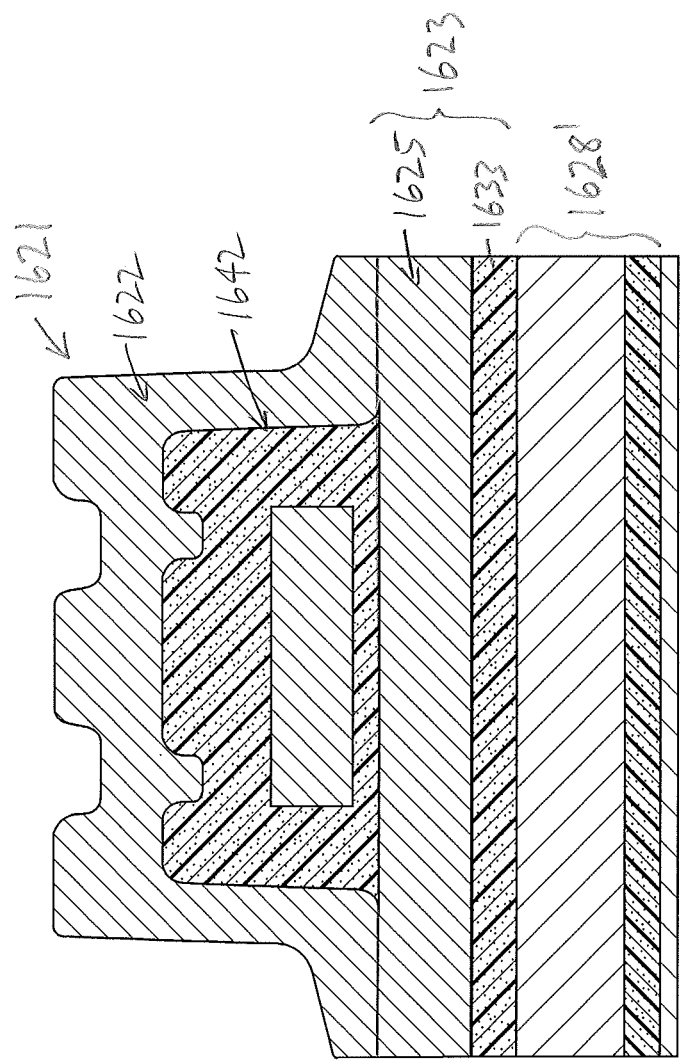
FIG. 23C is a cross-section of an alternative embodiment of the special trackwork assembly of FIG. 23A.

In another alternative embodiment illustrated in FIGS. 23A-23C, a special trackwork assembly 1621 preferably includes a vibration isolator 1623 having a non-resilient isolator element 1625 bonded to the special trackwork body 1622 to form a combined body 1631 (FIG. 23B), and a resilient isolator element 1633. Such bonding may be effected using any suitable method, e.g., welding. As can be seen in FIGS. 23B and 23C, in one embodiment, the special trackwork assembly 1621 preferably also includes one or more tuned mass dampers. For instance, a tuned mass damper 1628' shown in FIGS. 23B and 23C is a bottom-mounted tuned mass damper. In FIG. 23C, an embodiment of the special trackwork assembly 1621 is shown in which the internal tuned mass damper 1642 is included. It will be understood that the special trackwork body 1622 may include a number of internal cavities along its length, in which a number of the internal tuned mass dampers 1642 may be located, as described above.

Figure 24A:
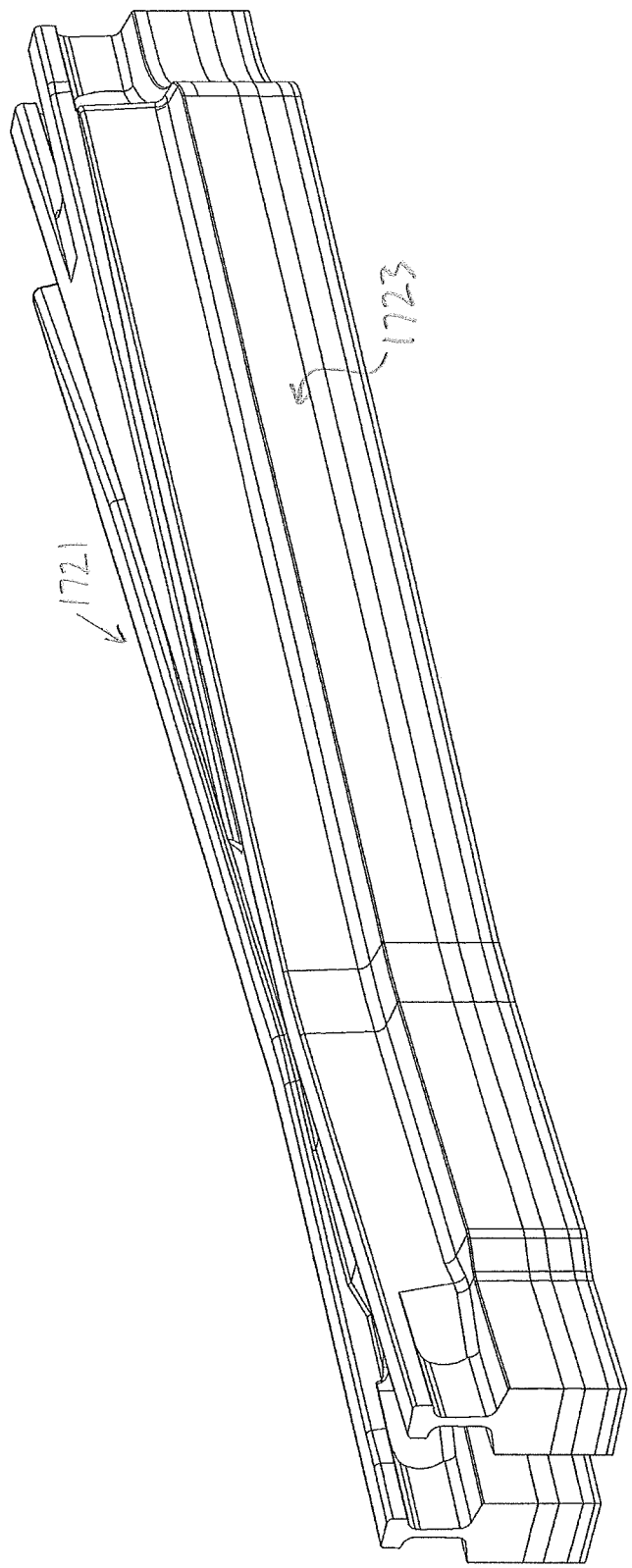
FIG. 24A is an isometric view of another alternative embodiment of the special trackwork assembly of the invention, drawn at a smaller scale.
Figure 24B:
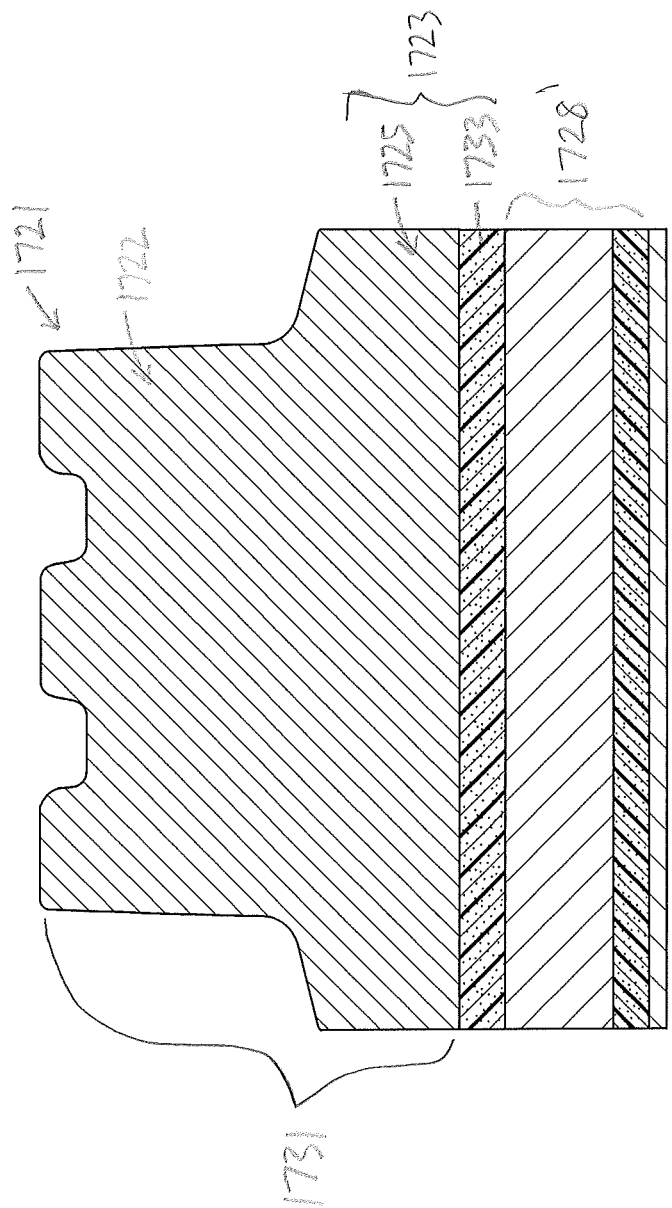
FIG. 24B is a cross-section of the special trackwork assembly of FIG. 24A, drawn at a larger scale.
Figure 24C:
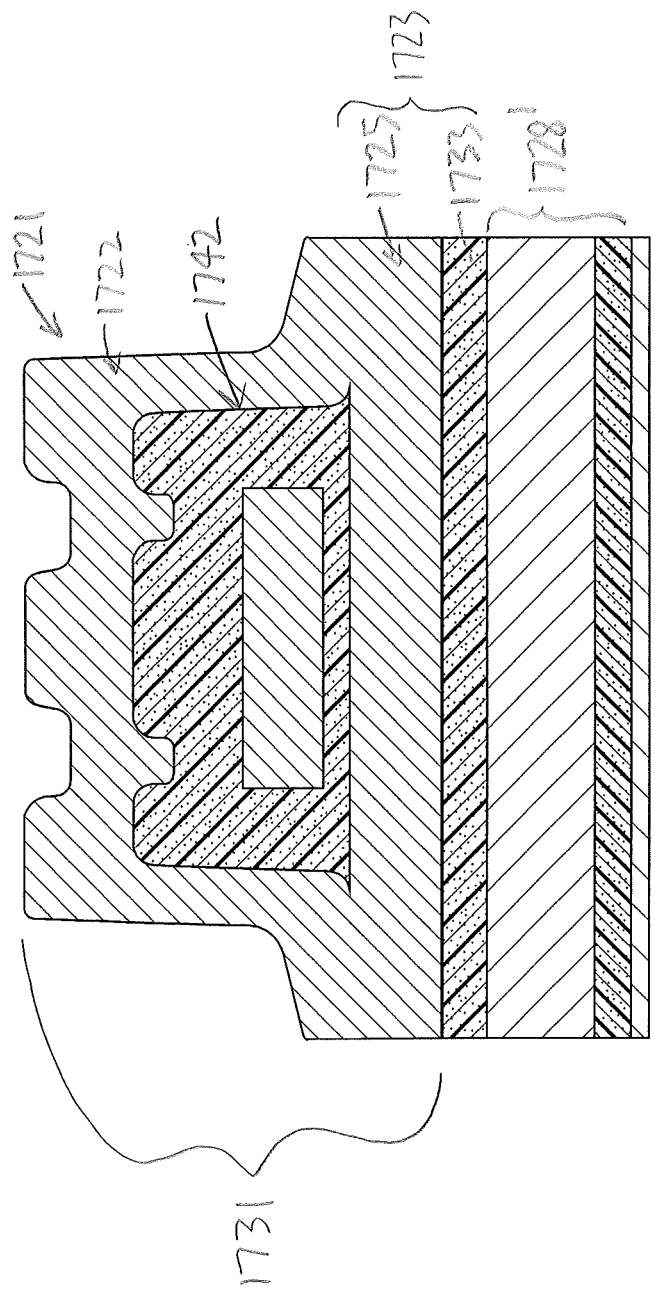
FIG. 24C is a cross-section of an alternative embodiment of the special trackwork assembly of FIG. 24A.

In another alternative embodiment illustrated in FIGS. 24A-24C, a special trackwork assembly 1721 preferably includes a vibration isolator 1723 having a combined body 1731 formed as an integral element (e.g., by casting) that includes a special trackwork body portion 1722 and a non-resilient isolator element portion 1725, and a resilient isolator element 1733 (FIGS. 24B, 24C). As can be seen in FIGS. 24B and 24C, in one embodiment, the special trackwork assembly 1721 preferably also includes one or more tuned mass dampers. For instance, a tuned mass damper 1728' is a bottom-mounted tuned mass damper (FIGS. 24B, 24C). In FIG. 24C, an embodiment of the special trackwork assembly 1721 is shown in which the internal tuned mass damper 1742 is included. It will be understood that the special trackwork body 1722 may include a number of internal cavities along its length, in which a number of the internal tuned mass dampers 1742 may be located, as described above.

Figure 25A:
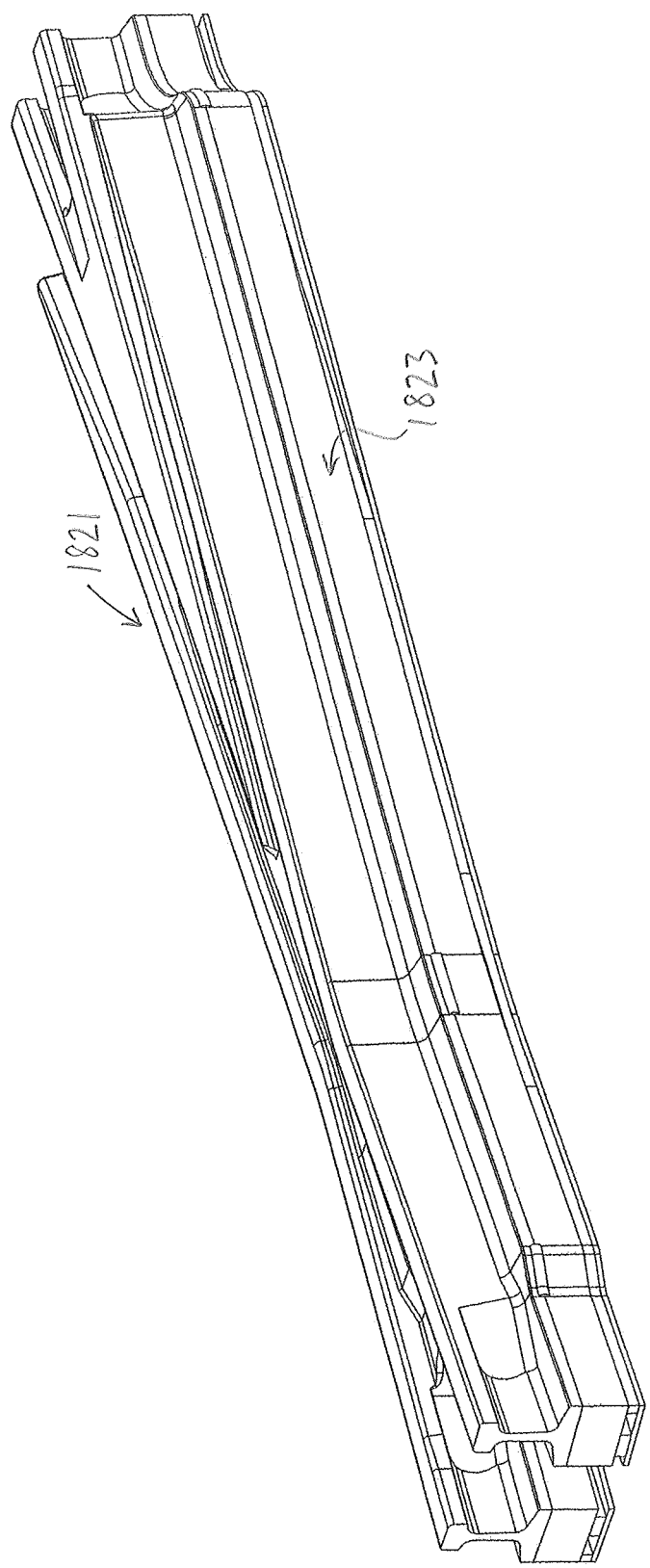
FIG. 25A is an isometric view of another alternative embodiment of the special trackwork assembly of the invention, drawn at a smaller scale.
Figure 25C:
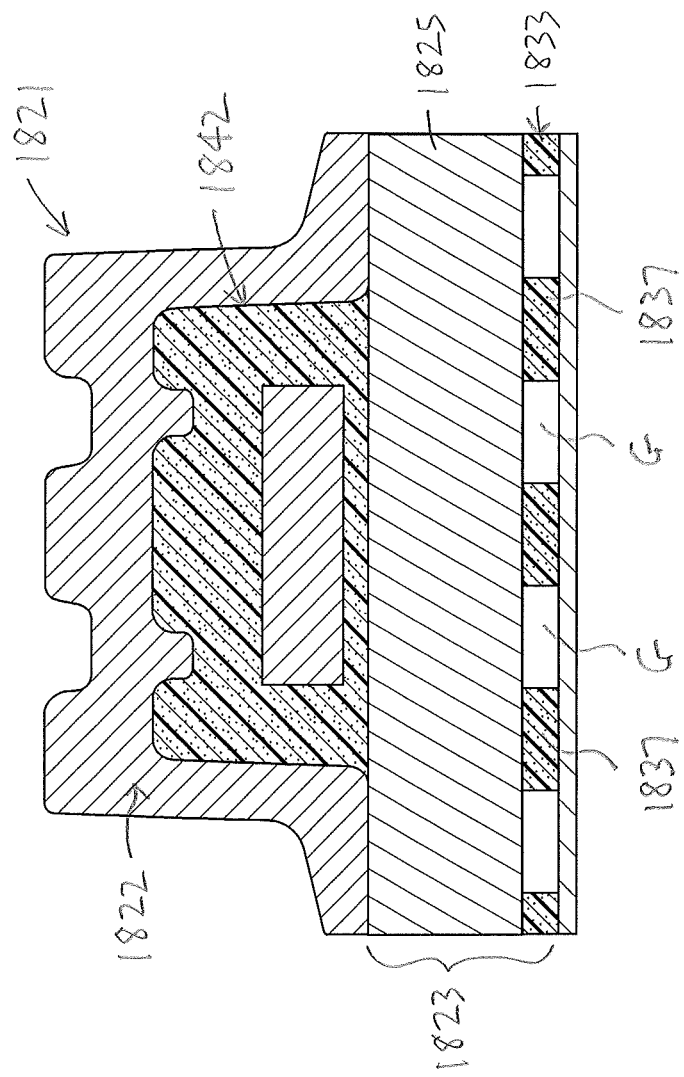
FIG. 25C is a cross-section of an alternative embodiment of the special trackwork assembly of FIG. 25A.

In another alternative embodiment illustrated in FIGS. 25A-25C, a special trackwork assembly 1821 preferably includes a vibration isolator 1823 having a non-resilient isolator element 1825 bonded to the special trackwork body 1822 and a resilient isolator element 1833. Such bonding may be effected using any suitable method, e.g., welding. As can be seen in FIGS. 25B and 25C, in one embodiment, the special trackwork assembly 1821 preferably also includes one or more tuned mass dampers. As can be seen in FIGS. 25B and 25C, it is preferred that the resilient isolator element 1833 includes strips 1837 of any suitable resilient material with element gaps "G" therebetween. For example, the strips 1837 may be made of a suitable rubber. In FIG. 25C, an embodiment of the special trackwork assembly 1821 is shown in which the internal tuned mass damper 1842 is included. It will be understood that the special trackwork body 1822 may include a number of internal cavities along its length, in which a number of the internal tuned mass dampers 1842 may be located, as described above.

Figure 26:
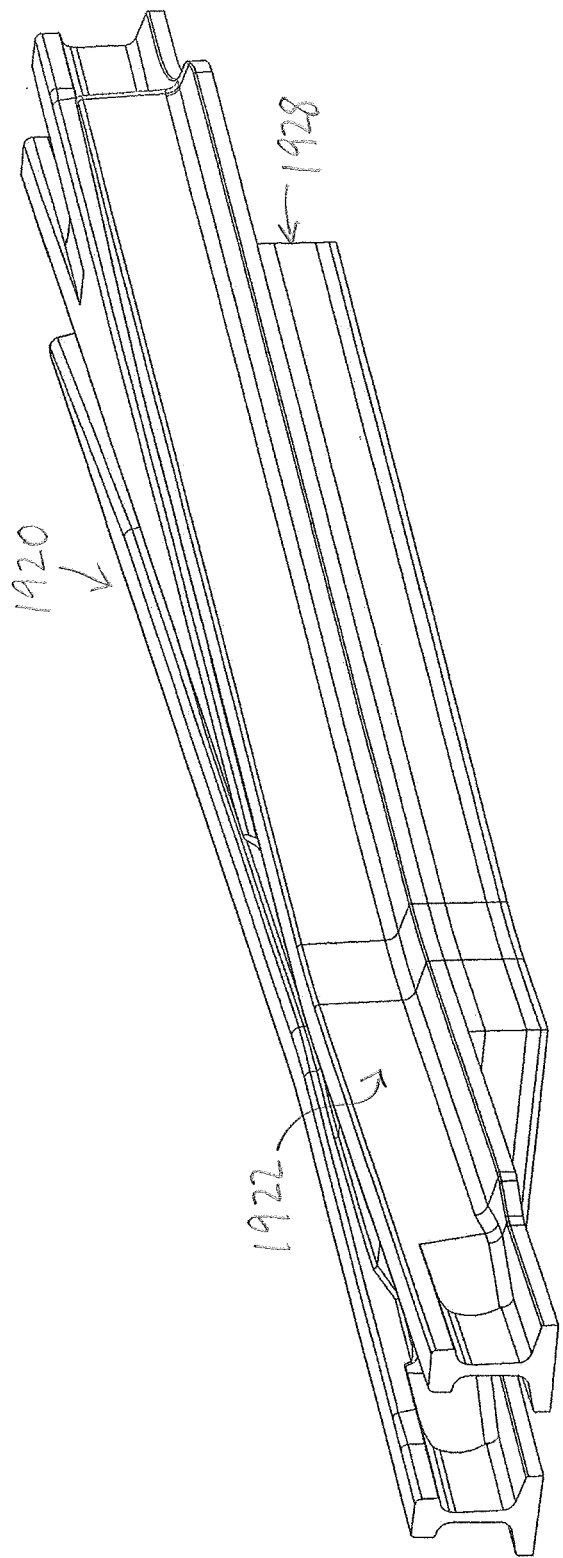
FIG. 26 is an isometric view of another alternative embodiment of the special trackwork assembly of the invention.

Those skilled in the art would appreciate that, depending on the circumstances, the tuned mass damper may or may not extend along the entire length of the special trackwork body. In this way, the characteristics of the tuned mass damper may be tailored as required, i.e., by varying the length of the tuned mass damper as required. For example, an embodiment of a special trackwork assembly 1920 of the invention is illustrated in FIG. 26. The special trackwork assembly 1920 preferably includes a special trackwork body 1922 and a tuned mass damper 1928. As can be seen in FIG.

26, the tuned mass damper 1928 does not extend along the entire length of the special trackwork body 1922.

Figure 27:
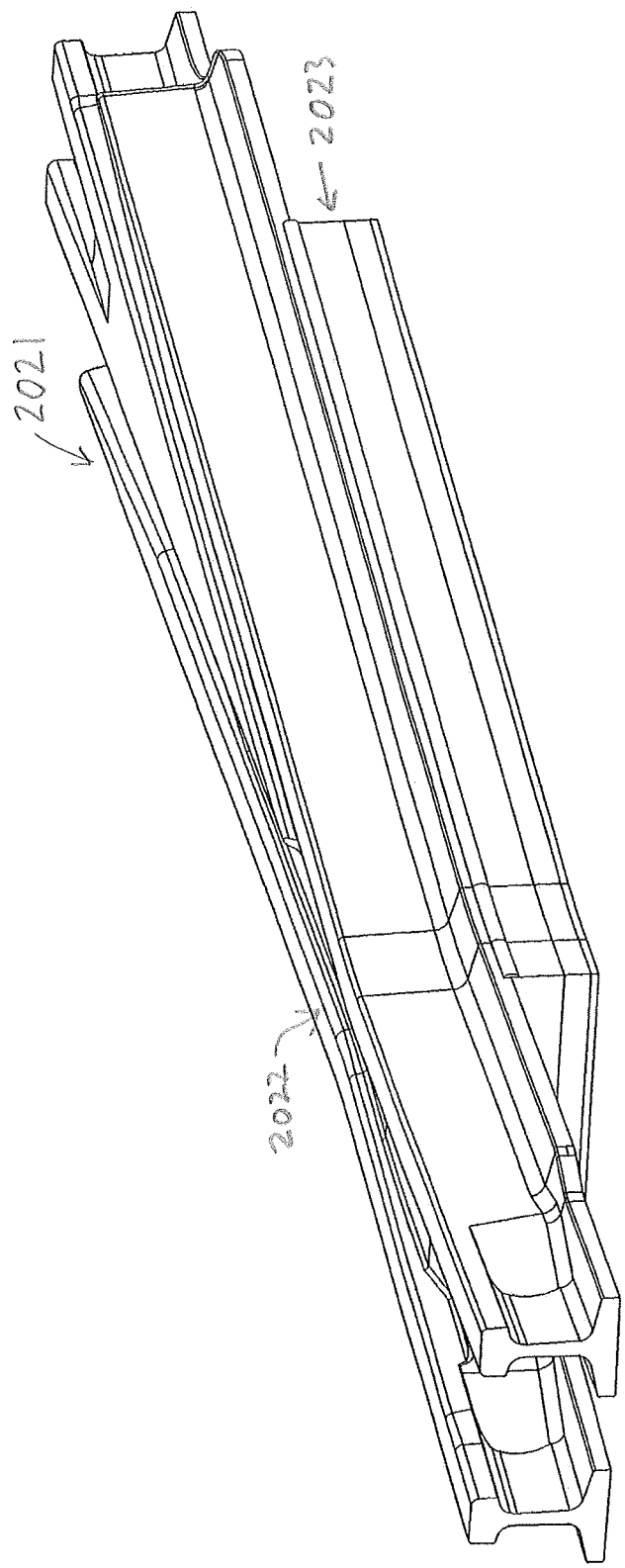
FIG. 27 is an isometric view of another alternative embodiment of the special trackwork assembly of the invention.

As can be seen in FIG. 27, the vibration isolator may or may not extend along the entire length of the special trackwork body. In this way, the characteristics of the vibration isolator may be tailored as required, i.e., by varying the length of the vibration isolator as required. For example, an embodiment of a special trackwork assembly 2021 of the invention is illustrated in FIG. 27. The special trackwork assembly 2021 preferably includes a special trackwork body 2022 and a vibration isolator 2023. As can be seen in FIG. 27, the vibration isolator 2023 does not extend along the entire length of the special trackwork body 2022.

Those skilled in the art would appreciate that the tuned mass damper or the vibration isolator may be positioned relative to the special trackwork body in various ways. For example, instead of bonding the non-resilient isolator element to a bottom surface of the special trackwork body, the non-resilient isolator element may be bonded to an exterior side of the special trackwork body. It will be understood that the illustrations of the various embodiments described herein are exemplary only.

It will also be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A special trackwork assembly comprising:
    a special trackwork body formed to support wheels of a train moving over a running surface portion of an exterior surface of the special trackwork body that generate traffic-related vibrations of the special trackwork body having at least one frequency of interest;
    at least one tuned mass damper that is secured to the special trackwork body and formed to vibrate, in response to the traffic-related vibrations of the special trackwork body, at said at least one frequency of interest, to at least partially dampen the traffic-related vibrations of the special trackwork body;
    the special trackwork body comprising at least one cavity therein defined by at least one internal wall; and
    said at least one tuned mass damper being at least partially secured to said at least one internal wall.

2. The special trackwork assembly according to claim 1 in which said at least one tuned mass damper is at least partially secured to a bottom surface of the special trackwork body.

3. The special trackwork assembly according to claim 1 in which said at least one tuned mass damper comprises:
    at least one resilient element having a preselected stiffness;
    at least one non-resilient element at least partially connected with the special trackwork body via said at least one resilient element, said at least one non-resilient element having a preselected mass; and
    the preselected stiffness of said at least one resilient element and the preselected mass of said at least one non-resilient element being selected for causing said at least one tuned mass damper to vibrate at said at least one frequency of interest in response to the traffic-related vibrations, for at least partially dampening the traffic-related vibrations of the special trackwork body.

4. The special trackwork assembly according to claim 1 in which said at least one tuned mass damper comprises:
    a first layer of a first resilient material engaged with a bottom surface of the special trackwork body;
    a second layer of a second resilient material, spaced apart from the first layer;
    a damper mass positioned between, and secured to, the first and second layers; and
    the first and second layers having respective first and second preselected stiffnesses and the damper mass having a preselected mass, the first and second preselected stiffnesses and the preselected mass being selected for causing said at least one tuned mass damper to vibrate at said at least one frequency of interest in response to the traffic-related vibrations, for at least partially dampening the traffic-related vibrations of the special trackwork body.

5. The special trackwork assembly according to claim 1 in which:
    the exterior surface of the special trackwork body comprises a non-running surface portion in addition to the running surface portion;
    the special trackwork body is supported by supporting material; and
    the non-running surface portion is covered by a layer of electrically insulating material for substantially electrically isolating the special trackwork body relative to the supporting material.

6. The special trackwork assembly according to claim 1 comprising a plurality of tuned mass dampers that are at least partially separated from each other by gaps, each said tuned mass damper being formed for at least partially dampening the traffic-related vibrations at said at least one frequency of interest.

7. A special trackwork assembly comprising:
    a special trackwork body formed to support wheels of a train moving over a running surface portion of an exterior surface of the special trackwork body that generate traffic-related vibrations of the special trackwork body having at least one frequency of interest;
    at least one tuned mass damper that is secured to the special trackwork body and formed to vibrate, in response to the traffic-related vibrations of the special trackwork body, at said at least one frequency of interest, to at least partially dampen the traffic-related vibrations of the special trackwork body;
    the special trackwork body comprises a plurality of internal cavities, each said internal cavity being defined by at least one internal wall respectively; and
    said at least one tuned mass damper comprises a plurality of internal tuned mass dampers respectively positioned in the internal cavities secured to the special trackwork body via said at least one internal wall respectively.

8. A special trackwork assembly according to claim 7 in which:
    each said internal tuned mass damper comprises at least one resilient mounting element having a preselected stiffness;
    each said internal tuned mass damper comprises an internal tuned damper mass having a preselected mass and being secured to the special trackwork body via said at least one resilient mounting element; and
    each said internal tuned mass damper is formed to vibrate at said at least one frequency of interest in response to the traffic-related vibrations of the special trackwork body, for at least partially dampening the traffic-related vibrations of the special trackwork body.

9. A tuned mass damper for damping traffic-related vibrations of a special trackwork body generated by train wheels rolling over the special trackwork body, the traffic-related vibrations having at least one frequency of interest, the tuned mass damper comprising:
- at least one resilient element comprising at least one resilient material, said at least one resilient element having a preselected stiffness;
- at least one non-resilient element comprising at least one non-resilient material that is at least partially connected to the special trackwork body via said at least one resilient element, said at least one non-resilient element having a preselected mass;
- the preselected stiffness of said at least one resilient element and the preselected mass of said at least one non-resilient element being selected to permit the tuned mass damper to vibrate, in response to the traffic-related vibrations transmitted thereto, at said at least one frequency of interest, to at least partially dampen the traffic-related vibrations of the special trackwork body;
- said at least one resilient element comprising a first resilient element positioned between the special trackwork body and said at least one non-resilient element; and
- said at least one non-resilient element being at least partially connected with the special trackwork body via the first resilient element.

10. A The tuned mass damper according to claim 9 in which said at least one resilient element additionally comprises a second resilient element positioned to support said at least one non-resilient element.

11. A method of damping vibrations of a special trackwork body formed to support wheels of a train moving over a running surface of the special trackwork body that generate traffic-related vibrations of the special trackwork body having at least one frequency of interest, the method comprising:
- (a) providing at least one resilient element having a preselected stiffness;
- (b) providing at least one non-resilient element having a preselected mass; and
- (c) via said at least one resilient element, connecting said at least one non-resilient element to the special trackwork body, to permit said at least one non-resilient element and said at least one resilient element to vibrate, in response to the vibrations of the special trackwork body, at said at least one frequency of interest, for at least partially dampening the traffic-related vibrations of the special trackwork body.

12. A special trackwork assembly connected with a surrounding structure, the special trackwork assembly comprising:
- a vibration isolator;
- a special trackwork body for supporting wheels of a train moving over a running surface portion of an exterior surface of the special trackwork body that generate traffic-related vibrations in the surrounding structure, in the absence of the vibration isolator, at a dominant frequency;
- the vibration isolator comprising:
  - at least one non-resilient isolator element having a predetermined isolator mass that is bonded with the special trackwork body to form a combined body having a preselected total body mass;
  - at least one resilient isolator element at least partially supporting the combined body; and
  - said at least one resilient isolator element having a preselected isolator stiffness that is selected to permit the combined body and said at least one resilient isolator element to vibrate, in response to the movement of the wheels of the train over the running surface portion, to at least partially isolate the surrounding structure from the traffic-related vibrations at a predetermined isolation frequency that is equal to or less than the dominant frequency.

13. A special trackwork assembly connected to a surrounding structure, the special trackwork assembly comprising:
- a vibration isolator;
- a special trackwork body for supporting wheels of a train moving over a running surface portion of an exterior surface of the special trackwork body that generate traffic-related vibrations in the surrounding structure, in the absence of the vibration isolator, at a dominant frequency, the special trackwork body as installed, in the absence of the vibration isolator, comprising a main system;
- the vibration isolator comprising:
  - at least one non-resilient isolator element having a predetermined isolator mass that is bonded with the special trackwork body to form a combined body having a predetermined total body mass;
  - at least one resilient isolator element at least partially supporting the combined body;
  - said at least one resilient isolator element having a preselected isolator stiffness selected to permit the combined body and said at least one resilient isolator element to vibrate, in response to the movement of the wheels of the train over the running surface portion, to at least partially isolate the surrounding structure from the traffic-related vibrations at a predetermined isolation frequency that is equal to or less than the dominant frequency;
- the vibration isolator and the main system having a main combination natural frequency; and
- at least one tuned mass damper comprising at least one resilient element having a preselected stiffness and at least one non-resilient element having a predetermined damper mass secured to the special trackwork body via said at least one resilient element, the preselected stiffness and the preselected damper mass being selected to permit said at least one tuned mass damper to vibrate at a frequency of interest based on the main combination natural frequency of the vibration isolator and the main system, to at least partially dampen the traffic-related vibrations.

14. A special trackwork assembly according to claim 13 in which:
- said at least one tuned mass damper comprises a plurality of internal tuned mass dampers;
- the special trackwork body comprises a plurality of internal cavities, each said internal cavity being defined by at least one internal wall respectively;
- each said internal tuned mass damper comprises at least one resilient internal element associated therewith having a preselected internal element stiffness; and
- each said internal tuned mass damper comprises an internal tuned damper mass having a preselected internal damper mass secured to said at least one internal wall via said at least one resilient internal element associated with each said internal tuned mass damper respectively, whereby, in response to the movement of the wheels of the train over the running surface portion, each said internal tuned mass damper vibrates at the frequency of interest to at least partially dampen the traffic-related vibrations.

15. A vibration isolator for at least partially isolating a surrounding structure that is connected to a special trackwork body over which train wheels roll to generate traffic-related vibrations in the surrounding structure, the traffic-related vibrations having a dominant frequency in the absence of the vibration isolator, the special trackwork body having a body mass, the vibration isolator comprising:
- at least one non-resilient isolator element having a predetermined isolator mass for bonding with the special trackwork body to form a combined body having a total body mass; and
- at least one resilient isolator element at least partially supporting the combined body, said at least one resilient isolator element having a preselected isolator stiffness that is selected to permit said at least one non-resilient isolator element and the combined body to vibrate, in response to the movement of the train wheels over the special trackwork body, to at least partially isolate the surrounding structure from the traffic-related vibrations at a predetermined isolation frequency that is equal to or less than the dominant frequency.

* * * * *